(12) United States Patent
Kobayashi et al.

(10) Patent No.: US 8,743,433 B2
(45) Date of Patent: Jun. 3, 2014

(54) COLOR MEASURING DEVICE, IMAGE FORMING APPARATUS AND COMPUTER PROGRAM PRODUCT

(75) Inventors: Masato Kobayashi, Kanagawa (JP); Nobuyuki Satoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 137 days.

(21) Appl. No.: 13/560,309

(22) Filed: Jul. 27, 2012

(65) Prior Publication Data

US 2013/0027721 A1    Jan. 31, 2013

(30) Foreign Application Priority Data

Jul. 29, 2011   (JP) ................................. 2011-167411
Jun. 11, 2012   (JP) ................................. 2012-132058

(51) Int. Cl.
*H04N 1/46*    (2006.01)
(52) U.S. Cl.
USPC ............ 358/504; 358/1.9; 358/2.1; 358/461; 358/505; 358/509; 358/518; 358/520; 358/521; 358/533; 382/274
(58) Field of Classification Search
None
See application file for complete search history.

(56) References Cited

U.S. PATENT DOCUMENTS

| 8,422,017 | B2 * | 4/2013 | Gottwals et al. | 356/405 |
|---|---|---|---|---|
| 2003/0048464 | A1 * | 3/2003 | Yamada et al. | 358/1.9 |
| 2005/0057681 | A1 * | 3/2005 | Yokota et al. | 348/362 |
| 2005/0163519 | A1 * | 7/2005 | Takahashi | 399/49 |
| 2005/0237548 | A1 * | 10/2005 | Suzuki | 358/1.9 |
| 2008/0044099 | A1 * | 2/2008 | Kuno | 382/254 |
| 2010/0027078 | A1 * | 2/2010 | Bisset et al. | 358/406 |
| 2010/0329711 | A1 * | 12/2010 | Ishikawa et al. | 399/49 |
| 2011/0033196 | A1 * | 2/2011 | Fuchimoto | 399/49 |
| 2011/0122428 | A1 * | 5/2011 | Itagaki et al. | 358/1.9 |
| 2013/0106973 | A1 * | 5/2013 | Furuta | 347/118 |
| 2013/0242321 | A1 * | 9/2013 | Okada et al. | 358/1.9 |

FOREIGN PATENT DOCUMENTS

| JP | 2000-244739 | 9/2000 |
|---|---|---|
| JP | 3129502 | 11/2000 |
| JP | 2009-239419 | 10/2009 |
| JP | 2010-66465 | 3/2010 |
| JP | 2012-61756 | 3/2012 |
| JP | 2012-63270 | 3/2012 |
| JP | 2012-63271 | 3/2012 |

* cited by examiner

*Primary Examiner* — Miya J Cato
(74) *Attorney, Agent, or Firm* — Oblon, Spivak, McClelland, Maier & Neustadt, L.L.P.

(57) ABSTRACT

A color measuring device includes: an image capturing unit; a reference chart; a light quantity control unit; a generating unit; a correction unit; and a calculating unit. The image capturing unit outputs image data of an image-capturing range. The reference chart has multiple patches of different densities. The light quantity control unit controls the illumination unit. The generating unit generates first correction data based on image data of the multiple patches illuminated by a first light quantity and generates second correction data based on image data of the multiple patches illuminated by a second light quantity. The correction unit corrects image data of the reference chart and a color measurement target, using the first correction data or the second correction data. The calculating unit calculates color measurement value of the color measurement target based on the corrected image data of the reference chart and the color measurement target.

8 Claims, 37 Drawing Sheets

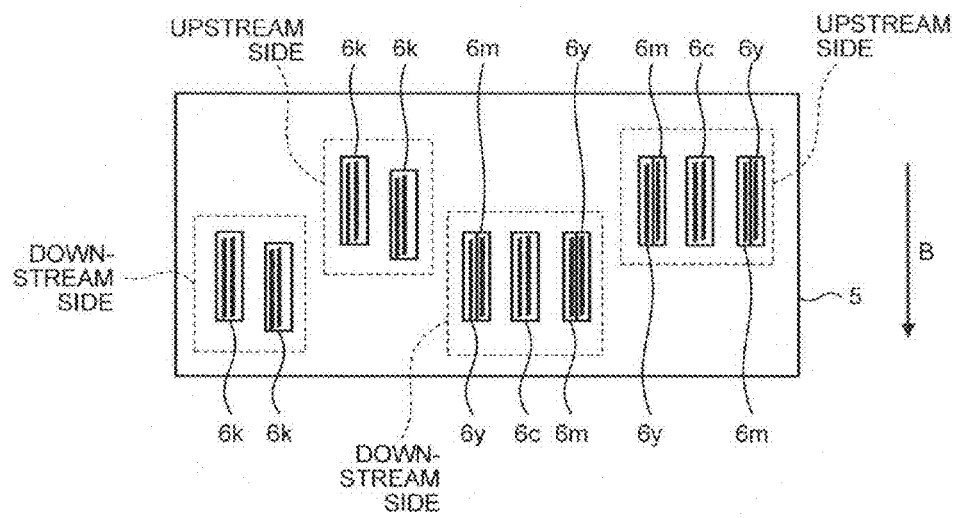

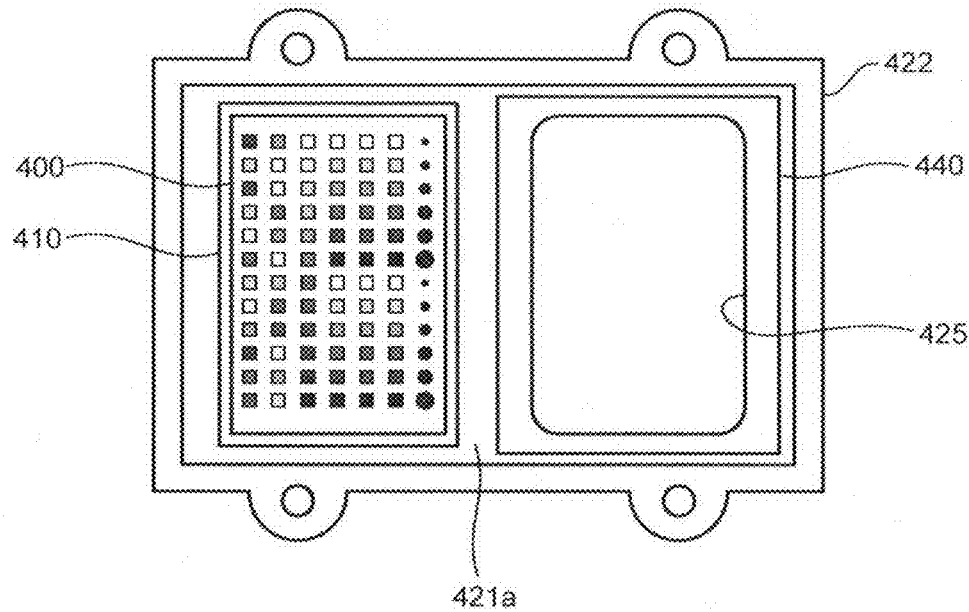

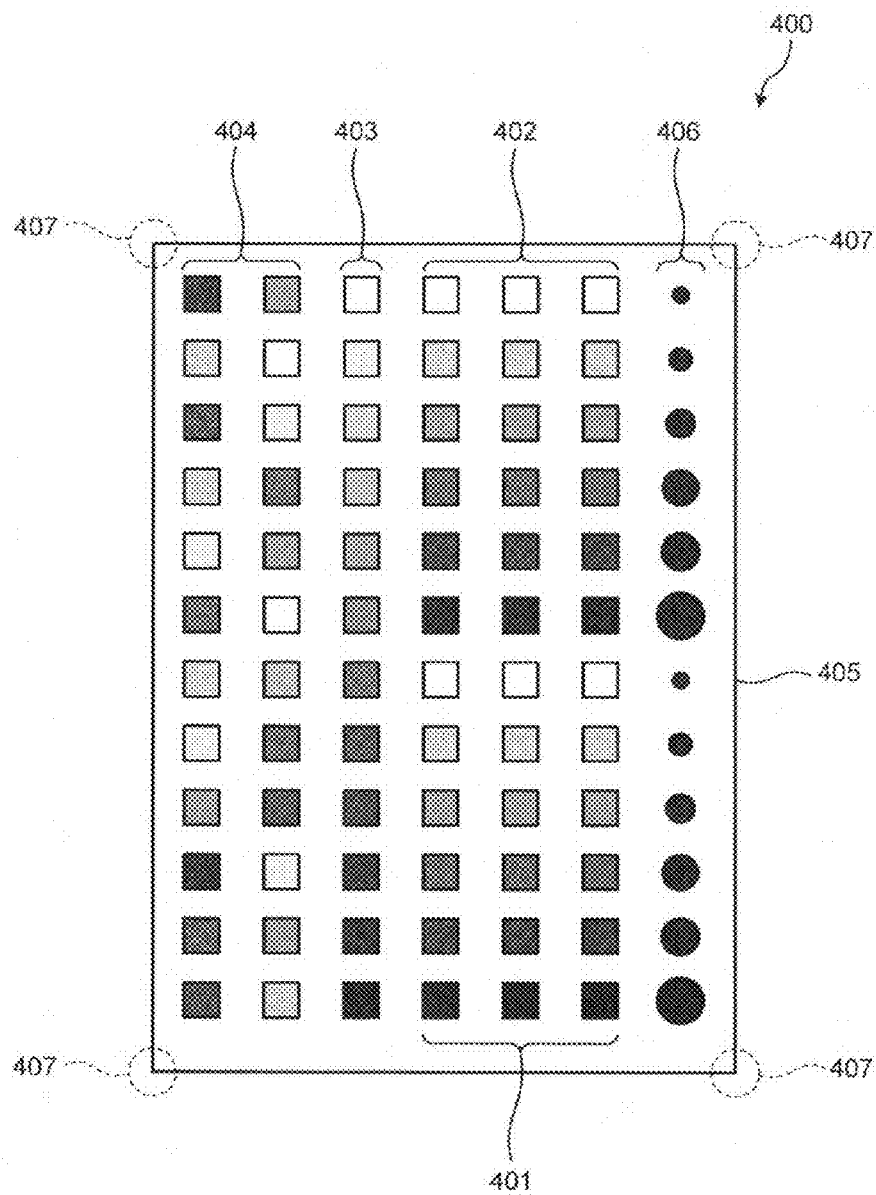

FIG.12
(a)
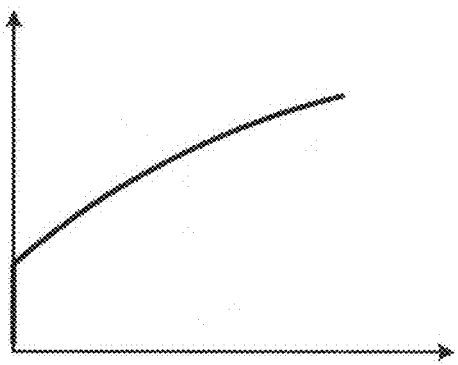
(b)
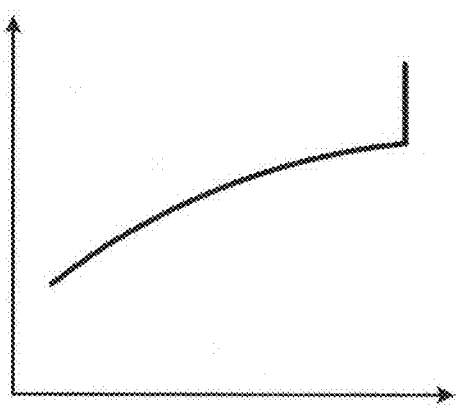

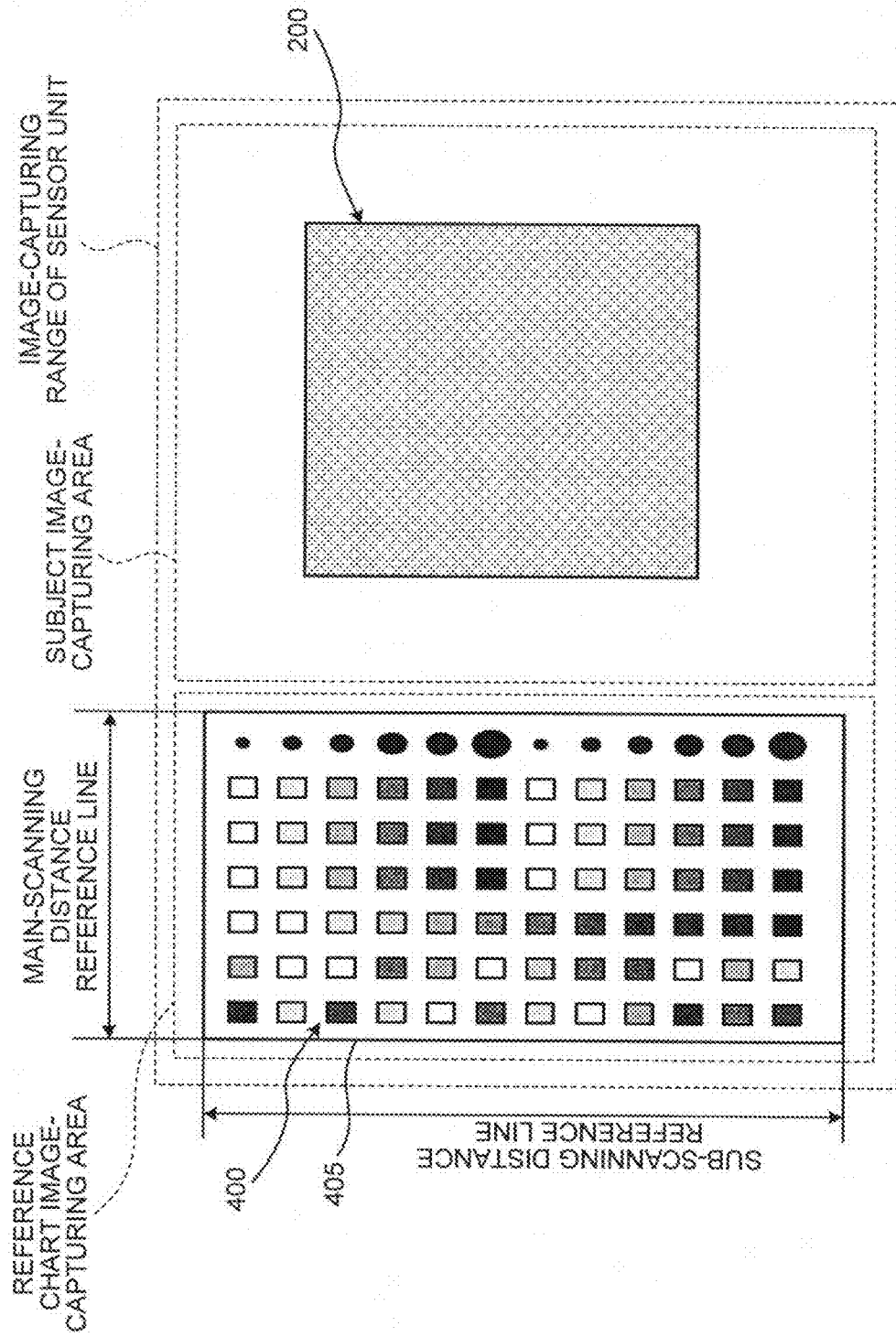

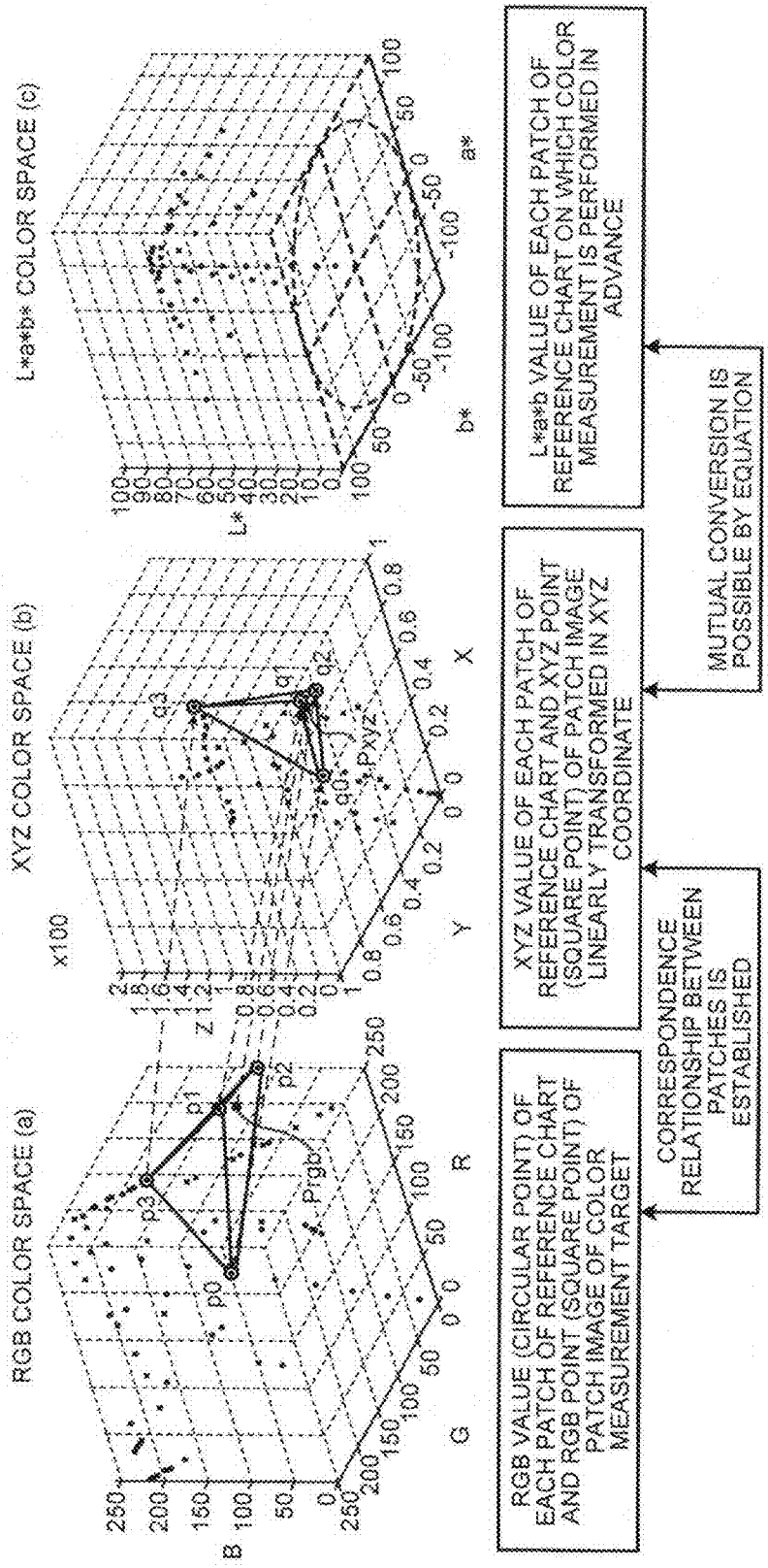

XYZ ⇒ Lab $$f_x = \begin{cases} \sqrt[3]{x_r} & x_r > 0.008856 \\ (903.3 \times x_r + 16)/116 & x_r \leq 0.008856 \end{cases}$$

$$f_y = \begin{cases} \sqrt[3]{y_r} & y_r > 0.008856 \\ (903.3 \times y_r + 16)/116 & y_r \leq 0.008856 \end{cases}$$

$$f_z = \begin{cases} \sqrt[3]{z_r} & z_r > 0.008856 \\ (903.3 \times z_r + 16)/116 & z_r \leq 0.008856 \end{cases}$$

$x_r = X/X_r$
$y_r = Y/Y_r$
$z_r = Z/Z_r$
$L = 116 \times f_y - 16$
$a = 500 \times (f_x - f_y)$
$b = 200 \times (f_y - f_z)$ (b)

Lab ⇒ XYZ $$x_r = \begin{cases} f_x^3 & f_x^3 > 0.008856 \\ (116 \times f_x - 16)/903.3 & f_x^3 \leq 0.008856 \end{cases}$$

$$y_r = \begin{cases} ((L+16)/116)^3 & L > 903.3 \times 0.008856 \\ L/903.3 & L \leq 903.3 \times 0.008856 \end{cases}$$

$$z_r = \begin{cases} f_z^3 & f_z^3 > 0.008856 \\ (116 \times f_z - 16)/903.3 & f_z^3 \leq 0.008856 \end{cases}$$

$f_x = \dfrac{a}{500} + f_y$ $$f_y = \begin{cases} (L+16)/116 & y_r > 0.008856 \\ (903.3 \times y_y + 16)/116 & y_r \leq 0.008856 \end{cases}$$

$f_z = f_y - \dfrac{b}{200}$ $X = x_r \times X_r$
$Y = y_r \times Y_r$
$Z = z_r \times Z_r$

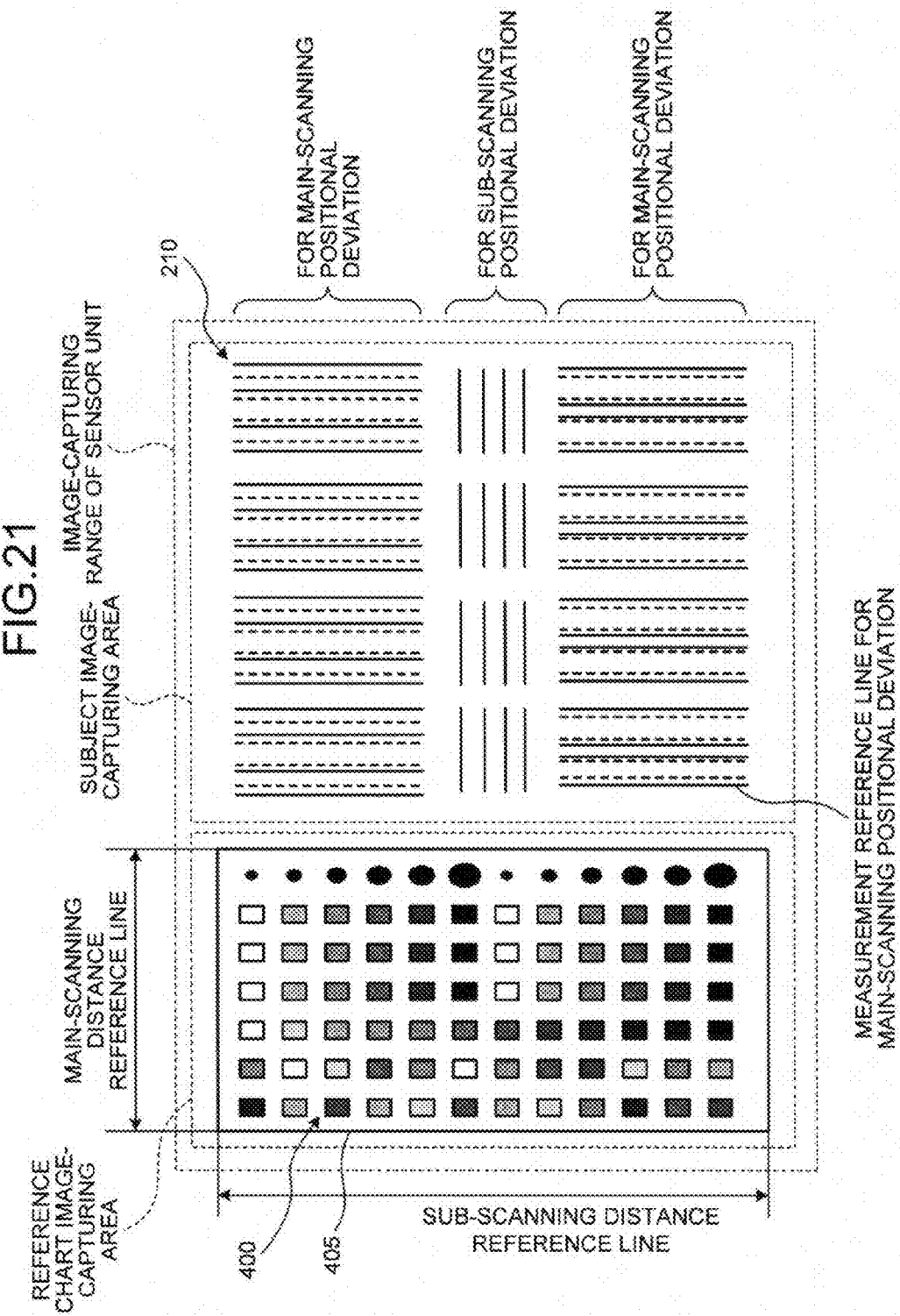

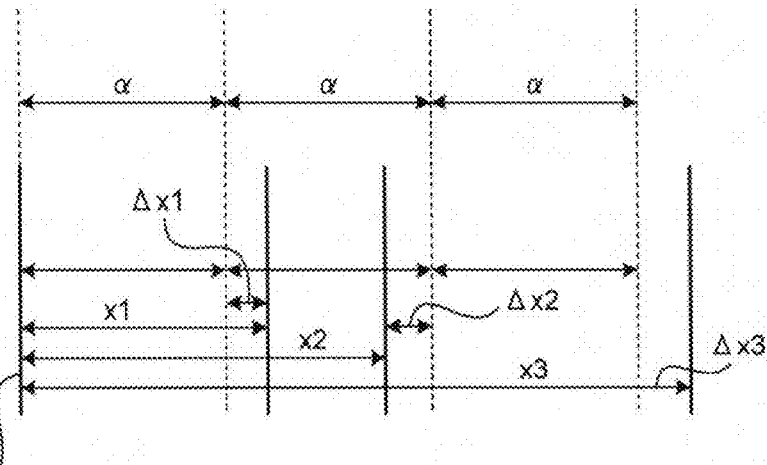

(a)

| PATCH NUMBER | INITIAL REFERENCE RGB VALUE (RdGdBd) | | | Ld | ad | bd | Xd | Yd | Zd |
|---|---|---|---|---|---|---|---|---|---|
| | Rd | Gd | Bd | | | | | | |
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| ... | | | | | | | | | |
| 72 | | | | | | | | | |

Tb1

(b)

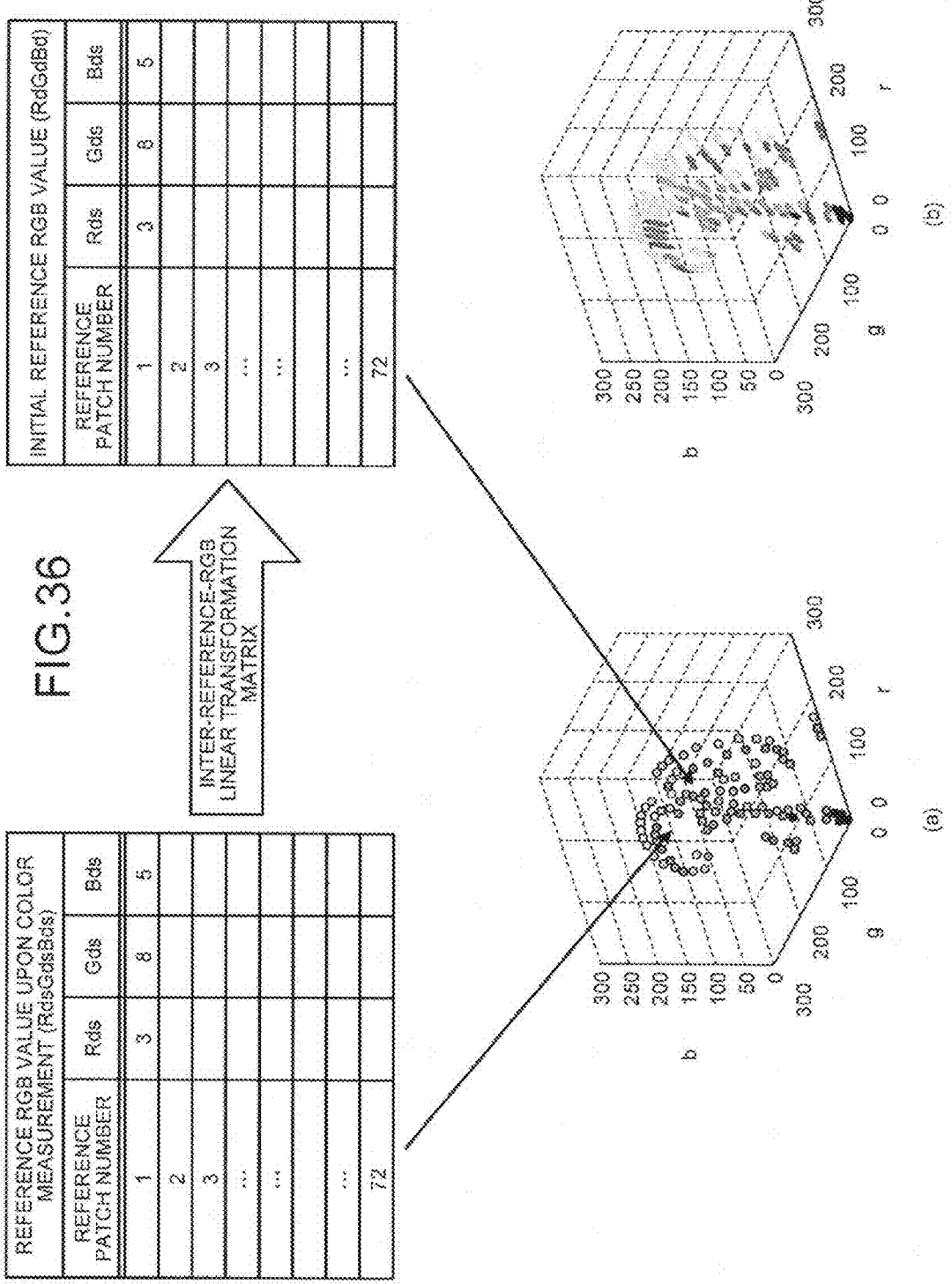

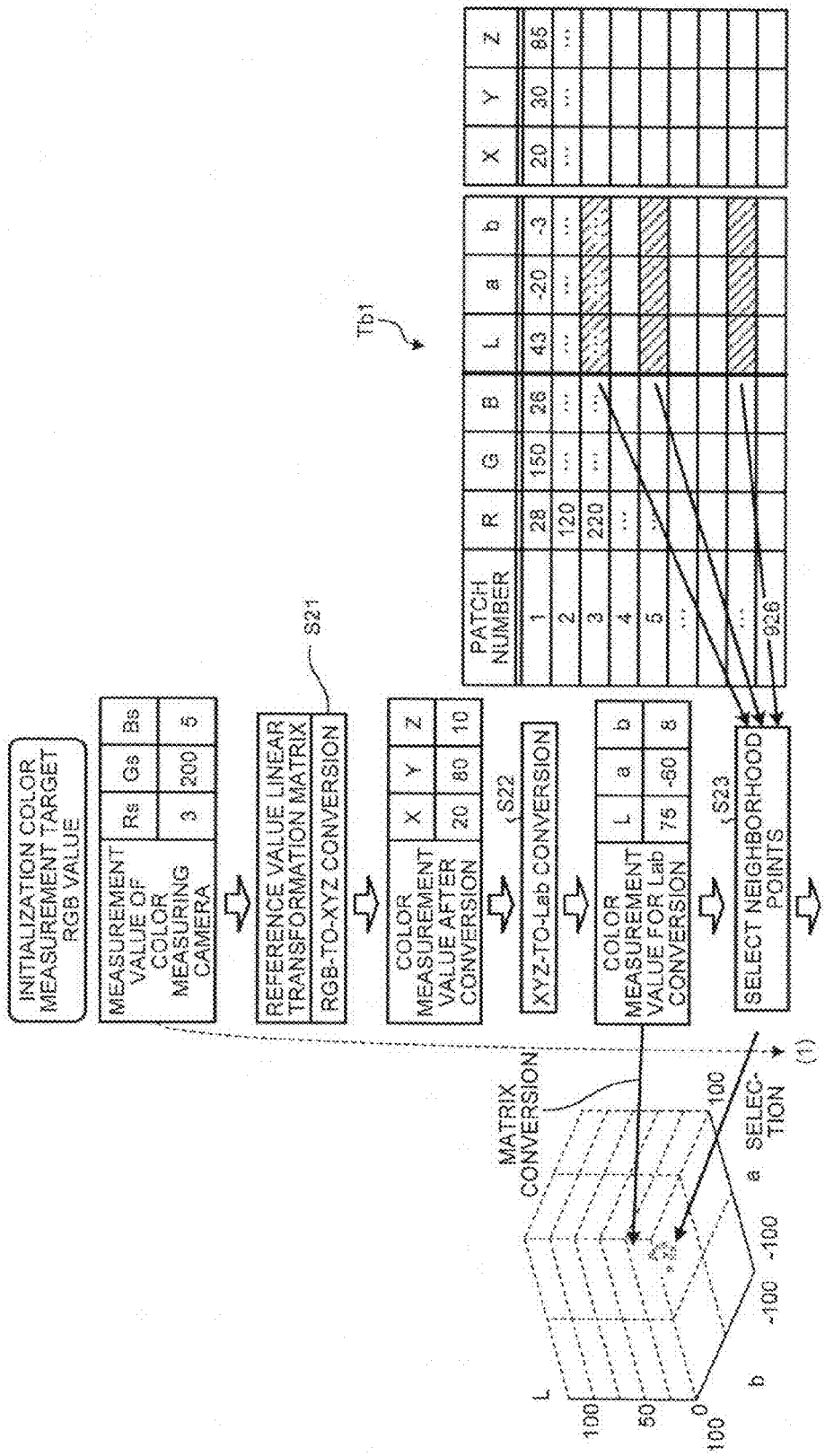

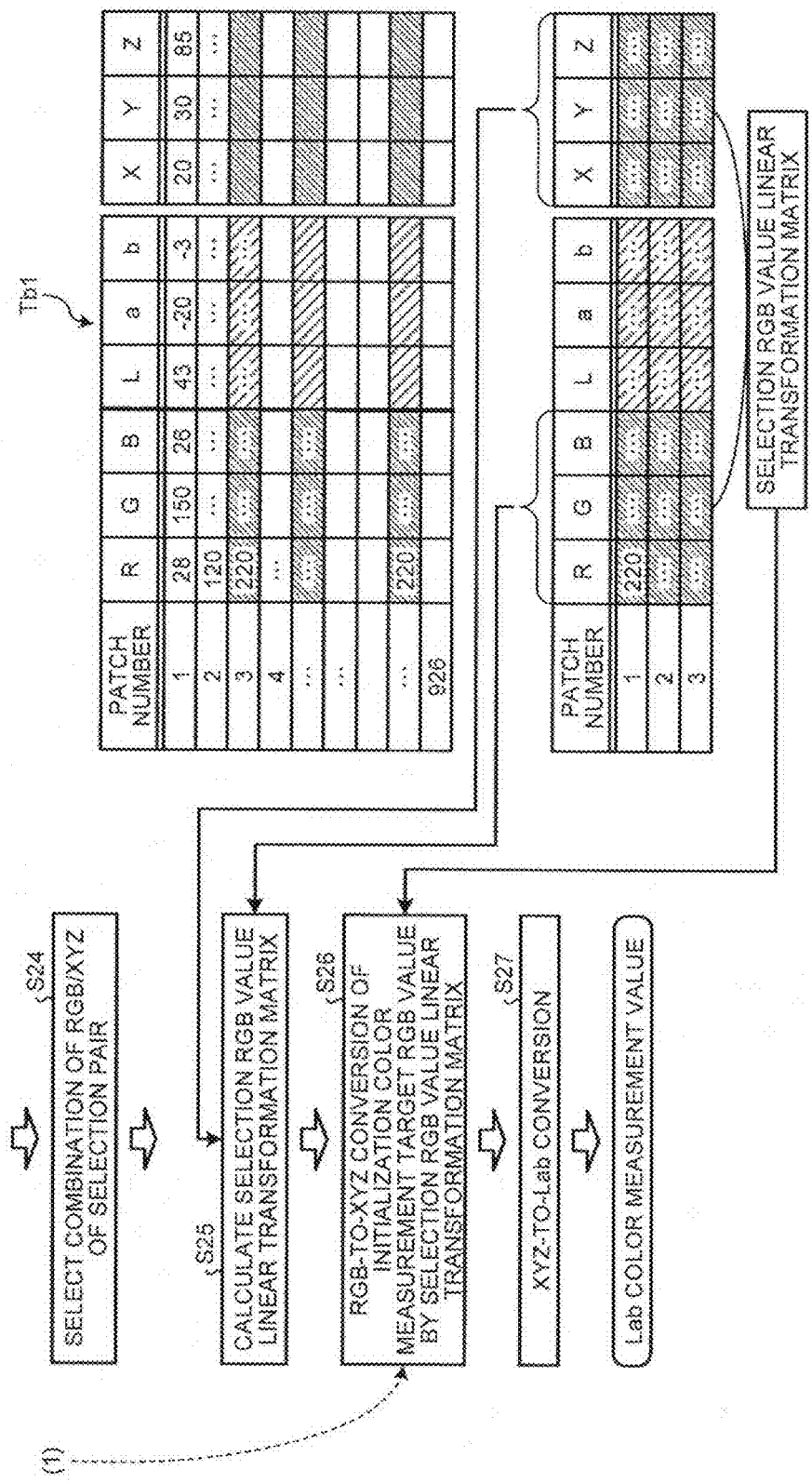

COLOR MEASURING DEVICE, IMAGE FORMING APPARATUS AND COMPUTER PROGRAM PRODUCT

CROSS-REFERENCE TO RELATED APPLICATIONS

The present application claims priority to and incorporates by reference the entire contents of Japanese Patent Application No. 2011-167411 filed in Japan on Jul. 29, 2011 and Japanese Patent Application No. 2012-132058 filed in Japan on Jun. 11, 2012.

BACKGROUND OF THE INVENTION

1. Field of the Invention

The present embodiment relate to a color measuring device, an image forming apparatus and a program.

2. Description of the Related Art

In an image forming apparatus such as a printer, processing called "color management" is performed to suppress the variability of outputs due to device-specific characteristics and enhance the reproducibility of the outputs with respect to inputs. The color management is performed in the following steps, for example. First, an image of a reference color chart (or patch) is actually output by an image forming apparatus (in the following, a patch output by an image forming apparatus as an image is referred to as "patch image"), and a color measuring device performs color measurement on this patch image. A color conversion parameter is generated based on a difference between a color measurement value of the color-measured patch image and a color specification value in a standard color space of the corresponding reference color, and this color conversion parameter is set in the image forming apparatus. After that, when outputting an image corresponding to input image data, the image forming apparatus performs color conversion on the input image data based on the set color conversion parameter and outputs an image based on the image data after the color conversion. By this means, the image forming apparatus can perform image output of high reproducibility in which the variability of outputs due to device-specific characteristics is suppressed.

In the above color management, as a measuring device to measure a patch image, a spectrum measurer is widely used. The spectrum measurer can acquire the spectral reflectivity for each wavelength and therefore perform color measurement with high accuracy. However, the spectrum measurer is an expensive device having many sensors and therefore it is demanded that color measurement with high accuracy can be performed using a cheaper device.

Examples of a method of realizing color measurement at a low cost include that a color measurement target is imaged as a subject by an imaging apparatus having an image sensor and the RGB values of the subject acquired by capturing an image are converted into color specification values in the standard color space. For example, Japanese Patent No. 3129502 discloses a technique of: providing a reference color chart as a comparison target of a subject in a position near the subject of a color measurement target; imaging the subject and the reference color chart by a color video camera at the same time; correcting RGB data of the subject using the RGB data of the reference color chart acquired by capturing an image; and converting the RGB data of the subject into color specification values in the standard color space.

However, in the technique disclosed in Japanese Patent No. 3129502, it is difficult to hold positional relations between a subject, a light source and a color video camera; image-capturing conditions vary every time when an image is captured; and therefore there is a problem that it is much difficult to perform accurate color measurement.

There is a need to provide a color measuring device, image forming apparatus and computer program product that can perform accurate color measurement.

SUMMARY OF THE INVENTION

It is an object of the present embodiments to at least partially solve the problems in the conventional technology.

According to an embodiment, a color measuring device includes: an image capturing unit; a reference chart; an illumination unit; a light quantity control unit; a generating unit; a storage unit; a correction unit; and a calculating unit. The image capturing unit is configured to output image data of an image-capturing range. The reference chart has multiple patches of different densities that are arranged in the image-capturing range. The illumination unit is configured to illuminate the image-capturing range. The light quantity control unit is configured to control a light quantity of the illumination unit. The generating unit is configured to generate first correction data based on image data of the multiple patches illuminated by a first light quantity and generate second correction data based on image data of the multiple patches illuminated by a second light quantity larger than the first light quantity. The storage unit is configured to store the first correction data and the second correction data. The correction unit is configured to correct image data of the reference chart and a color measurement target output from the image capturing unit, using the first correction data or the second correction data, in a case where the image capturing unit captures the reference chart and the color measurement target. The calculating unit is configured to calculate color measurement value of the color measurement target based on the corrected image data of the reference chart and the color measurement target.

According to another embodiment, an image forming apparatus includes: an image output unit; and a color measuring unit configured to perform color measurement on an output image output by the image output unit. The color measuring unit includes: an image capturing unit configured to output image data of an image-capturing range; a reference chart having multiple patches of different densities and arranged in the image-capturing range; an illumination unit configured to illuminate the image-capturing range; a light quantity control unit configured to control a light quantity of the illumination unit; a generating unit configured to generate first correction data based on image data of the multiple patches illuminated by a first light quantity and configured to generate second correction data based on image data of the multiple patches illuminated by a second light quantity larger than the first light quantity; a storage unit configured to store the first correction data and the second correction data; a correction unit configured to correct image data of the reference chart and the output image output from the image capturing unit, using the first correction data or the second correction data, in a case where the image capturing unit captures the reference chart and the output image; and a calculating unit configured to calculate color measurement value of the output image based on the corrected image data of the reference chart and the output image.

According to still another embodiment, a computer program product includes a non-transitory computer-usable medium having computer-readable program codes embodied in the medium for a computer. The computer includes: an image capturing unit configured to output image data of an image-capturing range; a reference chart having multiple patches of different densities and arranged in the image-capturing range; an illumination unit configured to illuminate the image-capturing range; a light quantity control unit configured to control a light quantity of the illumination unit; a storage unit configured to store first correction data and second correction data; a correction unit configured to correct image data of the reference chart and a color measurement target output from the image capturing unit, using the first correction data or the second correction data, in a case where the image capturing unit captures the reference chart and the color measurement target; and a calculating unit configured to calculate color measurement value of the color measurement target based on the corrected image data of the reference chart and the color measurement target. The program codes, when executed, causes the computer to execute: generating the first correction data based on image data of the multiple patches illuminated by a first light quantity; generating the second correction data based on image data of the multiple patches illuminated by a second light quantity larger than the first light quantity; and storing the first correction data and the second correction data in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a view for explaining an exemplary arrangement of a print head mounted on a carriage;

FIG. 4C is a plan view of a bottom surface of a housing seen in the X2 direction in FIG. 4A;

FIG. 5 is a view of a specific example of a reference chart;

FIG. 12 is a schematic view of first correction data and second correction data generated by a correction data generating unit;

FIG. 15 is a view illustrating an example of image data acquired by capturing a reference chart and a patch image of a color measurement target in a sensor unit at the same time;

FIG. 16 is a view explaining a specific example of a color measurement method of a patch image;

FIG. 17 is a view illustrating a conversion equation to perform conversion between an L*a*b value and an XYZ value;

FIG. 21 is a view illustrating an example of image data acquired by capturing a reference chart and a test pattern in a sensor unit at the same time;

FIG. 22 is a view illustrating a method of measuring main-scanning positional deviation in an image;

FIG. 23 is a view illustrating a method of measuring main-scanning positional deviation in an image;

FIG. 36 is a view illustrating a relation between an initial reference RGB value and a reference RGB value upon color measurement;

FIG. 37 is a view explaining basic color measurement processing; and

FIG. 38 is a view explaining basic color measurement processing.

DETAILED DESCRIPTION OF THE PREFERRED EMBODIMENTS

In the following, the preferred embodiments of a color measuring device, image forming device and computer program product will be described in detail. Here, although the embodiments described below exemplify an ink-jet printer as an example of an image forming apparatus, the present embodiments are widely applicable to various types of image forming apparatuses that output an image to a recording medium.

Figure 1:
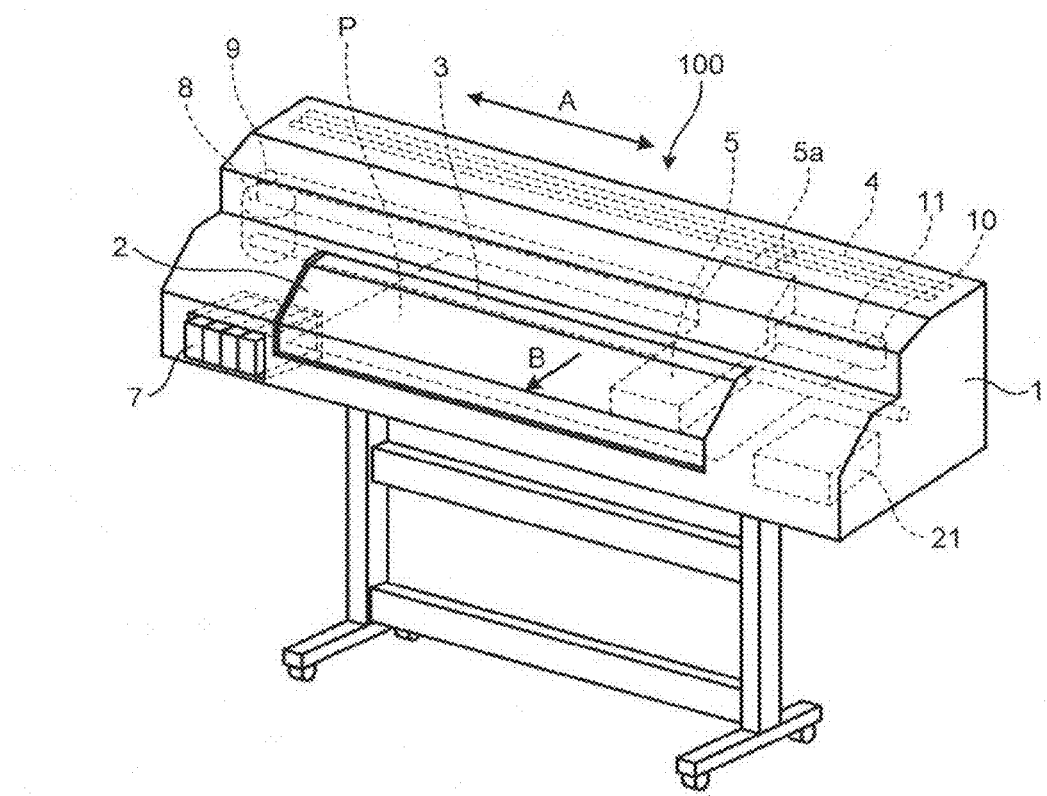
FIG. 1 is a perspective view illustrating the inside of an image forming apparatus in a see-through manner.
Figure 2:
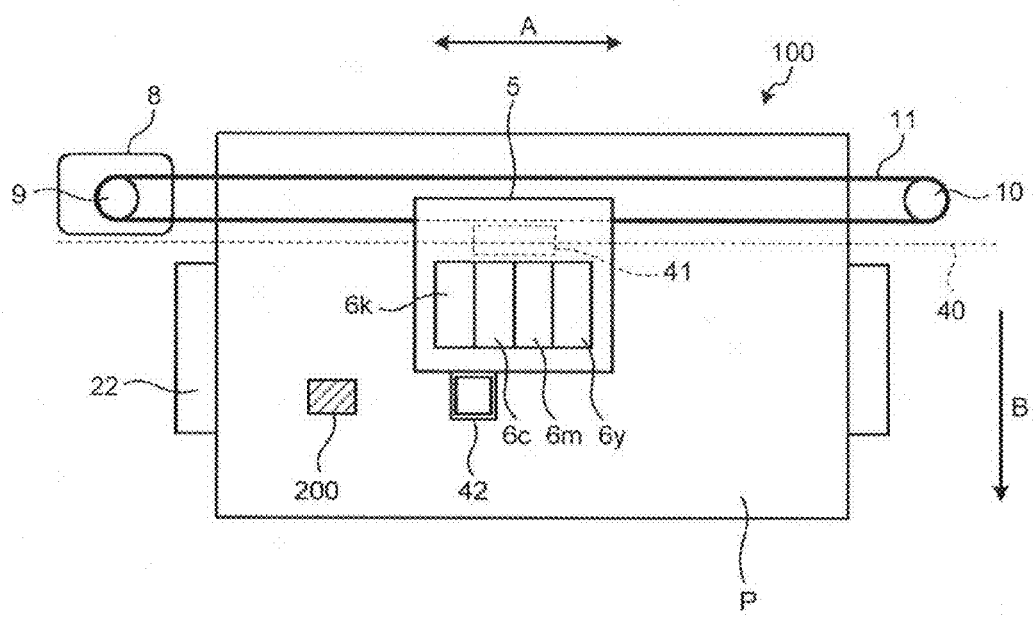
FIG. 2 is a top view of a mechanical configuration of the inside of the image forming apparatus.

A mechanical configuration of an image forming apparatus 100 according to the present embodiment will be described with reference to FIG. 1 to FIG. 3. FIG. 1 is a perspective view illustrating the inside of the image forming apparatus 100 according to the present embodiment in a see-through manner. FIG. 2 is a top view of the mechanical configuration of the inside of the image forming apparatus 100 according to the present embodiment. FIG. 3 is a view for explaining an exemplary arrangement of a print head 6 mounted on a carriage 5.

As illustrated in FIG. 1, the image forming apparatus 100 according to the present embodiment includes the carriage 5. The carriage 5 reciprocates in a main-scanning direction (direction of arrow A in FIG. 1), thereby forming an image on a recording medium P conveyed intermittently in a sub-scanning direction (direction of arrow B in FIG. 1). The carriage 5 is supported by a main guide rod 3 extending along the main-scanning direction. The carriage 5 is provided with a connection piece 5a. The connection piece 5a engages with a sub guide member 4 arranged in parallel with the main guide rod 3, and stabilizes the position of the carriage 5.

As illustrated in FIG. 2, the carriage 5 includes a print head 6y that ejects yellow (Y) ink, a print head 6m that ejects magenta (M) ink, a print head 6c that ejects cyan (C) ink, and a plurality of print heads 6k that eject black (Bk) ink (hereinafter, if the print heads 6y, 6m, 6c, and 6k are called collectively, the print heads are referred to as a print head 6). The print head 6 is mounted on the carriage 5 with an ejection surface (nozzle surface) facing downward (toward the recording medium P).

A cartridge 7 is an ink supplier for supplying ink to the print head 6. The cartridge 7 is not mounted on the carriage 5, but is arranged at a predetermined position in the image forming apparatus 100. The cartridge 7 and the print head 6 are connected by a pipe, which is not illustrated, and the cartridge 7 supplies ink to the print head 6 through the pipe.

The carriage 5 is connected to a timing belt 11 stretched across a driving pulley 9 and a driven pulley 10. The driving pulley 9 rotates by drive of a main-scanning motor 8. The driven pulley 10 has a mechanism for adjusting the distance between the driving pulley 9 and the driven pulley 10, and has a function to apply predetermined tension to the timing belt 11. The drive of the main-scanning motor 8 moves the timing belt 11, thereby causing the carriage 5 to reciprocate in the main-scanning direction. As illustrated in FIG. 2, for example, the movement of the carriage 5 in the main-scanning direction is controlled based on an encoder value. The encoder value is obtained by an encoder sensor 41 provided to the carriage 5 detecting a mark of an encoder sheet 40.

The image forming apparatus 100 according to the present embodiment includes a maintenance mechanism 21 for maintaining reliability of the print head 6. The maintenance mechanism 21 performs cleaning and capping for the ejection surface of the print head 6, ejection of unnecessary ink from the print head 6, and other operations.

As illustrated in FIG. 2, a platen 22 is arranged at a position facing the ejection surface of the print head 6. The platen 22 supports the recording medium P when the print head 6 ejects ink on the recording medium P. The image forming apparatus 100 according to the present embodiment is a wide apparatus in which the carriage 5 moves for a long distance in the main-scanning direction. Therefore, the platen 22 is formed of a plurality of plate members joined in the main-scanning direction (direction of movement of the carriage 5). The recording medium P is nipped by carriage rollers driven by a sub-scanning motor, which is not illustrated, and is conveyed intermittently in the sub-scanning direction on the platen 22.

The print head 6 includes a plurality of nozzle arrays. The print head 6 ejects ink from the nozzle arrays on the recording medium P conveyed on the platen 22, thereby forming an image on the recording medium P. In the present embodiment, to ensure a large width of an image that can formed on the recording medium P in one scanning of the carriage 5, the print heads 6 located upstream and the print heads 6 located downstream are mounted on the carriage 5 as illustrated in FIG. 3. Furthermore, the print heads 6k that eject black ink are mounted on the carriage 5 twice as many as the print heads 6y, 6m, and 6c that eject color ink. Furthermore, the print heads 6y and 6m are arranged side by side in a manner separated from each other. This configuration is employed for keeping order of colors superimposed during the reciprocation of the carriage 5 so as not to change the order of colors between the forward movement and the backward movement. The arrangement of the print head 6 illustrated in FIG. 3 is just an example, and the arrangement of the print head 6 is not limited thereto.

The components described above constituting the image forming apparatus 100 according to the present embodiment are arranged inside of an exterior body 1. The exterior body 1 is provided with a cover member 2 in an openable and closable manner. When maintenance of the image forming apparatus 100 is being done, or when a jam occurs, the cover member 2 is opened, making it possible to perform operations on the components arranged inside of the exterior body 1.

The image forming apparatus 100 according to the present embodiment conveys the recording medium P intermittently in the sub-scanning direction. The image forming apparatus 100 also causes the carriage 5 to move in the main-scanning direction while the conveyance of the recording medium P in the sub-scanning direction is stopped. At the same time, the image forming apparatus 100 ejects ink on the recording medium P placed on the platen 22 from the nozzle arrays of the print head 6 mounted on the carriage 5, thereby forming an image on the recording medium P.

In particular, to perform calibration for adjusting output characteristics of the image forming apparatus 100, the image forming apparatus 100 ejects ink on the recording medium P placed on the platen 22 from the nozzle arrays of the print head 6 mounted on the carriage 5. The image forming apparatus 100 forms a patch image 200 to be a target for color measurement on the recording medium P. The patch image 200 is an image obtained by the image forming apparatus 100 outputting a patch in a reference color, and reflects the output characteristics of the image forming apparatus 100. Therefore, the image forming apparatus 100 can output an image with high reproducibility by: generating a color conversion parameter based on difference between the colorimetric value of the patch image 200 and the color specification value of the reference color corresponding thereto in the standard color space; and by outputting an image based on image data on which color conversion is performed using the color conversion parameter.

The image forming apparatus 100 according to the present embodiment has a measuring device that performs color measurement on the patch image 200 output to the recording medium P. The measuring device has a color measuring camera 42 configured to simultaneously image the patch image 200 and a reference chart 400 described below, using, as a subject (photographic subject), the patch image 200 of a color measurement target formed on the recording medium P by the image forming apparatus 100. The color measuring device calculates a color measurement value of the patch image 200 based on image data of the patch image 200 and the reference chart 400 acquired by capturing an image in the color measuring camera 42. Here, this color measuring device has not only a function of calculating the color measurement value of the patch image 200 but also a function of calculating a positional deviation amount of an image output from the image forming apparatus 100 using the image data acquired by capturing an image in the color measuring camera 42.

As illustrated in FIG. 2, the color measuring camera 42 is fixed and provided with respect to the carriage 5 and reciprocated together with the carriage 5 in the main-scanning direction. The color measuring camera 42 uses the image formed on the recording medium P (or the patch image 200 of the color measurement target at the time of performing color measurement on the patch image 200) as a subject, and, when it moves to a position facing the subject, the color measuring camera 42 captures the subject and the reference chart 400 of the comparison target at the same time. Here, to capture images at the same time means to acquire image data of one frame including the subject and the reference chart 400. That is, even if there is a time difference in the data acquisition of each pixel, by acquiring image data including the subject and the reference chart 400 in one frame, it means that the subject and the reference chart 400 are imaged at the same time.

Specific Example of Color Measuring Camera

Figure 4A:
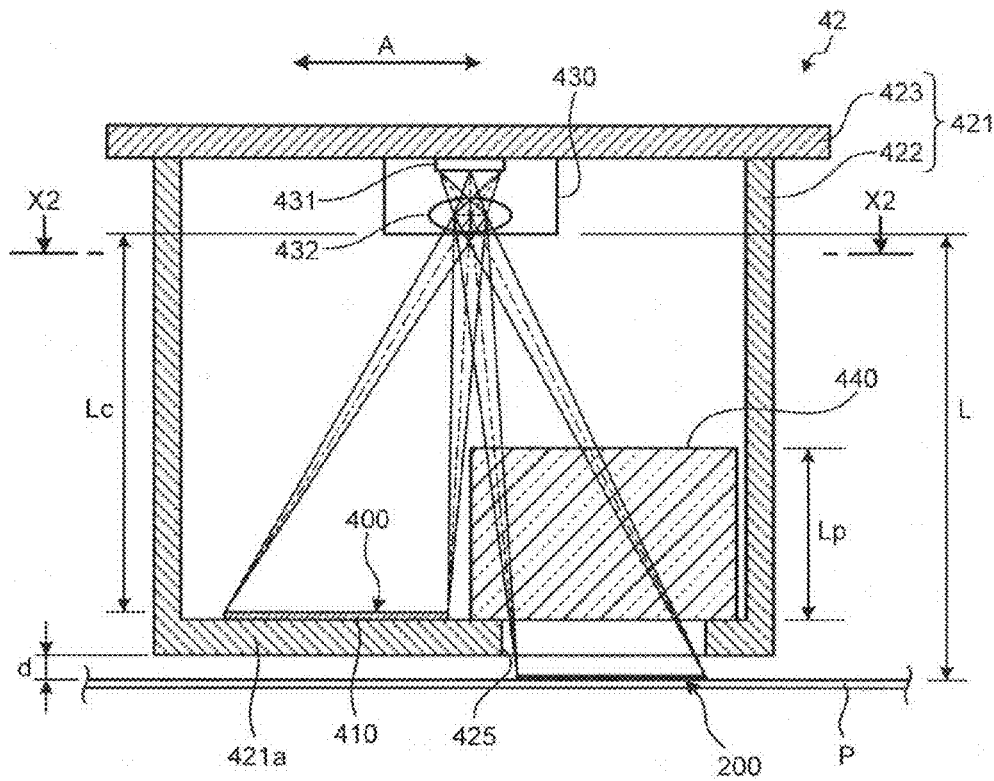
FIG. 4A is a vertical cross-sectional view of a color measuring camera (i.e. a cross-sectional view of the X1-X1 line in FIG. 4B)
Figure 4B:
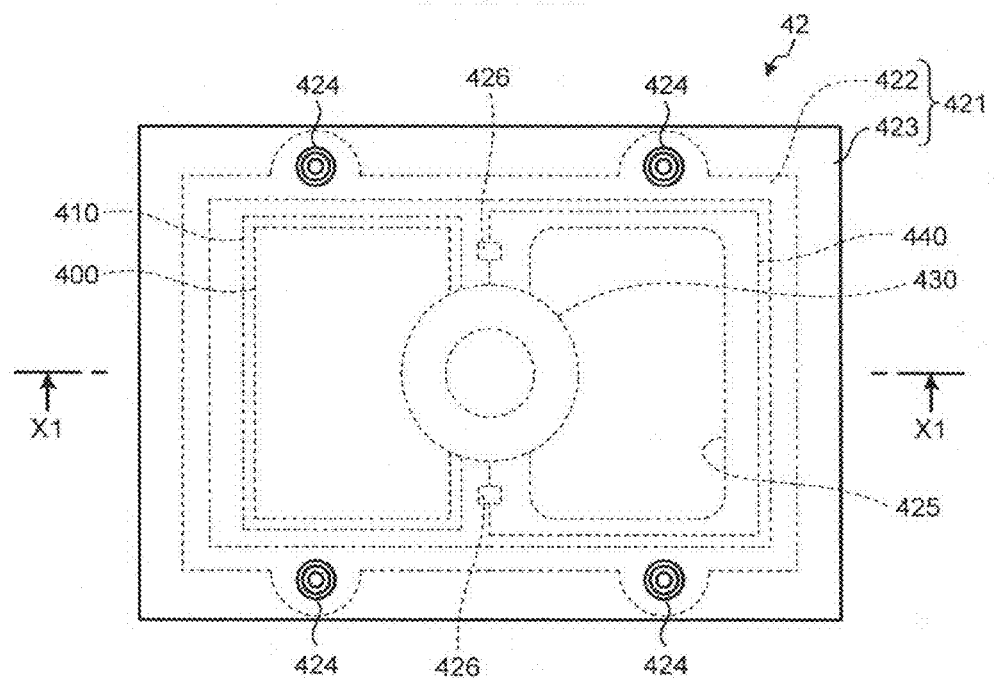
FIG. 4B is a top view seeing through and illustrating the inside of the color measuring camera.

Next, with reference to FIGS. 4A to 4C, a specific example of the color measuring camera 42 will be described in detail. FIGS. 4A to 4C are views illustrating specific examples of the color measuring camera 42, where FIG. 4A is a vertical cross-sectional view of the color measuring camera 42 (i.e. a cross-sectional view of the X1-X1 line in FIG. 4B), FIG. 4B is a top view seeing through and illustrating the inside of the color measuring camera 42 and FIG. 4C is a plan view of a bottom surface of a housing seen from the X2 direction in FIG. 4A.

The color measuring camera 42 has a housing 421 configured by combining a frame body 422 and a board 423. The frame body 422 is formed in a pipe shape having a bottom in which one end side corresponding to the upper surface of the housing 421 is opened. The board 423 is fastened to the frame body 422 by a fastener member 424 and integrated with the frame body 422 so as to close the opening end of the frame body 422 and configure the upper surface of the housing 421.

The housing 421 is fixed to the carriage 5 with a bottom surface 421a facing the recording medium P on the platen 22 with a predetermined gap d interposed therebetween. The bottom surface 421a of the housing 421 facing the recording medium P has an opening 425. The opening 425 allows the subject (patch image 200) formed on the recording medium P to be captured from the inside of the housing 421.

In the inside of the housing 421, a sensor unit 430 to capture an image is provided. The sensor unit 430 includes: a two-dimensional image sensor 431 such as a CCD sensor and a CMO sensor; and an imaging lens 432 that forms an optical image in an image-capturing range of the sensor unit 430, on a sensor surface of the two-dimensional image sensor 431. The two-dimensional image sensor 431 is mounted on, for example, the internal surface (i.e. component mounting surface) of the board 423 such that the sensor surface faces the side of the bottom surface 421a of the housing 421. The imaging lens 432 is fixed in a state where its position with respect to the two-dimensional image sensor 431 is determined so as to hold a positional relation determined based on the optical characteristics.

On the internal surface side facing the sensor unit 430 of the bottom surface 421a of the housing 421, a chart plate 410, in which the reference chart 400 is formed, is arranged so as to be adjacent to the opening 425 provided on the bottom surface 421a. The chart plate 410 is bonded to the internal surface side of the bottom surface 421a of the housing 421 by an adhesive bond or the like, using an opposite surface to the surface on which the reference chart 400 is formed, as an adhesive surface; and the chart plate 410 is held in a state where it is fixed to the housing 421. The reference chart 400 is imaged together with a subject (i.e. patch image 200) by the sensor unit 430, as a comparison target of the subject (i.e. patch image 200). That is, the sensor unit 430 captures the subject (i.e. patch image 200) outside the housing 421 via the opening 425 provided on the bottom surface 421a of the housing 421 and captures the reference chart 400 on the chart plate 410 provided on the internal surface side of the bottom surface 421a of the housing 421 at the same time. Also, the reference chart 400 will be described later in detail.

Also, in the inside of the housing 421, a light path length change member 440 is arranged. The light path length change member 440 is an optical element that has a refractive index "n" (where "n" is an arbitrary number) and transmits light. The light path length change member 440 is arranged in a light path between the subject (i.e. patch image 200) outside the housing 421 and the sensor unit 430, and has a function of causing an imaging surface of an optical image of the subject (i.e. patch image 200) to approach an imaging surface of an optical image of the reference chart 400. That is, in the color measuring camera 42 of the present embodiment, by arranging the light path length change member 440 in the light path between the subject (i.e. patch image 200) and the sensor unit 430, the imaging surface of the optical image of the subject (i.e. patch image 200) outside the housing 421 and the imaging surface of the reference chart 400 inside the housing 421 are both fitted to the sensor surface of the two-dimensional image sensor 431 of the sensor unit 430. Also, although FIG. 4A illustrates an example where the light path length change member 440 is placed on the bottom surface 421a of the housing 421, the light path length change member 440 does not have to be necessarily placed on the bottom surface 421a, and an essential requirement is that the light path length change member 440 is placed in a light path between the subject (i.e. patch image 200) outside the housing 421 and the sensor unit 430.

When light passes through the light path length change member 440, the light path length extends according to the refractive index "n" of the light path length change member 440 and an image is seen as if it floats. An image float amount C can be calculated in the following equation, with the presumption that a length in the optical axis direction of the light path length change member 440 is "Lp".

$$C = Lp(1 - 1/n)$$

Also, when a distance between the principal point of the imaging lens 432 of the sensor unit 430 and the reference chart 400 is Lc, a distance L between the principal point of the imaging lens 432 and a front-side focal plane (i.e. imaging area) of an optical image going through the light path length change member 440, can be calculated by the following equation.

$$L = Lc + Lp(1 - 1/n)$$

Here, when the refractive index "n" of the light path length change member 440 is 1.5, equation $L = Lc + Lp(1/3)$ is used to calculate, and it is possible to lengthen a light path length of the optical image going through the light path length change member 440, by one-third of a length Lp in the optical axis direction of the light path length change member 440. In this case, for example, when Lp=9 [mm] is presumed, since L=Lc+3 is established, by capturing an image in a state where a difference between the distance from the sensor unit 430 to the reference chart 400 and the distance from the sensor unit 430 to the subject (i.e. patch image 200) is 3 mm, it is possible to fit the rear-side focal plane (i.e. imaging surface) of the optical image of the reference chart 400 and the rear-side focal plane (i.e. imaging surface) of the optical image of the subject (i.e. patch image 200) to the sensor surface of the two-dimensional image sensor 431 of the sensor unit 430.

The housing 421 also houses an illumination light source 426 that illuminates the subject (patch image 200) and the reference chart 400 when the sensor unit 430 captures the subject (patch image 200) and the reference chart 400 simultaneously. A light-emitting diode (LED) is used as the illumination light source 426, for example. In the present embodiment, two LEDs are used as the illumination light source 426. The two LEDs used as the illumination light source 426 are mounted on the inner surface of the board 423 together with the two-dimensional image sensor 431 of the sensor unit 430, for example. However, the illumination light source 426 only needs to be arranged at a position where the illumination light source 426 can illuminate the subject (patch image 200) and the reference chart 400. Therefore, the illumination light source 426 is not necessarily mounted on the board 423 directly.

In the present embodiment, as illustrated in FIG. 4B, the two LEDs used as the illumination light source 426 are arranged as follows: the projected positions of the two LEDs on the bottom surface 421a vertically viewed from the board 423 side to the bottom surface 421a side of the housing 421 are within an area between the opening 425 and the reference chart 400; and the projected positions are symmetrically arranged with respect to the sensor unit 430. In other words, a line obtained by connecting the two LEDs used as the illumination light source 426 passes through the center of the imaging lens 432 of the sensor unit 430. In addition, the opening 425 provided to the bottom surface 421a of the housing 421 and the reference chart 400 are arranged at line-symmetric positions with respect to the line obtained by connecting the two LEDs. By arranging the two LEDs used as the illumination light source 426 in this manner, it is possible to illuminate the subject (patch image 200) and the reference chart 400 under nearly the same conditions.

To illuminate the subject (patch image 200) outside of the housing 421 under the same illumination conditions as those for the reference chart 400 arranged inside of the housing 421, it is necessary to illuminate the subject (patch image 200) only with the illumination light from the illumination light source 426 while preventing the subject (patch image 200) from being irradiated with outside light when the sensor unit 430 captures the subject (patch image 200). To prevent the subject (patch image 200) from being irradiated with outside light, it is effective that the gap d between the bottom surface 421a of the housing 421 and the recording medium P is made small such that the housing 421 blocks outside light toward the subject (patch image 200). However, if the gap d between the bottom surface 421a of the housing 421 and the recording medium P is made too small, the recording medium P may come into contact with the bottom surface 421a of the housing 421. As a result, there is a possibility that the image fails to be captured properly. Therefore, in consideration of the planarity of the recording medium P, it is preferable that the gap d between the bottom surface 421a of the housing 421 and the recording medium P be set to a small value within the range where the recording medium P does not come into contact with the bottom surface 421a of the housing 421. If the gap d between the bottom surface 421a of the housing 421 and the recording medium P is set to approximately 1 millimeter to 2 millimeters, for example, the recording medium P does not come into contact with the bottom surface 421a of the housing 421. In addition, it is possible to effectively prevent the subject (patch image 200) formed on the recording medium P from being irradiated with outside light.

To irradiate the subject (patch image 200) with the illumination light from the illumination light source 426 properly, it is preferable that the size of the opening 425 provided to the bottom surface 421a of the housing 421 be made larger than that of the subject (patch image 200). With such a configuration, no shadow generated by an edge of the opening 425 blocking the illumination light is projected on the subject (patch image 200).

Specific Example of Reference Chart

Next, with reference to FIG. 5, the reference chart 400 on the chart plate 410 arranged inside the housing 421 of the color measuring camera 42 will be described in detail. FIG. 5 is a view of a specific example of the reference chart 400.

The reference chart 400 illustrated in FIG. 5 has multiple reference patch arrays 401 to 404 for color measurement in which patches for color measurement are arranged, a dot diameter measurement pattern array 406, a distance measurement line 405, and chart position specification markers 407.

The reference patch arrays 401 to 404 include the patch array 401 in which patches in primary colors of YMC are arranged in order of scale, the patch array 402 in which patches in secondary colors of RGB are arranged in order of scale, the patch array (achromatic scale patterns) 403 in which patches of a gray scale are arranged in order of scale, and the patch array 404 in which patches in tertiary colors are arranged. The dot diameter measurement pattern array 406 is a pattern array for geometric configuration measurement in which circular patterns in different sizes are arranged in order of size.

The distance measurement line 405 is formed as a rectangular frame border surrounding the multiple reference patch arrays 401 to 404 and the dot diameter measurement pattern array 406. The chart position specification markers 407 are markers provided at four corners of the distance measurement line 405 to specify each patch position. By specifying the distance measurement line 405 and the chart position specification markers 407 at four corners from image data of the reference chart 400 acquired by capturing an image in the color measuring camera 42, it is possible to specify the position of the reference chart 400 and the position of each pattern.

Each patch forming the reference patch arrays 401 to 404 for color measurement is used as a specific color criterion reflecting image-capturing conditions at the time the color measuring camera 42 captures an image.

The configuration of the reference patch arrays 401 to 404 for color measurement arranged in the reference chart 400 is not limited to the arrangement example illustrated in FIG. 5, and an arbitrary patch array can be used. For example, patches capable of specifying the color range as wide as possible may be used, and the patch array 401 in the primary colors of YMCK or the patch array 403 of the gray scale may be formed with patches having the color measurement values of the ink used in the image forming apparatus 100. Also, the patch array 402 in the secondary colors of RGB of the reference chart 400 may be formed with patches having the color measurement values capable of being produced by the ink used in the image forming apparatus 100, and, furthermore, it may be possible to use a standard color chart for which color measurement values are defined, such as Japan Color.

The reference chart 400 is arranged in the bottom surface 421a of the housing 421 of the color measuring camera 42 so as to be adjacent to the opening 425, and therefore it is possible to image it and a subject such as the patch image 200 by the sensor unit 430 at the same time.

Schematic Configuration of Control mechanism of Image Forming Apparatus

Figure 6:
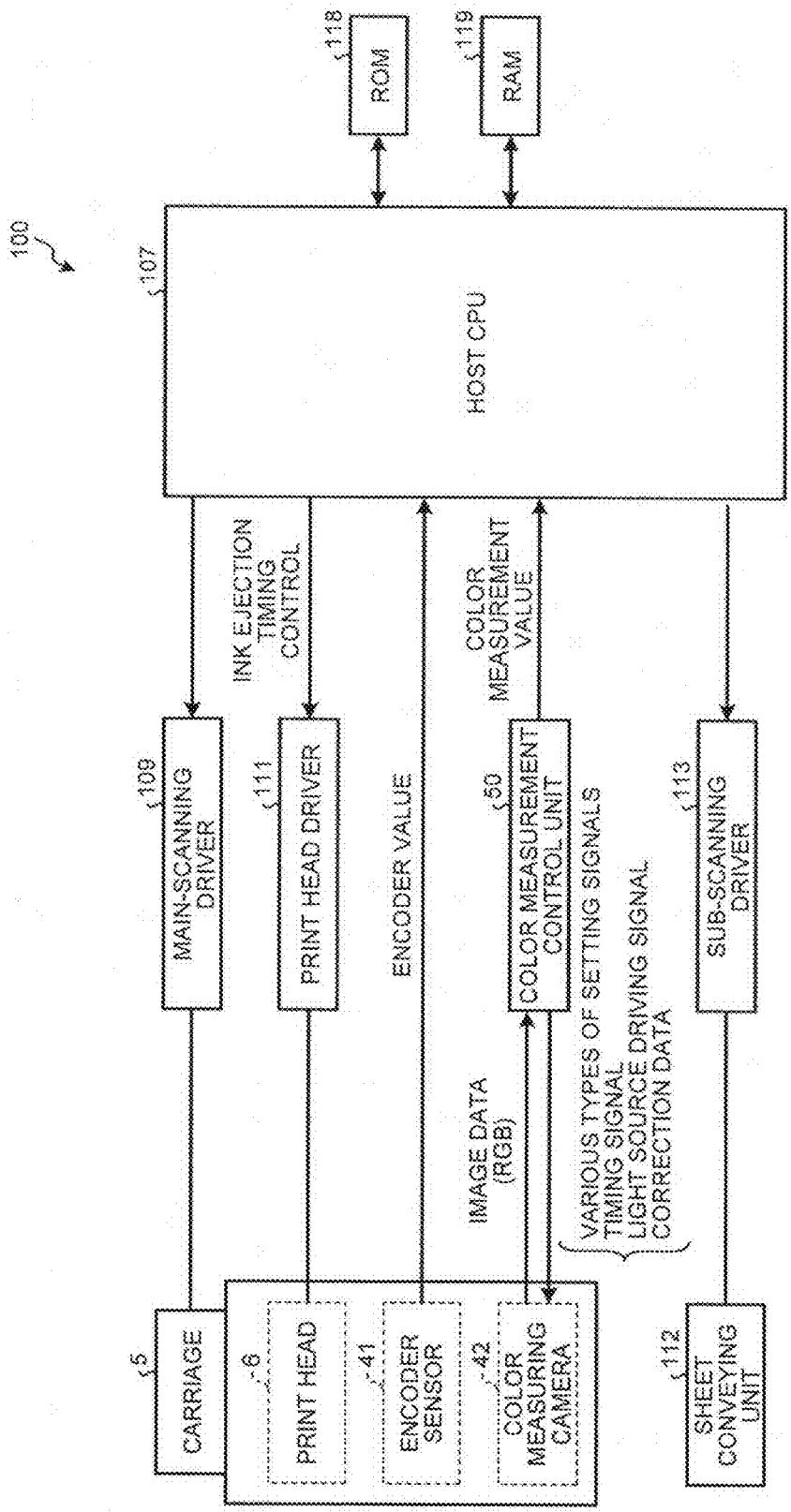
FIG. 6 is a block diagram of a schematic configuration of a control mechanism of the image forming apparatus.

Next, a schematic configuration of a control mechanism of the image forming apparatus 100 according to the present embodiment will be described with reference to FIG. 6. FIG. 6 is a block diagram illustrating the schematic configuration of the control mechanism of the image forming apparatus 100.

The control mechanism of the image forming apparatus 100 according to the present embodiment includes a host CPU 107, a ROM 118, a RAM 119, a main-scanning driver 109, a print head driver 111, a color measurement control unit 50, a sheet conveying unit 112, a sub-scanning driver 113, the print head 6, the encoder sensor 41 and the color measuring camera 42. The print head 6, the encoder sensor 41, and the color measuring camera 42 are mounted on the carriage 5 as described above.

The host CPU 107 supplies data of an image to be formed on the recording medium P and a drive control signal (pulse signal) to each driver, and controls the whole of the image forming apparatus 100. Specifically, the host CPU 107 controls drive of the carriage 5 in the main-scanning direction via the main-scanning driver 109. The host CPU 107 controls the ink ejection timing of the print head 6 via the print head driver 111. The host CPU 107 controls drive of the sheet conveying unit 112 including carriage rollers 15 and a sub-scanning motor 17 via the sub-scanning driver 113.

The encoder sensor 41 outputs an encoder value obtained by detecting a mark of the encoder sheet 40 to the host CPU 107. Based on the encoder value from the encoder sensor 41, the host CPU 107 controls drive of the carriage 5 in the main-scanning direction via the main-scanning driver 109.

As described above, the color measuring camera 42 captures the reference chart 400 arranged inside the housing 421 and the patch image 200 formed on the recording medium P by the sensor unit 430 at the same time and outputs image data of the reference chart 400 and the patch image 200 to the color measurement control unit 50.

Based on the image data of the reference chart 400 and the patch image 200 acquired from the color measuring camera 42, the color measurement control unit 50 calculates the color measurement value of the patch image 200 (i.e. color specification value in the standard color space). The color measurement value of the patch image 200 calculated by the color measurement control unit 50 is transmitted to the host CPU 107. The color measurement control unit 50 and the color measuring camera 42 form the color measuring device according to the present embodiment.

The color measurement control unit 50 supplies various types of setting signals, a timing signal, a light source driving signal, and the like to the color measuring camera 42, and controls image capturing performed by the color measuring camera 42. The various types of setting signals include a signal for setting an operation mode of the sensor unit 430, and a signal for setting image-capturing conditions such as the shutter speed and gain in AGC. The color measurement control unit 50 acquires these setting signals from the host CPU 107 and supplies the signals to the color measuring camera 42. The timing signal is a signal for controlling the timing of image capturing performed by the sensor unit 430 and the light source driving signal is a signal for controlling drive of the illumination light source 426 that illuminates the image-capturing range of the sensor unit 430. The color measurement control unit 50 generates the timing signal and the light source driving signal, and supplies these signals to the color measuring camera 42.

Also, as correction data used for gamma correction (i.e. correction to compensate the linearity of sensitivity with respect to the brightness of the sensor unit 430) implemented in the color measuring camera 42, the color measurement control unit 50 generates first correction data used in the case of performing gamma correction on image data acquired by capturing an image under illumination of a first light quantity and second correction data used in the case of performing gamma correction on image data acquired by capturing an image under illumination of a second light quantity greater than the first light quantity, and sends these to the color measuring camera 42. Also, specific configurations of the color measurement control unit 50 and the color measuring camera 42 will be described later in detail.

The ROM 118 stores therein a computer program of an operating process executed by the host CPU 107 and various types of control data, for example. The RAM 119 is used as a working memory for the host CPU 107.

Configuration of the Control Mechanism of the Color Measuring Device

Configuration of Control Mechanism of Color Measuring Device

Figure 7:
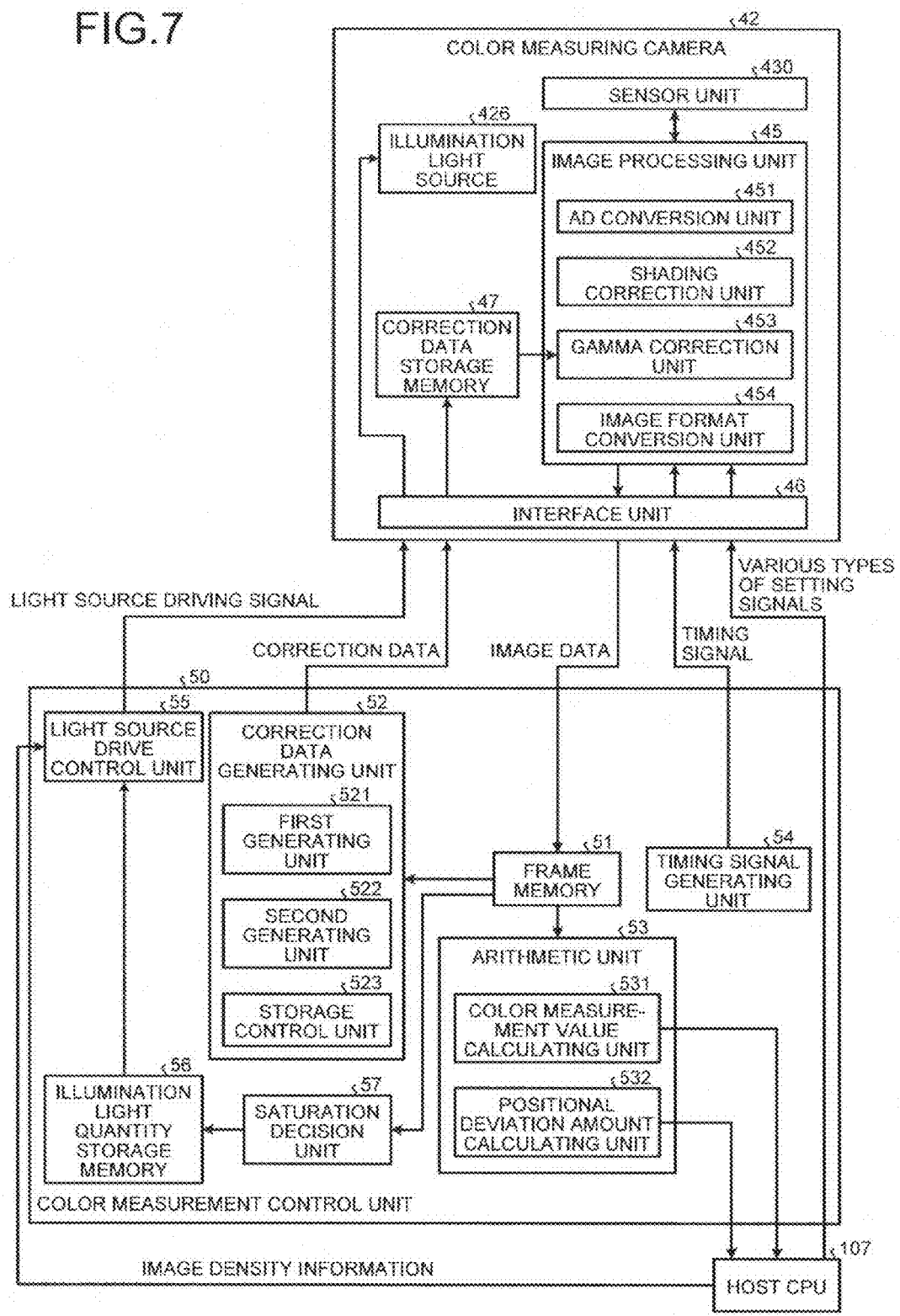
FIG. 7 is a block diagram of an exemplary configuration of a control mechanism of a color measuring device.

Next, a control mechanism of the color measuring device according to the present embodiment will be described in detail with reference to FIG. 7. FIG. 7 is a block diagram illustrating a configuration example of the control mechanism of the color measuring device according to the present embodiment.

The color measuring device according to the present embodiment includes the color measuring camera 42 and the color measurement control unit 50. The color measuring camera 42 includes an image processing unit 45, an interface unit 46 and a correction data storage memory (i.e. storage means) 47 in addition to the above sensor unit 430 and the illumination light source 426.

The image processing unit 45 processes image data captured by the sensor unit 430 and includes an AD conversion unit 451, a shading correction unit 452, a gamma correction unit (i.e. correction means) 453 and an image format conversion unit 454.

The AD conversion unit 451 converts an analog signal output by the sensor unit 430 into a digital signal.

The shading correction unit 452 corrects an error in the image data caused by unevenness in the illumination provided by the illumination light source 426 to the image-capturing range of the sensor unit 430.

The gamma correction unit 453 corrects image data acquired from the color measuring camera 42 using the first correction data or the second correction data stored in the correction data storage memory 47 so as to compensate the linearity of sensitivity with respect to the brightness of the sensor unit 430. In a case where the image data of the correction target is captured under illumination of the first light quantity, the gamma correction unit 453 corrects this image data using the first correction data. Also, in a case where the image data of the correction target is captured under illumination of the second light quantity, the gamma correction unit 453 corrects this image data using the second correction data.

The image format conversion unit 454 converts image data into an arbitrary format.

The interface unit 46 is an interface by which the color measuring camera 42 acquires the various types of setting signals, the timing signal, the light source driving signal, the first correction data and the second correction data supplied from the color measurement control unit 50 and by which the color measuring camera 42 transmits the image data to the color measurement control unit 50.

The correction data storage memory 47 is a memory to store the first correction data and the second correction data acquired from the color measurement control unit 50 via the interface unit 46. As described above, the first correction data and the second correction data stored in this correction data storage memory 47 are used in the gamma correction unit 453 to perform gamma correction for compensating the linearity of sensitivity with respect to the brightness of the sensor unit 430, on the image data acquired by capturing an image in the sensor unit 430.

The color measurement control unit 50 includes a frame memory 51, a correction data generating unit (i.e. generating means) 52, an arithmetic unit 53, a timing signal generating unit 54, a light source drive control unit (i.e. light quantity) 55, an illumination light quantity storage memory 56 and a saturation decision unit (decision means) 57.

The frame memory 51 is a memory to temporarily store the image data sent from the color measuring camera 42.

The correction data generating unit 52 generates the first correction data and the second correction data to be stored in the correction data storage memory 47 of the color measuring camera 42. The correction data generating unit 52 has, for example, a processor such as a CPU, and, by executing a predetermined program by this processor, realizes the functional configurations of a first generating unit 521, a second generating unit 522 and a storage control unit 523. Also, in the present embodiment, although the first generating unit 521, the second generating unit 522 and the storage control unit 523 of the correction data generating unit 52 are realized by software, part or all of these functional configurations can be realized using dedicated hardware such as an ASIC (Application Specific Integrated Circuit) and FPGA (Field-Programmable Gate Array).

The first generating unit 521 generates the above first correction data, based on image data of multiple patches of different densities such as the grayscale patch array 403 acquired by capturing the reference chart 400 illuminated by the above first light quantity.

The second generating unit 522 generates the above second correction data based on image data of multiple patches of different densities such as the grayscale patch array 403 acquired by capturing the reference chart 400 illuminated by the above second light quantity.

The storage control unit 523 causes the correction data storage memory 47 of the color measuring camera 42 to store the first correction data generated by the first generating unit 521 and the second correction data generated by the second generating unit 522. Also, a specific example of processing by the correction data generating unit 52 will be described later in detail.

The arithmetic unit 53 includes a color measurement value calculating unit (calculating means) 531 and a positional deviation amount calculating unit 532.

When the sensor unit 430 of the color measuring camera 42 captures the reference chart 400 arranged inside the housing 421 and the patch image 200 of a color measurement target at the same time, the color measurement value calculating unit 531 calculates the color measurement value of the patch image 200 based on the image data of the patch image 200 and the reference chart 400 acquired by the image capturing. The color measurement value of the patch image 200 calculated by the color measurement value calculating unit 531 is transmitted to the host CPU 107. Also, a specific example of processing by the color measurement value calculating unit 531 will be described later in detail.

When the image forming apparatus 100 according to the present embodiment outputs a predetermined image for positional deviation measurement to the recording medium P and when the sensor unit 430 of the color measuring camera 42 captures the reference chart 400 arranged inside the housing 421 and the image for positional deviation measurement output by the image forming apparatus 100 at the same time, the positional deviation amount calculating unit 532 calculates the amount of positional deviation in the image output by the image forming apparatus 100 based on the image data of the image for positional deviation measurement and the image data of the reference chart 400 acquired by the image capturing. The amount of positional deviation in the image calculated by the positional deviation amount calculating unit 532 is transmitted to the host CPU 107. A specific example of the processing performed by the positional deviation amount calculating unit 532 will be described later in detail.

The timing signal generating unit 54 generates a timing signal that controls the timing of image capturing performed by the sensor unit 430 of the color measuring camera 42, and supplies the timing signal to the color measuring camera 42.

The light source drive control unit 55 generates a light source driving signal for driving the illumination light source 426 of the color measuring camera 42, and supplies the light source driving signal to the color measuring camera 42. This light source drive control unit 55 has a function of controlling the light quantity of the illumination light source 426 that illuminates an image-capturing range of the sensor unit 430. For example, in a case where the sensor unit 430 captures the patch image 200 of the color measurement target output by the image forming apparatus 100 together with the reference chart 400, the light source drive control unit 55 acquires image density information indicating the density of the patch image 200 from the host CPU 107 and compares the density of the patch image 200 with a threshold defined in advance. Here, in a case where the density of the patch image 200 is equal to or less than the threshold, the light source drive control unit 55 performs drive control of the illumination light source 426 such that the light quantity of the illumination light source 426 equals to the above first light quantity. By contrast, in a case where the density of the patch image 200 is greater than the threshold, the light source drive control unit 55 performs drive control of the illumination light source 426 such that the light quantity of the illumination light source 426 equals to the above second light quantity. Also, it is possible to control the light quantity of the illumination light source 426 by changing the amount of current supplied to the illumination light source 426. Also, the image density information indicating the density of the patch image 200 may be generated by, for example, the host CPU 107 based on an L* value of a patch output as the patch image 200, and may be sent to the light source drive control unit 55 of the color measurement control unit 50.

The illumination light quantity storage memory 56 is a memory to store a first light quantity and second light quantity determined by processing in the saturation decision unit 57.

Among multiple patches of different densities such as the grayscale patch array 403 included in the reference chart 400, the saturation decision unit 57 decides the saturation of image data of the lowest density patch and the highest density patch, while changing the light quantity of the illumination light source 426 under control by the light source drive control unit 55. To be more specific, the saturation decision unit 57 decides whether the lowest density patch is saturated, while gradually decreasing the light quantity of the illumination light source 426 from a reference value. After that, a light quantity of the illumination light source 426 is searched in which the lowest density patch is not saturated, and this light quantity of the illumination light source 426 is stored in the illumination light quantity storage memory 56 as the first light quantity. Also, the saturation decision unit 57 decides whether the highest density patch is saturated, while gradually increasing the light quantity of the illumination light source 426 from a reference value. After that, a light quantity of the illumination light source 426 is searched in which the highest density patch is not saturated, and this light quantity of the illumination light source 426 is stored in the illumination light quantity storage memory 56 as the second light quantity.

Also, in the present embodiment, image data is saturated in a case where image data of a patch of a low density exceeds the maximum value in a scale range of image data (i.e. in a case where a white dot is caused); and, conversely, in a case where image data of a patch of a high density is less than the minimum value in the scale range of image data (i.e. in a case where a black dot is caused). That is, in the present embodiment, it is defined that image data is saturated in a state where the scale value of image data is limited by the maximum value and the minimum value in the scale range of image data.

Specific Example of Processing by Correction Data Generating Unit

Figure 8:
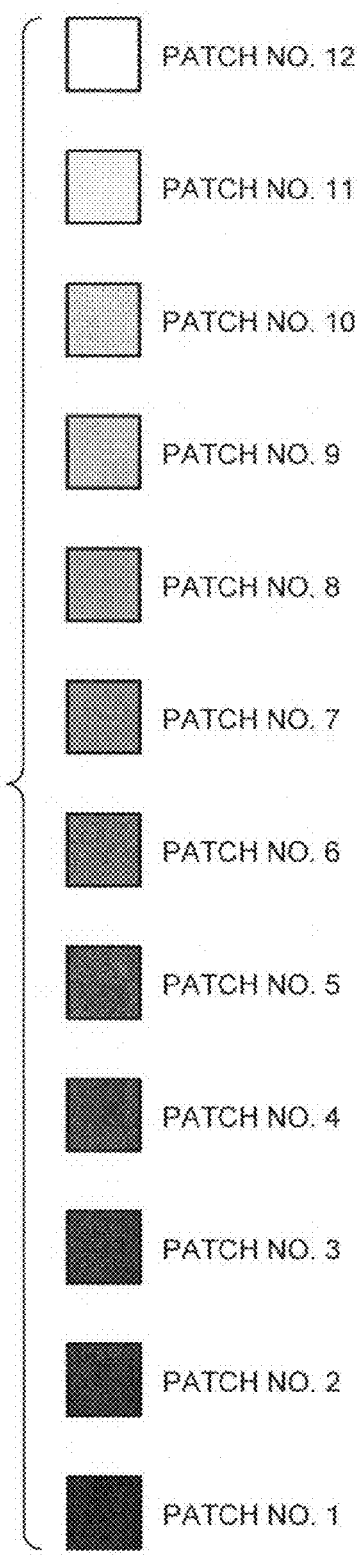
FIG. 8 is a view enlarging and illustrating a grayscale patch array included in the reference chart.
Figure 9:
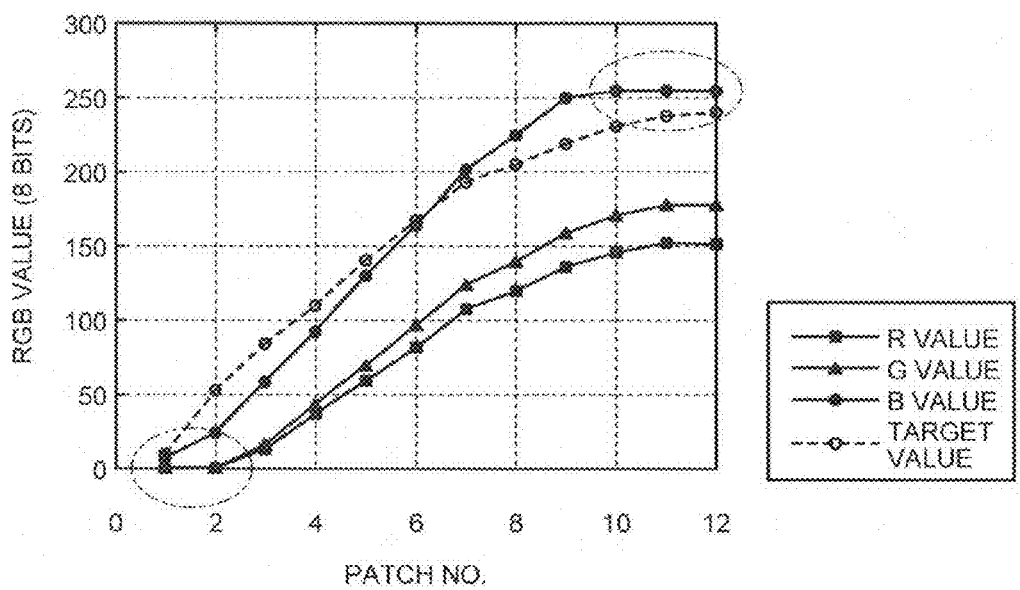
FIG. 9 is a view illustrating the RGB value of each patch of a grayscale patch array illuminated by certain light quantity.
Figure 10:
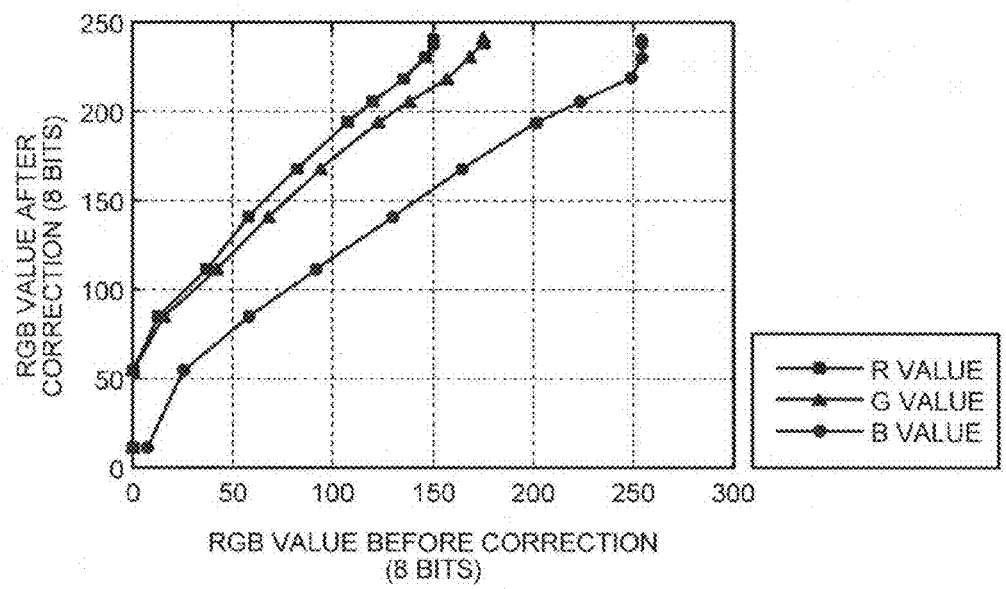
FIG. 10 is a view illustrating correction data to cause the RGB value of each patch illustrated in FIG. 9 to be a target value.
Figure 11:
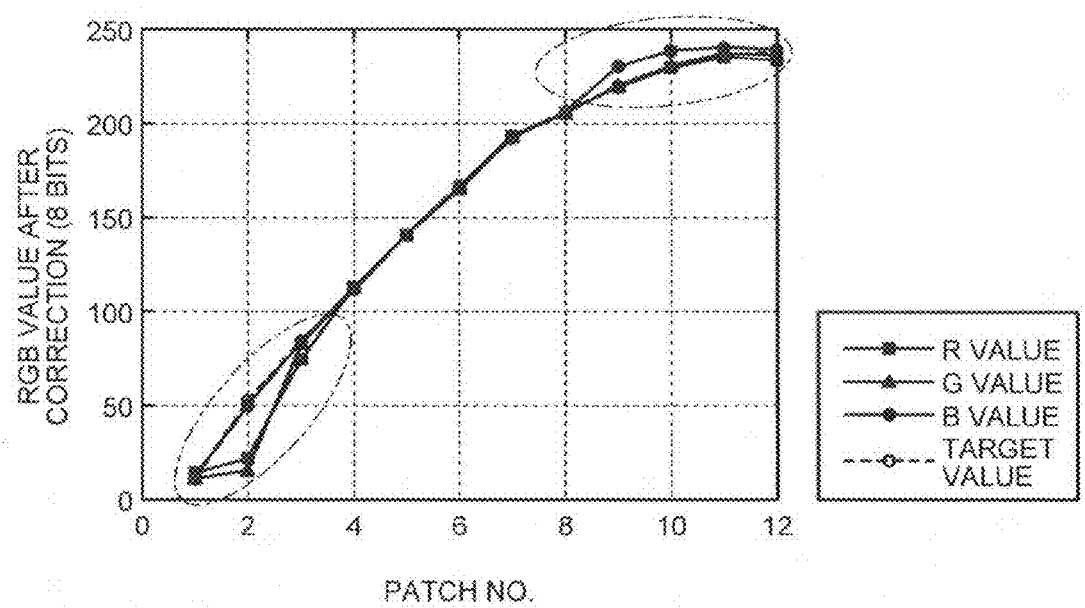
FIG. 11 is a view illustrating the RGB value of each patch corrected by using the correction data illustrated in FIG. 10.

Next, with reference to FIGS. 8 to 12, a specific example of processing by the correction data generating unit 52 of the color measurement control unit 50 will be explained. FIG. 8 is a view enlarging and illustrating the grayscale patch array 403 included in the reference chart 400. FIG. 9 is a view illustrating the RGB value of each patch of the grayscale patch array 403 illuminated by certain light quantity. FIG. 10 is a view illustrating correction data to cause the RGB value of each patch illustrated in FIG. 9 to be a target value. FIG. 11 is a view illustrating the RGB value of each patch corrected using the correction data illustrated in FIG. 10. FIG. 12 is a schematic view of the first correction data and the second correction data generated by the correction data generating unit 52.

As illustrated in FIG. 8, patch numbers 1 to 12 are assigned to the patches of the grayscale patch array 403 in order from a black patch of the maximum density (i.e. minimum brightness) to a white patch of the minimum density (maximum brightness). When the horizontal axis is provided along the patch numbers 1 to 12 and the vertical axis is provided along the RGB value of each patch acquired by image capturing in a state where light of a predetermined light quantity is illuminated, the graphs illustrated in FIG. 9 are acquired. The dotted-line graph in FIG. 9 is a graph indicating target values acquired by normalizing L* values of the patches of the patch numbers 1 to 12 so as to be equal to the scale range (here, 1 to 240 among 1 to 256 of 8-bit data) of image data (i.e. RGB values). Correction data to reduce a difference between the RGB value of each patch and the target value is correction data used for gamma correction in the above gamma correction unit 453. Also, the L*a*b* value is measured in advance for each patch of the reference chart 400, and therefore the L* values of the patches of the patch numbers 1 to 12 are known values.

The patches of the patch numbers 1 to 12 are the grayscale patch array 403, but the R value, G value and B value of each patch are not matched due to a spectral sensitivity characteristic of the sensor unit 430 of the color measuring camera 42 and a spectral sensitivity characteristic of the illumination light source 426; and, in the case of the present example, as illustrated in FIG. 9, the B value is higher than the R value and the B value. As illustrated in a chain-line frame in the figure, a low density area near the patch numbers 10 to 12 is in a state where the B value is saturated. Meanwhile, as illustrated in a chain-double-dashed-line frame in the figure, a high density area near the patch numbers 1 and 2 is in a state where the R value and the G value are saturated.

When correction data is generated from the RGB values and the target values illustrated in this FIG. 9, correction data as illustrated in FIG. 10 is acquired. As illustrated in FIG. 10, correction data with respect to the B value causes a rapid rise in the low density area; and correction data with respect to the R value and correction data with respect to the G value cause a rapid decay in the high density area. When the RGB value of each patch acquired by image capturing by the sensor unit 430 are corrected by the gamma correction unit 453 using the correction data illustrated in this FIG. 10, the result as illustrated in FIG. 11 is acquired. That is, as seen from this FIG. 11, the B value is apart from the target value in a low density area illustrated by a chain-line frame in the figure, the R value and the G value are apart from the target values in a high density area illustrated by a chain-double-dashed-line frame in the figure, and therefore it is not possible to correct the RGB values correctly.

Therefore, in the measuring device according to the present embodiment, the first generating unit 521 of the correction data generating unit 52 generates first correction data as illustrated in FIG. 12(*a*) based on the RGB values of the patches of the patch numbers 1 to 12 captured under illumination of the first light quantity in which the RGB values of the patches of the patch number 12 are not saturated. The correction data illustrated in FIG. 12(*a*) is correction data that can correct image data correctly in areas excluding a high density area, that is, from an intermediate density area to a low density area. Also, only one correction data is illustrated in FIG. 12(*a*), but, in a case where the R value, the G value and the B value are individually corrected in the gamma correction unit 453, the first generating unit 521 generates three items of first correction data supporting the R value, the G value, and the B value, respectively.

Also, in the measuring device according to the present embodiment, the second generating unit 522 of the correction data generating unit 52 generates second correction data as illustrated in FIG. 12(*b*) based on the RGB values of the patches of the patch numbers 1 to 12 captured under illumination of the second light quantity in which the RGB value of the patch of the patch number 1 is not saturated. The correction data illustrated in FIG. 12(*b*) is correction data that can correct image data correctly in areas excluding a low density area, that is, from an intermediate density area to a high density area. Also, only one correction data is illustrated in FIG. 12(*b*); but, in a case where the R value, the G value and the B value are individually corrected in the gamma correction unit 453, the second generating unit 522 generates three items of second correction data supporting the R value, the G value, and the B value, respectively.

In the measuring device according to the present embodiment, the storage control unit 523 of the correction data generating unit 52 causes the correction data storage memory 47 of the color measuring camera 42 to store the first correction data generated by the first generating unit 521 and the second correction data generated by the second generating unit 522.

Also, in the color measuring device according to the present embodiment, in a case where the gamma correction unit 453 corrects image data (i.e. RGB values) including the patch image 200 of a color measurement target captured under illumination of the first light quantity, the correction is performed using the first correction data stored in the correction data storage memory 47. Also, in a case where the gamma correction unit 453 corrects image data (i.e. RGB values) including the patch image 200 of a color measurement target captured under illumination of the second light quantity, the correction is performed using the second correction data stored in the correction data storage memory 47. By this means, over the entire area from the low density area to the high density area, it is possible to properly correct image data including the parch image 200 of a color measurement target.

Also, as described above, in a case where the density of the patch image 200 is equal to or less than a threshold defined in advance, the patch image 200 of the color measurement target is captured by the sensor unit 430 in a state where light of the first light quantity stored in the illumination light quantity storage memory 56 is illuminated under light quantity control of the illumination light source 426 by the light source drive control unit 55. Therefore, even if a difference is caused in the high density area of the image data by correcting the image data including the patch image 200 of the color measurement target using the first correction data, color measurement of the patch image 200 itself is not influenced. Also, in a case where the density of the patch image 200 is greater than a predetermined threshold, the patch image 200 of the color measurement target is captured by the sensor unit 430 in a state where light of the second light quantity stored in the illumination light quantity storage memory 56 is illuminated under light quantity control of the illumination light source 426 by the light source drive control unit 55. Therefore, even if a difference is caused in the low density area of the image data by correcting the image data including the patch image 200 of the color measurement target using the second correction data, color measurement of the patch image 200 itself is not influenced.

In the above example, regarding the R value, G value, and B value of the RGB value acquired by capturing each patch of the grayscale patch array 403, the first correction data and the second correction data to reduce differences from the target values are individually generated. Next, in the gamma correction unit 453, the R value, G value, and B value of image data including the patch image 200 of the color measurement target are individually corrected using the corresponding first correction data or second correction data. Therefore, by correction in the gamma correction unit 453, it is possible to simultaneously correct disruption of balance of the R value, the G value, and the B value due to a spectral sensitivity characteristic of the sensor unit 430 and a spectral sensitivity characteristic of a light source 244. That is, by correction in the gamma correction unit 453, it is possible to correct the white balance of image data at the same time, and therefore it is not necessary to separately install means for performing white balance correction.

Also, in a case where means for performing white balance correction is separately installed, common first correction data and second correction data may be generated for the R value, the G value, and the B value to perform gamma correction on image data including the patch image 200 of the color measurement target using one first correction data or second correction data.

Also, in the above example, first correction data and second correction data are generated using the RGB values acquired by capturing each patch of the grayscale patch array 403, but it is also possible to generate first correction data and second correction data using the RGB values of patches different from the patches of grayscale. For example, in the patch array 402 in the secondary colors of RGB, it is possible to generate first correction data and second correction data supporting the R value using the RGB values of the patch array of R, generate first correction data and second correction data supporting the G value using the RGB values of the patch array of G and generate first correction data and second correction data supporting the B value using the RGB values of the patch array of B.

Specific Example of Processing by Saturation Decision Unit

Figure 13:
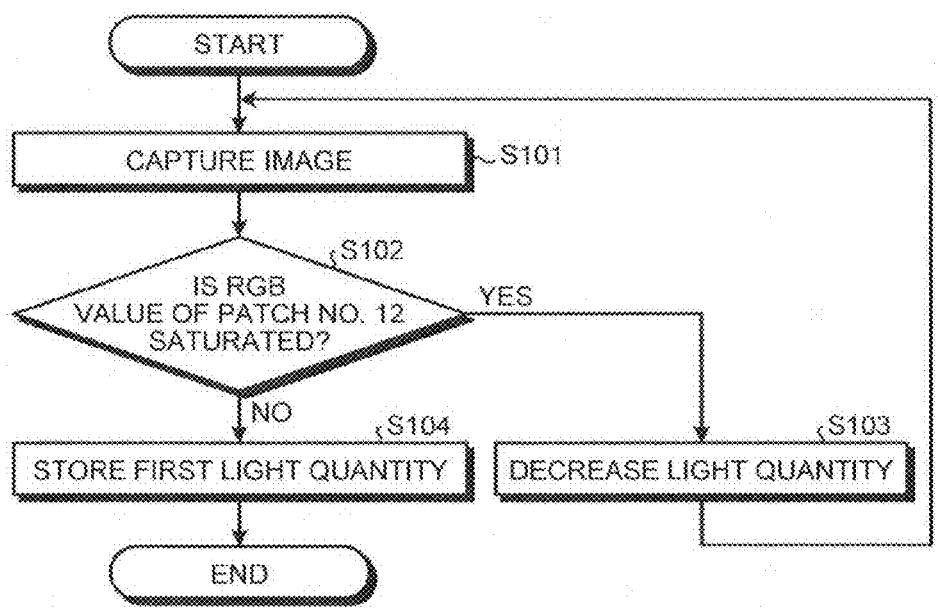
FIG. 13 is a flowchart illustrating processing steps of determining a first light quantity.
Figure 14:
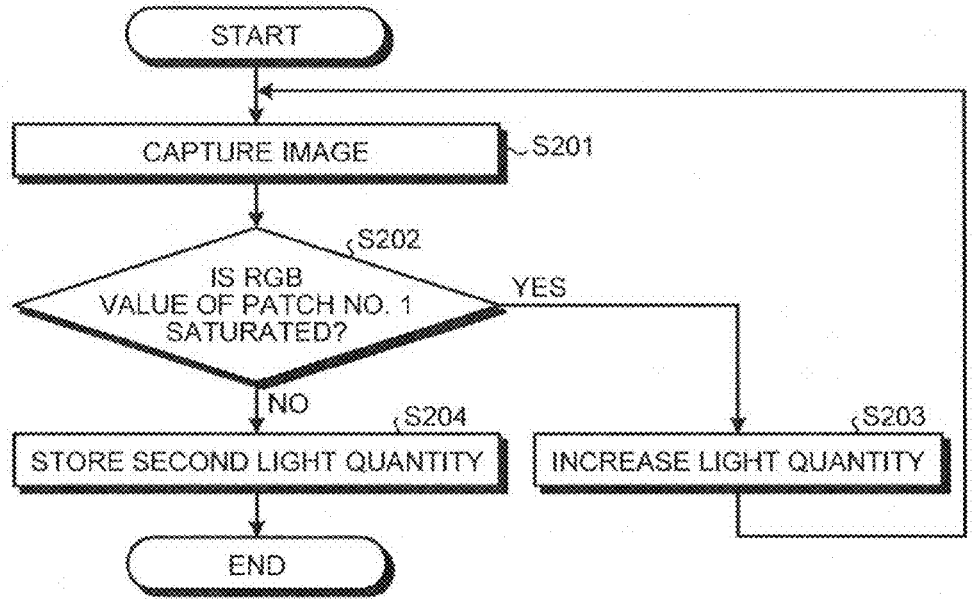
FIG. 14 is a flowchart illustrating processing steps of determining a second light quantity.

Next, a specific example of processing by the saturation decision unit 57 of the color measurement control unit 50 will be explained referring to FIGS. 13 and 14. FIG. 13 is a flowchart illustrating processing steps of determining a first light quantity in the saturation decision unit 57. FIG. 14 is a flowchart illustrating processing steps of determining a second light quantity in the saturation decision unit 57.

First, the processing of determining the first light quantity will be explained with reference to FIG. 13. At the start of the flowchart in FIG. 13, a light quantity of the illumination light source 426 is set to a reference light quantity determined in advance. First, an image including the reference chart 400 is captured by the sensor unit 430 under illumination of the reference light quantity (step S101).

Next, the saturation decision unit 57 uses the image data of the reference chart 400 acquired by the image capturing in step S101 and decides whether the RGB value of a patch of the patch number 12 (i.e. the lowest density patch) is saturated (step S102). For example, in a case where the RGB value of the patch of the patch number 12 is equal to or greater than a first threshold defined in advance and a difference between the RGB value of the patch of the patch number 12 and the RGB value of a patch of the patch number 11 (i.e. the second lowest density patch) is equal to or less than a second threshold defined in advance, the saturation decision unit 57 decides that the RGB value of the patch of the patch number 12 is saturated.

When it is decided in step S102 that the RGB value of the patch of the patch number 12 is saturated (step S102: Yes), the light quantity of the illumination light source 426 is decreased by a predetermined amount defined in advance (step S103). Next, the flow returns to step S101, an image including the reference chart 400 is captured by the sensor unit 430 under illumination of the light quantity decreased by the predetermined amount, and it is decided again whether the RGB value of the patch of the patch number 12 is saturated. After that, the above processing is repeated until it is decided that the RGB value of the patch of the patch number 12 is not saturated, and, when it is decided that the RGB value of the patch of the patch number 12 is not saturated (step S102: No), the light quantity of the illumination light source 426 at that time is stored in the illumination light quantity storage memory 56 as a first light quantity (step S104).

Next, the processing of determining the second light quantity will be explained with reference to FIG. 14. At the start of the flowchart in FIG. 14, similarly, a light quantity of the illumination light source 426 is set to the reference light quantity determined in advance. First, an image including the reference chart 400 is captured by the sensor unit 430 under illumination of the reference light quantity (step S201).

Next, the saturation decision unit 57 uses the image data of the reference chart 400 acquired by the image capturing in step S201 and decides whether the RGB value of a patch of the patch number 1 (i.e. highest density patch) is saturated (step S202). For example, in a case where the RGB value of the patch of the patch number 1 is equal to or less than a third threshold defined in advance and a difference between the RGB value of the patch of the patch number 1 and the RGB value of a patch of the patch number 2 (i.e. the second highest density patch) is equal to or less than a second threshold defined in advance, the saturation decision unit 57 decides that the RGB value of the patch of the patch number 1 is saturated.

When it is decided in step S202 that the RGB value of the patch of the patch number 1 is saturated (step S202: Yes), the light quantity of the illumination light source 426 is increased by a predetermined amount defined in advance (step S203). Next, the flow returns to step S201, an image including the reference chart 400 is captured by the sensor unit 430 under illumination of the light quantity increased by the predetermined amount, and it is decided again whether the RGB value of the patch of the patch number 1 is saturated. After that, the above processing is repeated until it is decided that the RGB value of the patch of the patch number 1 is not saturated, and, when it is decided that the RGB value of the patch of the patch number 1 is not saturated (step S202: No), the light quantity of the illumination light source 426 at that time is stored in the illumination light quantity storage memory 56 as a second light quantity (step S204).

Also, it may be possible to cause the illumination light quantity storage memory 56 to store the first light quantity and the second light quantity themselves or store a current value supplied to the illumination light source 426 to realize the first light quantity and a current value supplied to the illumination light source 426 to realize the second light quantity.

The above processing in the saturation decision unit 57 is implemented before shipment of the image forming apparatus according to the present embodiment, and default values of the first light quantity and the second light quantity are stored in the illumination light quantity storage memory 56. After that, the processing in the saturation decision unit 57 is implemented at a predetermined timing such as a timing of calibration of the color measuring camera 42, and, in a case where light quantities different from the default values are acquired as the first light quantity and the second light quantity, information stored in the illumination light quantity storage memory 56 is updated. By this means, even in a case where an optimal light quantity varies due to time degradation of components forming the color measuring camera 42, it is possible to deal with the change.

Color Measurement Method of Patch Image

Figure 18:
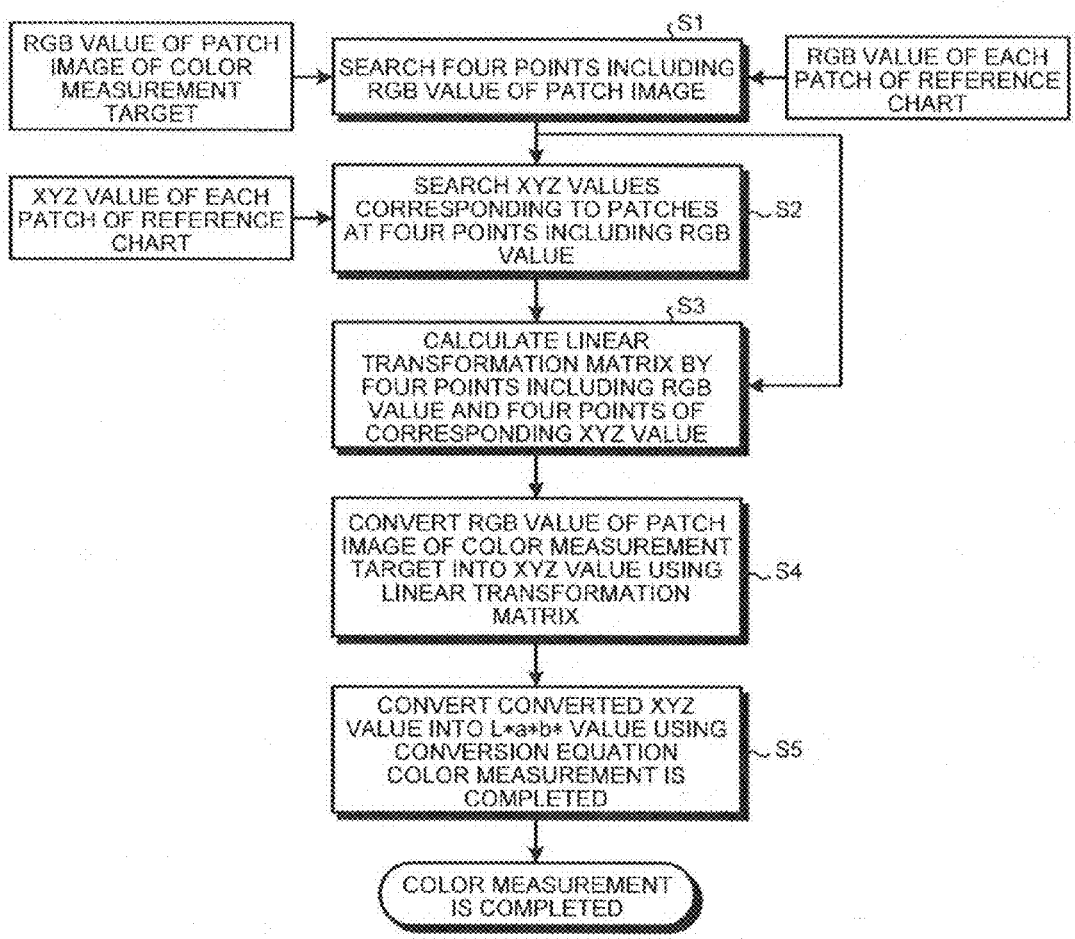
FIG. 18 is a flowchart illustrating color measurement steps for a patch image.
Figure 19:
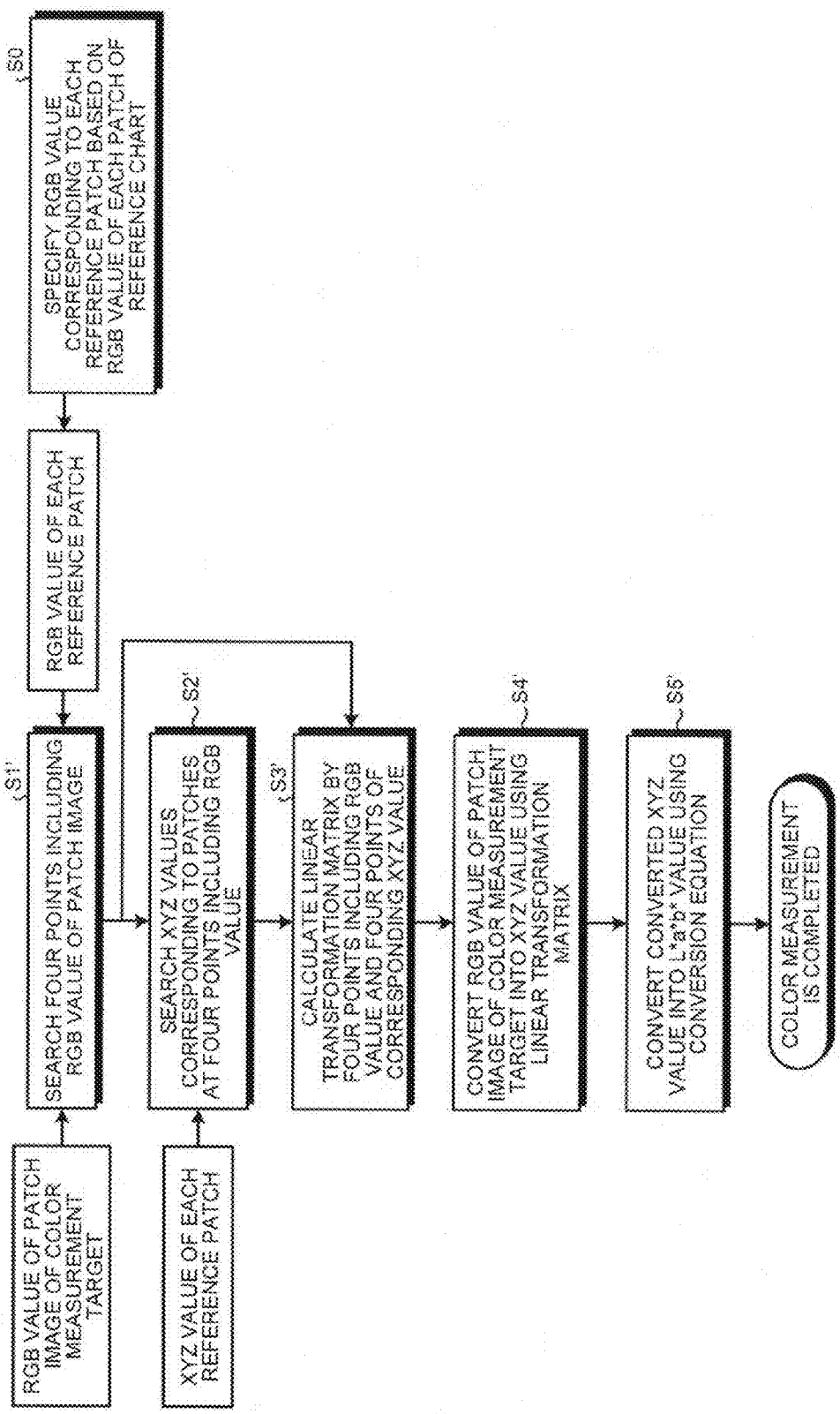
FIG. 19 is a flowchart illustrating a modification of color measurement steps for a patch image.
Figure 20:
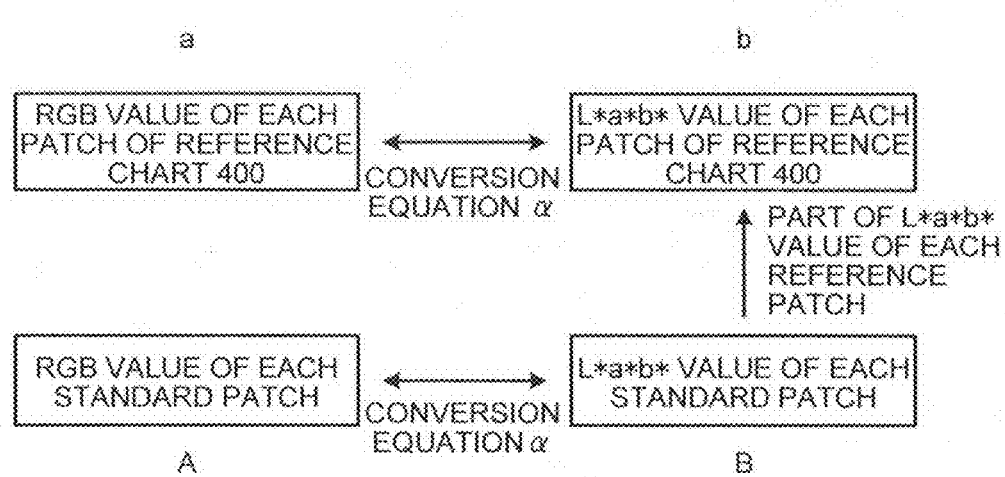
FIG. 20 is a view explaining a method of specifying an RGB value corresponding to the L*a*b* value of each standard patch.

Next, a specific example of the color measurement method of the patch image 200 using the color measuring device according to the present embodiment will be explained in detail with reference to FIGS. 15 to 20. FIG. 15 is a view illustrating an example of image data acquired by capturing the reference chart 400 and the patch image 200 of a color measurement target in the sensor unit 430 at the same time. FIG. 16 is a view explaining a specific example of a color measurement method of the patch image 200. FIG. 17 is a view illustrating a conversion equation to perform conversion between an L*a*b value and an XYZ value. FIG. 18 is a flowchart illustrating color measurement steps for the patch image 200. FIG. 19 is a flowchart illustrating a modification of color measurement steps for the patch image 200. FIG. 20 is a view explaining a method of specifying an RGB value corresponding to the L*a*b* value of each standard patch.

To perform color measurement on the patch image 200, first, the image forming apparatus 100 outputs an arbitrary patch to the recording medium P to form the patch image 200. Subsequently, the sensor unit 430 included in the color measuring camera 42 of the color measuring device captures the reference chart 400 arranged inside the housing 421 of the color measuring camera 42 and the patch image 200 of a color measurement target at the same time. As a result, the image data of the reference chart 400 and the patch image 200 as illustrated in FIG. 15 is acquired, for example. The image-capturing range of the sensor unit 430 has a reference chart capturing area in which the reference chart 400 is captured and a subject image-capturing area in which the patch image 200 serving as the subject of the color measurement target is captured. The image data output from the pixels corresponding to the reference chart capturing area is the image data of the reference chart 400 and the image data output from the pixels corresponding to the subject image-capturing area is the image data of the patch image 200. Here, although one patch image 200 alone is captured as the subject of the color measurement target, multiple patch images 200 may be captured at the same time.

After the image data of the reference chart 400 and the patch image captured by the sensor unit 430 is processed by the image processing unit 45, the image data is transmitted from the color measuring camera 42 to the color measurement control unit 50 via the interface unit 46 and stored in the frame memory 51 of the color measurement control unit 50. The color measurement value calculating unit 531 of the arithmetic unit 53 then reads the image data stored in the frame memory 51 and performs color measurement on the patch image 200.

First, by performing pattern matching or the like, the color measurement value calculating unit 531 specifies positions of the chart position specification markers 407 at four corners of the distance measurement line 405 in the reference chart 400, from the image data read from the frame memory 51. By this means, it is possible to specify the position of the reference chart 400 in the image data. After specifying the position of the reference chart 400, the position of each patch in the reference chart 400 is specified.

Next, the color measurement value calculating unit 531 uses the image data (i.e. RGB value) of each patch in the reference chart 400, thereby converting the image data (i.e. RGB value) of the patch image 200 of the color measurement target into an L*a*b* value serving as a color specification value in the L*a*b* color space. A specific method of this conversion will now be described in detail.

FIG. 16(c) illustrates the state achieved by plotting the L*a*b* value of each patch of the patch array 401 in the primary color (YMC) and the patch array 402 in the secondary color (RGB) in the reference chart 400 illustrated in FIG. 5 on the L*a*b* color space. Here, the L*a*b* value of each patch are calculated in advance as described above, and are stored in a non-volatile memory inside the color measurement control unit 50, for example.

In FIG. 16, (a) illustrates the state achieved by plotting the RGB value (image data obtained by image capturing of the sensor unit 430) of each patch of the patch array 401 in the primary color (YMC) and the patch array 402 in the secondary color (RGB) in the reference chart 400 illustrated in FIG. 5 on the RGB color space.

In FIG. 16, (b) illustrates the state achieved by converting the L*a*b* value illustrated in (c) of FIG. 16 into the XYZ value using a predetermined conversion equation, and by plotting the XYZ value thus converted on the XYZ color space. The L*a*b* value can be converted into the XYZ value by using the conversion equation illustrated as (b) in FIG. 17 (from Lab to XYZ). By contrast, the XYZ value can be converted into the L*a*b* value by using the conversion equation illustrated as (a) in FIG. 17 (from XYZ to Lab). In other words, the L*a*b* value illustrated in (c) of FIG. 16 and the XYZ value illustrated in (b) of FIG. 16 can be interconverted by using the conversion equations illustrated in FIG. 17.

Here, an explanation will be given to the process for converting the RGB value of the patch image 200 of the color measurement target acquired from the subject image-capturing area illustrated in FIG. 15, into the L*a*b* value with reference to the flowchart of FIG. 18. An assumption is made that the RGB value of the patch image 200 of the color measurement target is present on a point Prgb on the RGB color space (a) illustrated in FIG. 16. In this case, first, four points in the nearest neighborhood capable of forming a tetrahedron including the point Prgb are searched among the L*a*b* values of the patches in the reference chart 400 illustrated in FIG. 15 (step S1). In the example of (a) FIG. 16, four points p0, p1, p2, and p3 are selected. Here, it is assumed that the coordinates of the four points p0, p1, p2, and p3 in the RGB color space illustrated in (a) of FIG. 16 are represented by p0(x01, x02, x03), p1(x1, x2, x3), p2(x4, x5, x6) and p3(x7, x8, x9), respectively.

Next, four points q0, q1, q2 and q3 in the XYZ color space illustrated in)b) of FIG. 16 corresponding to the four points p0, p1, p2 and p3 in the RGB color space (a) illustrated in FIG. 16 are searched (step S2). It is assumed that the coordinates of the four points q0, q1, q2 and q3 in the XYZ color space are represented by q0(y01, y02, y03), q1(y1, y2, y3), q2(y4, y5, y6) and q3(y7, y8, y9), respectively.

Next, a linear transformation matrix for linearly transforming the local space in the tetrahedron is calculated (step S3). To be more specific, an arbitrary pair of corresponding points (p0 and q0 closest to an achromatic color in the present embodiment) is determined among the four points p0, p1, p2 and p3 in the RGB color space, and the corresponding points (p0, q0) are determined as origin (the coordinate values of p1 to p3 and q1 to q3 are represented by relative values with respect to p0 and q0).

If it is assumed that the conversion equation between the RGB color space (a) illustrated in FIG. 16 and the XYZ color space (b) illustrated in FIG. 16 can be linearly transformed into Y=AX, the equation is represented by following Equation (1):

$$Y = \begin{pmatrix} a11 & a12 & a13 \\ a21 & a22 & a23 \\ a31 & a32 & a33 \end{pmatrix} X \quad (1)$$

where X is a point on the RGB space and Y is a point on the XYZ space.

Here, if it is assumed that p1 is mapped into q1, p2 is mapped into q2 and p3 is mapped into q3, each factor "a" can be calculated by following Equations (2) to (10):

$$a13 = \frac{(x4y1 - x1y4)(x2x7 - x1x8) - (x7y1 - x1y7)(x2x4 - x1x5)}{(x3x4 - x1x6)(x2x7 - x1x8) - (x3x7 - x1x9)(x2x4 - x1x5)} \quad (2)$$

$$a23 = \frac{(x4y2 - x1y5)(x2x7 - x1x8) - (x7y2 - x1y8)(x2x4 - x1x5)}{(x3x4 - x1x6)(x2x7 - x1x8) - (x3x7 - x1x9)(x2x4 - x1x5)} \quad (3)$$

$$a33 = \frac{(x4y3 - x1y6)(x2x7 - x1x8) - (x7y3 - x1y9)(x2x4 - x1x5)}{(x3x4 - x1x6)(x2x7 - x1x8) - (x3x7 - x1x9)(x2x4 - x1x5)} \quad (4)$$

$$a12 = \frac{(x4y1 - x1y4)(x3x7 - x1x4) - (x7y1 - x1y7)(x3x4 - x1x6)}{(x2x4 - x1x5)(x3x7 - x1x9) - (x2x7 - x1x8)(x3x4 - x1x6)} \quad (5)$$

$$a22 = \frac{(x4y2 - x1y5)(x3x7 - x1x9) - (x7y2 - x1y8)(x3x4 - x1x6)}{(x2x4 - x1x5)(x3x7 - x1x9) - (x2x7 - x1x8)(x3x4 - x1x6)} \quad (6)$$

-continued $$a32 = \frac{(x4y3 - x1y6)(x3x7 - x1x9) - (x7y3 - x1y9)(x3x4 - x1x6)}{(x2x4 - x1x5)(x3x7 - x1x9) - (x2x7 - x1x8)(x3x4 - x1x6)} \quad (7)$$

$$a11 = \frac{y1 - a12x1 - a13x3}{x1} \quad (8)$$

$$a21 = \frac{y2 - a22x2 - a23x3}{x1} \quad (9)$$

$$a31 = \frac{y3 - a32x2 - a33x3}{x1} \quad (10)$$

Next, using this linear transformation matrix (Y=AX), the point Prgb (whose coordinate value is (Pr, Pg, Pb)) representing the RGB value of the patch image 200 of the color measurement target in the RGB color space (a) illustrated in FIG. 16 is mapped into the XYZ color space (b) illustrated in FIG. 16 (step S4). The acquired XYZ value is a relative value with respect to the origin q0. Therefore, the actual XYZ value Pxyz (whose coordinate value is (Px, Py, Pz)) corresponding to the RGB value Prgb of the patch image 200 of the color measurement target is represented as an offset value with respect to the origin q0(y01, y02, y03) by following Equations (11) to (13):

$$Px = y01 + a11 \times Pr + a12 \times Pg + a13 \times Pb \quad (11)$$

$$Py = y02 + a21 \times Pr + a22 \times Pg + a23 \times Pb \quad (12)$$

$$Pz = y03 + a31 \times Pr + a32 \times Pg + a33 \times Pb \quad (13)$$

Next, the XYZ value Pxyz of the patch image 200 calculated as above is converted into the L*a*b* value by the conversion equation (a) illustrated in FIG. 17, thereby calculating the L*a*b* value corresponding to the RGB value Prgb of the patch image 200 of the color measurement target (step S5). By this means, even if the sensitivity of the sensor unit 430 changes or the wavelength or intensity of the illumination light source 426 changes, it is possible to accurately calculate the color measurement value of the patch image 200 of the color measurement target and perform color measurement with high accuracy. Also, in the present embodiment, although the patch image 200 formed by the image forming apparatus 100 is the target for color measurement, an arbitrary image output by the image forming apparatus 100 may be a target for color measurement. For example, the image forming apparatus 100 can output an image while performing color measurement on a part of the image, thereby adjusting the output characteristics of the image forming apparatus 100 in real time.

Also, (c) in FIG. 16 used in the above processing operations illustrates the state achieved by plotting the L*a*b* value of each patch of the patch array 401 in the primary color (YMC) and the patch array 402 in the secondary color (RGB) in the reference chart 400 illustrated in FIG. 5, on the L*a*b* color space. Since the reference chart 400 illustrated in FIG. 5 is arranged in the housing 421 of the color measuring camera 42, the number of patches constituting the reference chart 400 is restricted. Therefore, the reference chart 400 illustrated in FIG. 5 is formed using a part of patches selected from the standard patches. Japan Color has 928 colors, for example, and the reference chart 400 illustrated in FIG. 5 is formed using a part (e.g., 72 colors) selected from the 928 colors. However, in a case where color measurement is performed using a part of patches selected from the standard patches alone, it is concerned that the accuracy in the color measurement degrades. Therefore, it is preferable to analogize the RGB values of the standard patches from the RGB values of the patches constituting the reference chart 400 and perform color measurement on the patch image 200 of the color measurement target using the RGB values of the standard patches.

Specifically, the L*a*b* values of the standard patches are stored, and, as illustrated in FIG. 19, the RGB value corresponding to each standard patch is specified based on the RGB value of each patch in the reference chart 400 acquired by image capturing in the sensor unit 430 (step S0). Based on the specified RGB value of each standard patch, four points including the RGB value of the patch image 200 of the color measurement target are searched (step S1').

As illustrated in FIG. 20, the RGB value (a) of each patch of the reference chart 400 corresponds to the L*a*b* value (b) of each patch of the reference chart 400 by a conversion equation α(b=a×α). Therefore, based on the RGB value of each patch constituting the reference chart 400, the equation α is calculated. Furthermore, the L*a*b* value of each patch of the reference chart 400 is a part of the L*a*b* values of the standard patches. Thus, the RGB value (A) of each standard patch corresponds to the L*a*b* value (B) of each standard patch by the conversion equation α (B=A×α). Therefore, based on the conversion equation α thus calculated, the RGB value corresponding to the L*a*b* value of each standard patch can be specified. As a result, based on the RGB value of each patch in the reference chart 400, it is possible to specify the RGB value corresponding to the L*a*b* value of each standard patch.

Next, based on the XYZ value corresponding to the L*a*b* value of each standard patch, the XYZ values corresponding to patches at four points including the RGB value of the patch image 200 of the color measurement target are searched (step S2').

Next, based on the XYZ values corresponding to the four points searched in step S2', a linear transformation matrix is calculated (step S3'). Based on the calculated linear transformation matrix, the RGB value of the patch image 200 of the color measurement target is converted into the XYZ value (step S4'). Next, the XYZ value converted in step S4' is converted into the L*a*b* value using the above conversion equation (step S5'). By this means, based on the RGB value and XYZ value of each standard patch, the L*a*b* value of the patch image 200 of the color measurement target can be acquired, and therefore it is possible to perform color measurement on the patch image 200 with high accuracy. Also, it is to be noted that the standard patches are not limited to Japan Color. Alternatively, for example, standard colors, such as SWOP employed in the United States and Euro Press employed in Europe, can be used.

The image forming apparatus 100 according to the present embodiment forms an image on the recording medium P by a dot matrix. The image forming apparatus 100 reproduces a desired color by superimposing ink of YMCK, for example. However, if positional deviation occurs in the image, the image deteriorates, and the colorimetric value itself obtained from the patch image 200 changes.

In the case where the color of the image changes because of positional deviation in the image formed on the recording medium P, if the color of the image is to be corrected only by the ejection amount of ink, the balance between the ejection amounts of ink is disturbed. As a result, an excellent image fails to be formed. Therefore, it is preferable that the positional deviation in the image be measured and corrected before the color measurement is performed on the patch image 200.

Method for Measuring Positional Deviation in Image

Figure 24:
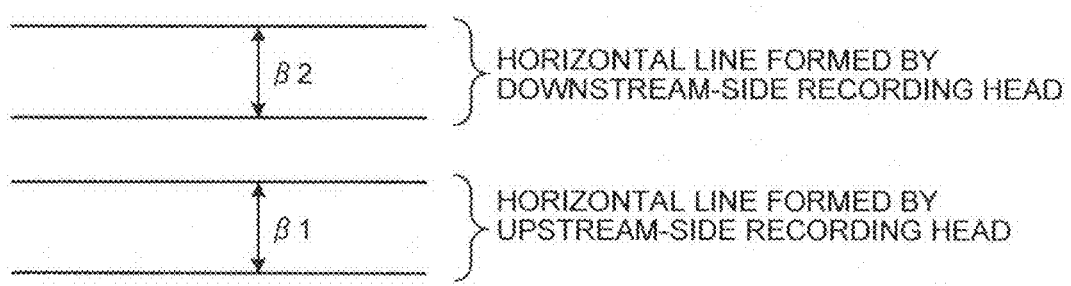
FIG. 24 is a view explaining a method of measuring sub-scanning positional deviation in an image.
Figure 25:
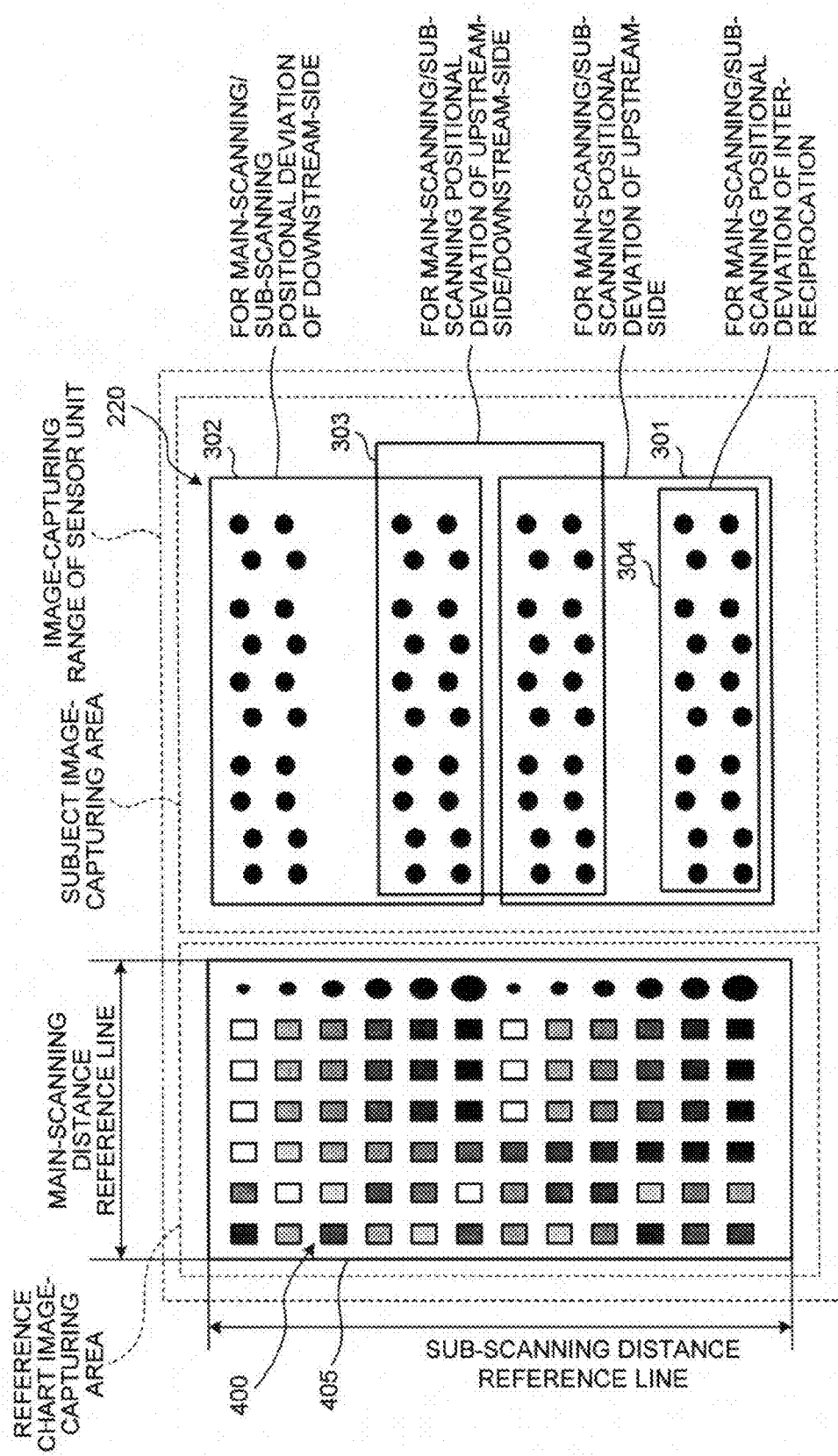
FIG. 25 is a view illustrating an example of image data acquired by capturing a reference chart and a test pattern in a sensor unit at the same time.

Next, a specific example of the method for measuring positional deviation in an image using the color measuring device according to the present embodiment will be described in detail with reference to FIG. 21 to FIG. 25. FIG. 21 is a view illustrating an example of image data acquired by capturing the reference chart 400 and a test pattern 210 in the sensor unit 430 at the same time. FIG. 22 and FIG. 23 are views explaining a method of measuring main-scanning positional deviation in an image. FIG. 24 is a view explaining a method of measuring sub-scanning positional deviation in an image. FIG. 25 is a view illustrating an example of image data acquired by capturing the reference chart 400 and a test pattern 220 in the sensor unit 430 at the same time.

To measure positional deviation in an image, first, the image forming apparatus 100 forms the predefined test pattern 210 for measuring positional deviation on the recording medium P. Subsequently, the sensor unit 430 included in the color measuring camera 42 of the color measuring device captures the reference chart 400 and the test pattern 210 formed on the recording medium P at the same time. As a result, the image data including the reference chart 400 and the test pattern 210 as illustrated in FIG. 21 is acquired, for example.

After the image data of the reference chart 400 and the test pattern 210 captured by the sensor unit 430 is processed by the image processing unit 45, the image data is transmitted from the color measuring camera 42 to the color measurement control unit 50 via the interface unit 46 and stored in the frame memory 51 of the color measurement control unit 50. The positional deviation amount calculating unit 532 of the arithmetic unit 53 then reads the image data stored in the frame memory 51 and measures positional deviation in the image.

Vertical lines (solid lines) in the lower area of the test pattern 210 illustrated in FIG. 21 are patterns for measuring relative positional deviation in the main-scanning direction of the print head 6 located upstream. Vertical lines (solid lines) in the upper area of the test pattern 210 are patterns for measuring relative positional deviation in the main-scanning direction of the print head 6 located downstream. Horizontal lines (solid lines) in the middle of the test pattern 210 are patterns for measuring relative positional deviation in the sub-scanning direction between the print head 6 located upstream and the print head 6 located downstream. Vertical dotted lines in FIG. 21 illustrate the ideal positions of the vertical lines to be recorded on the recording medium P when no positional deviation occurs in the main-scanning direction. Therefore, the vertical dotted lines are not actually recorded on the recording medium P.

The relative positional deviation in the main-scanning direction of the print head 6 located upstream is measured by: using the image data of the test pattern 210 captured by the sensor unit 430; measuring gaps between the vertical lines (solid lines) actually formed on the recording medium P by shifting the print head 6 by a predetermined gap da; and calculating the difference between the actual positions of the vertical lines (solid lines) formed on the recording medium P and the ideal positions of the vertical lines (dotted lines) to be formed on the recording medium P when no positional deviation occurs in the main-scanning direction as the amount of positional deviation in the main-scanning direction. The gaps between the vertical lines (solid lines) actually formed on the recording medium P are measured by using the black vertical line formed on the leftmost side as a reference line for measuring positional deviation in the main-scanning direction.

Specifically, as illustrated in FIG. 22, by using the first black vertical line formed on the leftmost side as the reference line for measuring positional deviation in the main-scanning direction, gaps (x1, x2, and x3) between the reference line and the vertical lines actually formed are measured. As a result, it is possible to grasp the actual positions of the vertical lines. Subsequently, the difference (Δx1, Δx2, and Δx3) between the actual positions of the vertical lines (solid lines) and the ideal positions of the vertical lines (dotted lines) is measured. The difference (Δx1) between the actual position of the second vertical line and the ideal position of the vertical line can be calculated by Δx1=x1−a. The difference (Δx2) between the actual position of the third vertical line and the ideal position of the vertical line can be calculated by Δx2=x2−2a. The difference (Δx3) between the actual position of the third vertical line and the ideal position of the vertical line can be calculated by Δx3=x3−3a. The difference (Δx1, Δx2, and Δx3) represents the relative positional deviation of the print head 6 located upstream in the main-scanning direction. Therefore, if the positional deviation in the main-scanning direction of the print head 6 located upstream is corrected based on the difference (Δx1, Δx2, and Δx3), the positions of the vertical lines (solid lines) actually recorded on the recording medium P coincide with the ideal positions of the vertical lines (dotted lines).

To measure the relative positional deviation in the main-scanning direction of the print head 6 located downstream, the method described above and illustrated in FIG. 22 is used. However, as illustrated in FIG. 23, the position of the first black vertical line formed on the leftmost side may be shifted with respect to the position of the reference line for measuring positional deviation in the main-scanning direction. Therefore, as illustrated in FIG. 22, the difference (Δx0) between the position of the first black vertical line recorded on the leftmost side and the position of the reference line for measuring positional deviation in the main-scanning direction is calculated. With the difference (Δx0), the position of the first black vertical line formed on the leftmost side is then corrected to the position of the reference line for measuring positional deviation in the main-scanning direction (ideal position). Subsequently, the method illustrated in FIG. 22 is used to measure the relative positional deviation in the main-scanning direction of the print head 6 located downstream. Thus, the positional deviation in the main-scanning direction is corrected.

To measure the deviation in the sub-scanning direction between the print head 6 located upstream and the print head 6 located downstream, four horizontal lines arranged in the middle in FIG. 21 are used. Among the four horizontal lines, two horizontal lines on the lower side are formed on the recording medium P by using the print head 6 located upstream. By contrast, two horizontal lines on the upper side are formed on the recording medium P by using the print head 6 located downstream. As illustrated in FIG. 24, the distances (β1 and β2) between the respective horizontal lines, and the difference therebetween (Δdb=β1−β2) is calculated as the amount of positional deviation in the sub-scanning direction between the print head 6 located upstream and the print head 6 located downstream. If the positional deviation in the sub-scanning direction between the print head 6 located upstream and the print head 6 located downstream is corrected based on the difference (Δdb), the distances (β1 and β2) between the respective horizontal lines become equal to each other.

Since the distances of the sub-scanning distance reference line and the main-scanning distance reference line of the reference chart 400 are absolute distances, the absolute distances of the sub-scanning distance reference line and the main-scanning distance reference line are measured in advance and stored in a non-volatile memory inside the color measurement control unit 50, for example. Subsequently, the distances of the sub-scanning distance reference line and the main-scanning distance reference line on the image, which is illustrated in FIG. 21 and obtained by capturing the reference chart 400, are compared with the stored absolute distances of the sub-scanning distance reference line and the main-scanning distance reference line, the relative ratios between the distances on the image and the absolute distances are calculated, and the amount of positional deviation obtained from the test pattern 210 in the above subject image-capturing area is multiplied by the relative ratios, thereby calculating the actual amount of positional deviation. By correcting the positional deviation based on this actual amount of positional deviation, it is possible to correct the positional deviation with high accuracy.

The method for measuring positional deviation described above is a method for measuring the positional deviation in the image by using the test pattern 210 of a line pattern illustrated in FIG. 21. However, the method for measuring the positional deviation in the image is not limited to the method described above, and various types of methods can be applied thereto. For example, geometric positional deviation between the print heads 6 can be measured by using the test pattern 220 of a dot pattern illustrated in FIG. 25.

In the case of the test pattern 220 illustrated in FIG. 25, the amount of positional deviation in the main-scanning and sub-scanning directions of the print head 6 located upstream can be measured using dots in a first frame 301. Also, the amount of positional deviation in the main-scanning and sub-scanning directions of the print head 6 located downstream can be measured using dots in a second frame 302. Also, the amount of positional deviation in the main-scanning and sub-scanning directions between the print head 6 located upstream and the print head 6 located downstream can be measured using dots in a third frame 303. Also, the amount of positional deviation in the main-scanning and sub-scanning directions of the print head 6 caused by the reciprocation of the carriage 5 can be measured using dots in a fourth frame 304.

Advantage of Embodiment

As described above in detail with reference to specific examples, the color measuring device according to the present embodiment captures the reference chart 400 and the patch image 200 of the color measurement target in the sensor unit 430 at the same time and performs color measurement of the patch image 200 using the image data of the reference chart 400. Also, two items of correction data are generated using image data of multiple patches of different densities such as the grayscale patch array 403 of the reference chart 400 captured under two illuminations of different light quantities, and the image data acquired from the color measuring camera 42 is corrected (i.e. gamma-corrected) so as to compensate the linearity of sensitivity with respect to the brightness of the sensor unit 430 using these items of correction data. Therefore, by the color measuring device according to the present embodiment, over the entire area of a wide scale range of image data, it is possible to correct the image data acquired by capturing the reference chart and the color measurement target correctly and perform accurate color measurement.

That is, since an image capturing apparatus generally has a device-specific gamma characteristic such as a sensitivity characteristic of image-capturing elements, by using correction data (i.e. gamma correction curve) corresponding to this gamma characteristic and correcting (or gamma-correcting) image data acquired by capturing a subject, it is possible to accurately reproduce density (or brightness) distribution of the subject. Here, the color measuring camera 42 incorporating the reference chart 400 can acquire the RGB values of multiple patches included in the reference chart 400 by image capturing, and therefore, for example, based on the RGB values of multiple patches of different densities such as each patch included in the grayscale patch array 403, it is possible to easily generate correction data to correct the image data according to the gamma characteristic of the sensor unit 430.

However, when the reference chart 400 is captured under illumination of a certain light quantity, a case is possible where among the multiple patches of different densities included in the grayscale patch array 403, the RGB values of low density patches exceed the maximum value of a scale range (i.e. range of scale values which the RGB values can have) and a white dot is caused or where the RGB values of high density patches are less than the minimum value of the scale range and a black dot is caused. Subsequently, if a gamma correction curve is generated based on the RGB values of these multiple patches, it is not possible to perform gamma correction of the image data correctly and therefore there is a problem that it is not possible to perform accurate color measurement.

By contrast with this, according to the present embodiment, two items of correction data are generated using image data such as the grayscale patch array 403 captured under two illuminations of different light quantities, and the image data output from the sensor unit 430 is gamma-corrected so as to compensate the linearity of sensitivity with respect to the brightness of the sensor unit 430 by selectively using these two items of correction data. Therefore, over the entire area of a wide scale range of image data, it is possible to correct the image data acquired by capturing the reference chart and the color measurement target correctly and perform accurate color measurement.

Also, the image forming apparatus 100 according to the present embodiment has the color measuring device according to the present embodiment, and therefore it is possible to perform accurate color measurement on an image while outputting the image of the color measurement target, adequately adjust output characteristics and output an image of high quality.

Modification of Color Measuring Camera

Next, a modification of the color measuring camera 42 will be explained. In the following, the color measuring camera 42 of a first modification is expressed as a color measuring camera 42A, the color measuring camera 42 of a second modification is expressed as a color measuring camera 42B, the color measuring camera 42 of a third modification is expressed as a color measuring camera 42C, the color measuring camera 42 of a fourth modification is expressed as a color measuring camera 42D, the color measuring camera 42 of a fifth modification is expressed as a color measuring camera 42E, and the color measuring camera 42 of a sixth modification is expressed as a color measuring camera 42F. In each modification, the same reference numerals are assigned to components common to the above color measuring cameras 42, and an overlapping explanation thereof will be omitted.

First Modification

Figure 26:
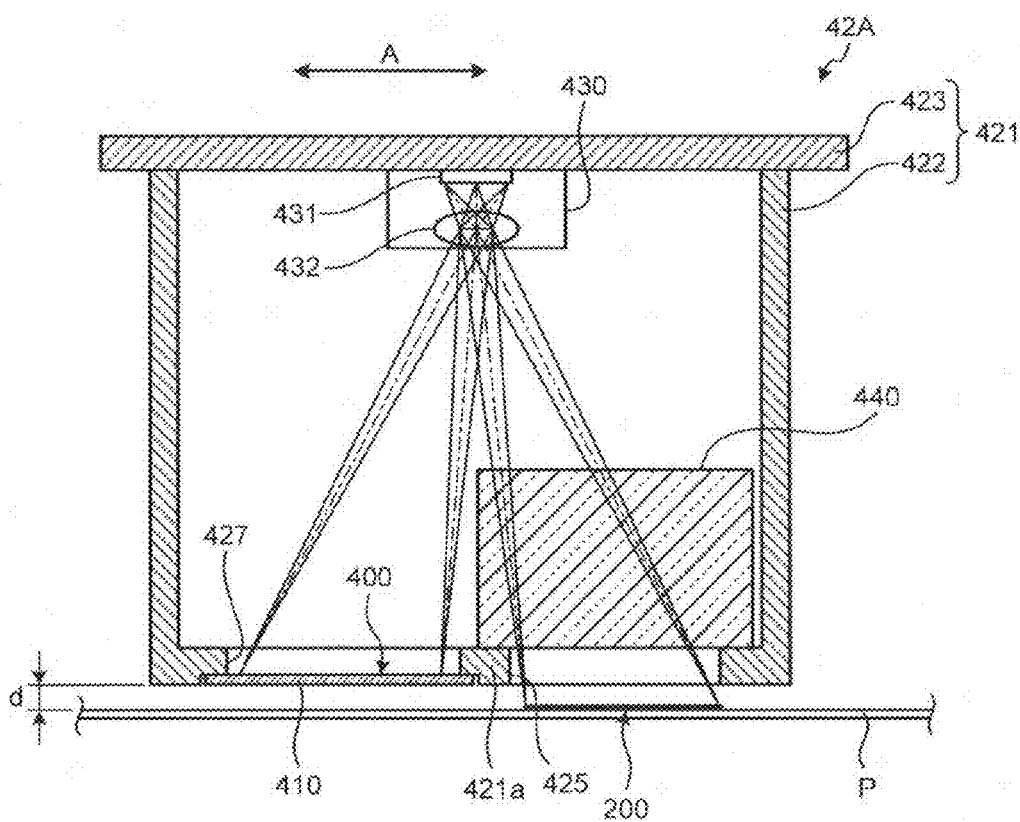
FIG. 26 is a vertical cross-sectional view of a color measuring camera according to a first modification.

FIG. 26 is a vertical cross-sectional view of the color measuring camera 42A according to the first modification, which is a cross-sectional view in the same position as in the vertical cross-sectional view of the color measuring camera 42 illustrated in FIG. 4A.

In the color measuring camera 42A according to the first modification, an opening 427 different from the opening 425 to capture the patch image 200 is installed in the bottom surface 421a of the housing 421. Also, the chart plate 410 is arranged so as to close this opening 427 from the outside of the housing 421. That is, in the above color measuring camera 42, the chart plate 410 is arranged on the internal surface side facing the sensor unit 430 of the bottom surface 421a of the housing 421, while, in the color measuring camera 42A according to the first modification, the chart plate 410 is arranged on the external surface side facing the recording medium P of the bottom surface 421a of the housing 421.

To be more specific, for example, a concave portion having a depth corresponding to the thickness of the chart plate 410 is formed on the external surface side of the bottom surface 421a of the housing 421 so as to be communicated with the opening 427. In this concave portion, the chart plate 410 is arranged such that a surface on which the reference chart 400 is formed faces the side of the sensor unit 430. For example, an end part of the chart plate 410 is connected to the bottom surface 421a of the housing 421 by an adhesion bond or the like in the vicinity of an edge of the opening 427, and the chart plate 410 is integrated with the housing 421.

In the color measuring camera 42A according to the first modification configured as above, by arranging the chart plate 410, on which the reference chart 400 is formed, on the external surface side of the bottom surface 421a of the housing 421, compared to the above color measuring camera 42, it is possible to reduce a difference between a light path length from the sensor unit 430 to the patch image 200 and a light path length from the sensor unit 430 to the reference chart 400.

Second Modification

Figure 27:
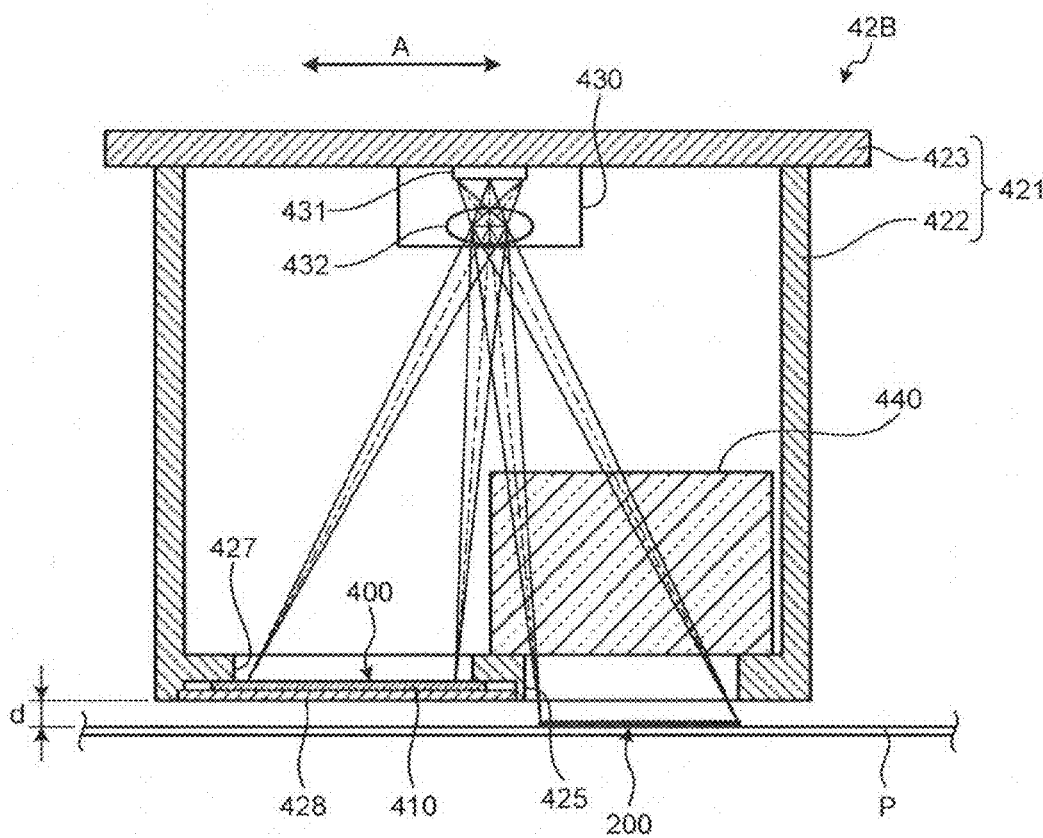
FIG. 27 is a vertical cross-sectional view of a color measuring camera according to a second modification.

FIG. 27 is a vertical cross-sectional view of the color measuring camera 42B according to the second modification, which is a cross-sectional view in the same position as in the vertical cross-sectional view of the color measuring camera 42 illustrated in FIG. 4A.

In the color measuring camera 42B according to the second modification, similar to the color measuring camera 42A according to the first modification, the chart plate 410 is arranged on the external surface side of the bottom surface 421a of the housing 421. However, in the color measuring camera 42A according to the first modification, the chart plate 410 is connected to the bottom surface 421a of the housing 421 by an adhesion bond or the like and integrated with the housing 421, while, in the color measuring camera 42B according to the second modification, the chart plate 410 is held so as to be detachable to the housing 421.

To be more specific, for example, similar to the color measuring camera 42A according to the first modification, a concave portion communicated with the opening 427 is formed on the external surface side of the bottom surface 421a of the housing 421 and the chart plate 410 is arranged in this concave portion. Also, the color measuring camera 42B according to the second modification has a holding member 428 to press and hold the chart plate 410 arranged in the concave portion from the external surface side of the bottom surface 421a of the housing 421. The holding member 428 is detachably attached to the bottom surface 421a of the housing 421. Therefore, in the color measuring camera 42B according to the second modification, by detaching the holding member 428 from the bottom surface 421a of the housing 421, it is possible to easily extract the chart plate 410.

As described above, in the color measuring camera 42B according to the second modification, since the chart plate 410 is detachably held with respect to the housing 421 and the chart plate 410 can be easily extracted, in a case where the chart plate 410 degrades due to dirt of the reference chart 400 or the like, it is possible to easily perform an operation of exchanging the chart plate 410. Also, when the above shading correction unit 452 acquires shading data to correct non-uniform illumination intensity in the illumination light source 426, by extracting the chart plate 410, arranging a white reference plate instead and capturing this white reference plate by the sensor unit 430, it is possible to easily acquire the shading data.

Third Modification

Figure 28:
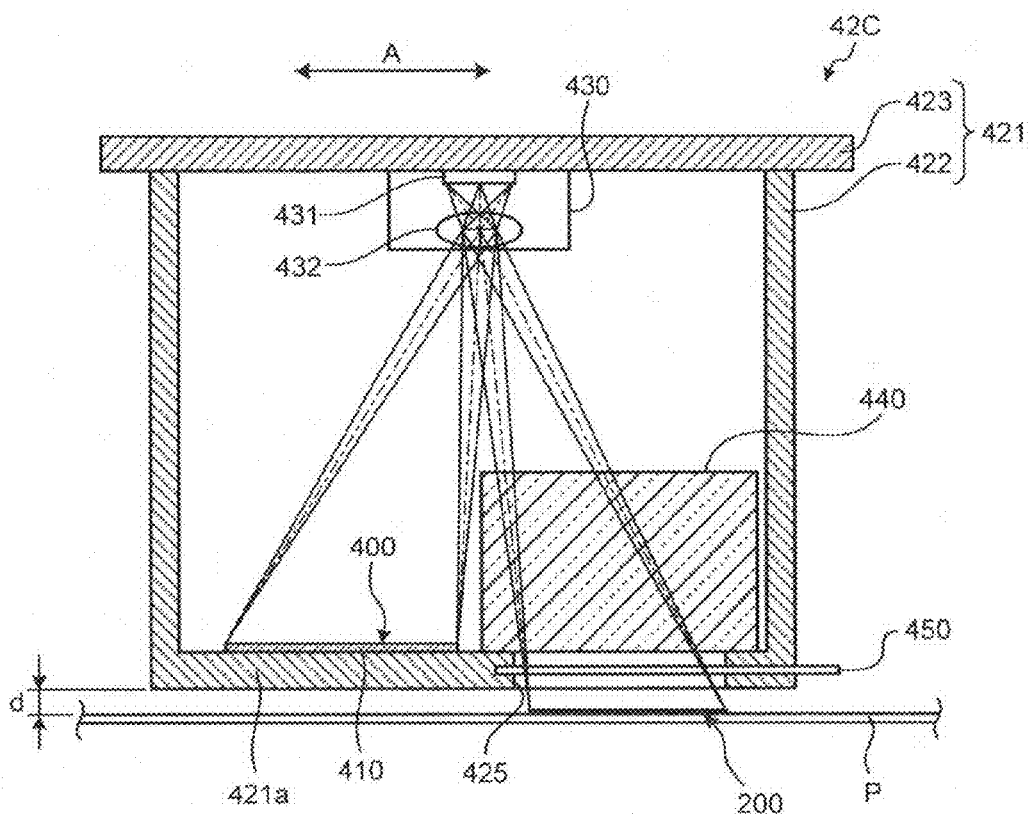
FIG. 28 is a vertical cross-sectional view of a color measuring camera according to a third modification.

FIG. 28 is a vertical cross-sectional view of the color measuring camera 42C according to the third modification, which is a cross-sectional view in the same position as in the vertical cross-sectional view of the color measuring camera 42 illustrated in FIG. 4A.

In the color measuring camera 42C according to the third modification, a mist suppression transparent member 450 to close the opening 425 of the housing 421 is added. As described above, the image forming apparatus 100 according to the present embodiment employs a configuration in which an ink is ejected onto the recording medium P on the platen 22 from a nozzle array of the print head 6 mounted on the carriage 5 to form an image on the recording medium P. Therefore, when an ink is ejected from the nozzle array of the print head 6, misty minute ink particles (hereinafter such minute ink particles are referred to as "mist") are generated. When the mist generated at the time of the image formation is entered from the outside of the housing 421 of the color measuring camera 42 fixed and set in the carriage 5 to the inside of the housing 421 via the opening 425, it is concerned that the mist entered in the inside of the housing 421 is attached to the sensor unit 430, the illumination light source 426 and the light path length change member 440, and it is not possible to acquire accurate image data at the time of color adjustment to perform color measurement of the patch image 200. Therefore, in the color measuring camera 42C according to the third modification, by covering the opening 425 set in the bottom surface 421a of the housing 421 with the mist suppression transparent member 450, the mist generated at the time of the image formation is prevented from entering inside of the housing 421.

The mist suppression transparent member 450 is a transparent optical element having a sufficient transmissivity with respect to light of the illumination light source 426, and is formed in a plate shape having a size to be able to cover the entire of the opening 425. The mist suppression transparent member 450 is attached to a slot formed along the bottom surface 421a of the housing 421 and closes the whole surface of the opening 425 set in the bottom surface 421a of the housing 421. A slit to which the mist suppression transparent member 450 is attached opens in a side surface part of the housing 421. The mist suppression transparent member 450 can be inserted from the side surface part of this housing 421 and attached to the slit. Also, the mist suppression transparent member 450 can be detached from the side surface part of the housing 421 and adequately exchanged at the time of adhesion of dirt.

Fourth Modification

Figure 29:
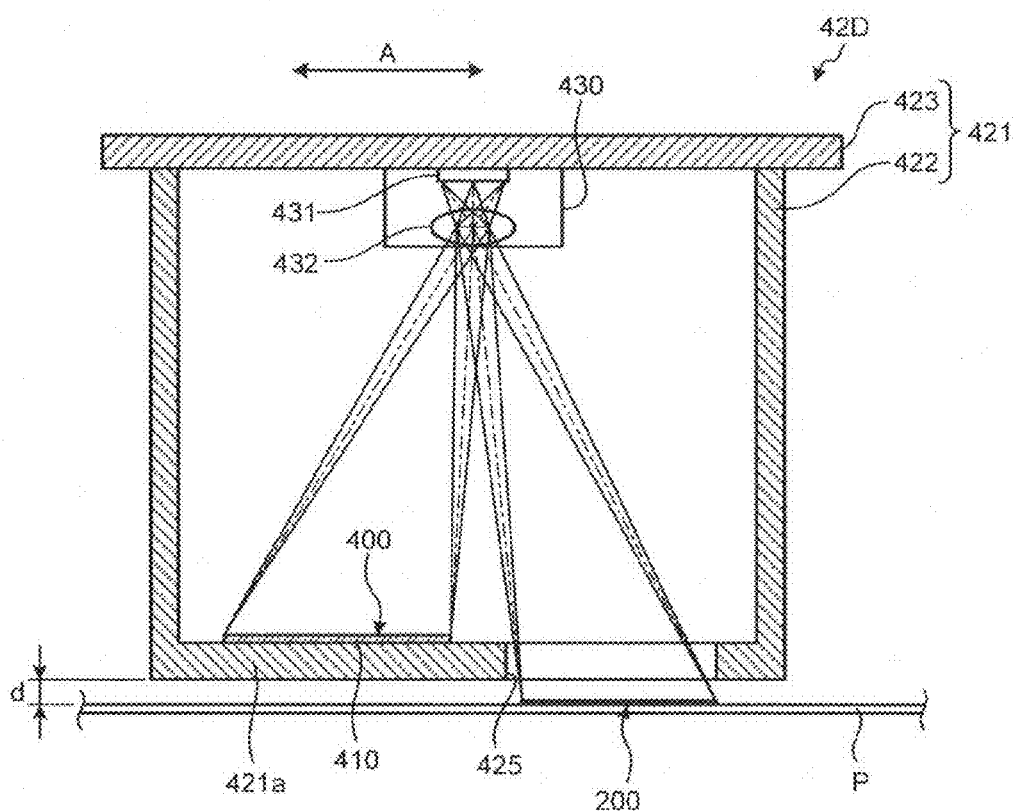
FIG. 29 is a vertical cross-sectional view of a color measuring camera according to a fourth modification.

FIG. 29 is a vertical cross-sectional view of the color measuring camera 42D according to the fourth modification, which is a cross-sectional view in the same position as in the vertical cross-sectional view of the color measuring camera 42 illustrated in FIG. 4A.

In the color measuring camera 42D according to the fourth modification, the light path length change member 440 in the housing 421 is omitted. As described above, the light path length change member 440 has a function of changing a light path length from the sensor unit 430 to a subject (i.e. patch image 200) and adjusting it to a light path length from the sensor unit 430 to the reference chart 400. However, when a difference between these light path lengths is within a range of the depth of field of the sensor unit 430, even if there is a difference between the light path lengths, it is possible to capture an image focusing on both the subject (i.e. patch image 200) and the reference chart 400.

The difference between the light path length from the sensor unit 430 to the subject (i.e. patch image 200) and the light path length from the sensor unit 430 to the reference chart 400 is nearly a value acquired by adding a gap "d" to a thickness of the bottom surface 421a of the housing 421. Therefore, when the gap "d" is set to a sufficiently small value, the difference between the light path length from the sensor unit 430 to the subject (i.e. patch image 200) and the light path length from the sensor unit 430 to the reference chart 400 can be set within the range of the depth of field of the sensor unit 430, and therefore it is possible to omit the light path length change member 440 to reduce the component cost.

Also, the depth of field of the sensor unit 430 is a characteristic unique to the sensor unit 430, which is determined based on an aperture value of the sensor unit 430, a focal length of the imaging lens 432, a distance between the sensor unit 430 and the subject, and so on. In the color measuring camera 42D according to the present embodiment, when the gap "d" between the bottom surface 421a of the housing 421 and the recording medium P is set to a sufficiently small value around 1 mm to 2 mm, the sensor unit 430 is designed such that a difference between the light path length from the sensor unit 430 to the subject (i.e. patch image 200) and the light path length from the sensor unit 430 to the reference chart 400 is within the range of the depth of field of the subject.

Fifth Modification

Figure 30A:
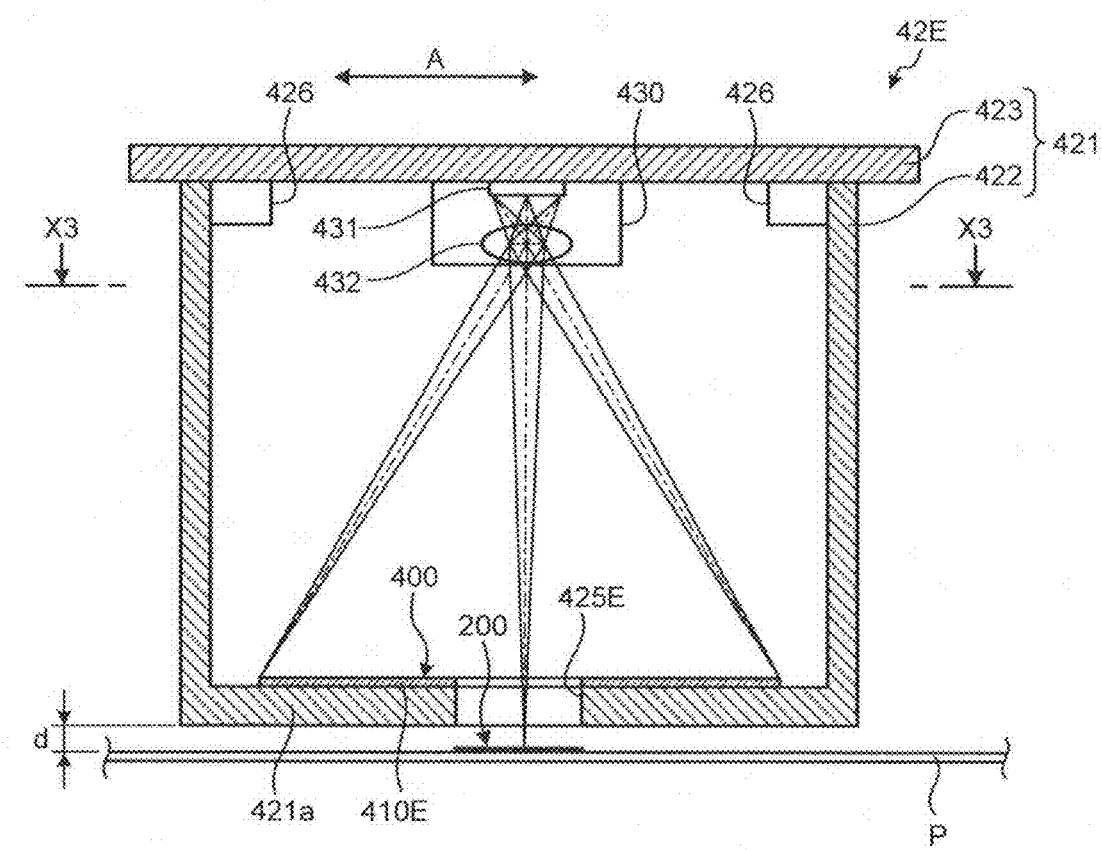
FIG. 30A is a vertical cross-sectional view of a color measuring camera according to a fifth modification.
Figure 30B:
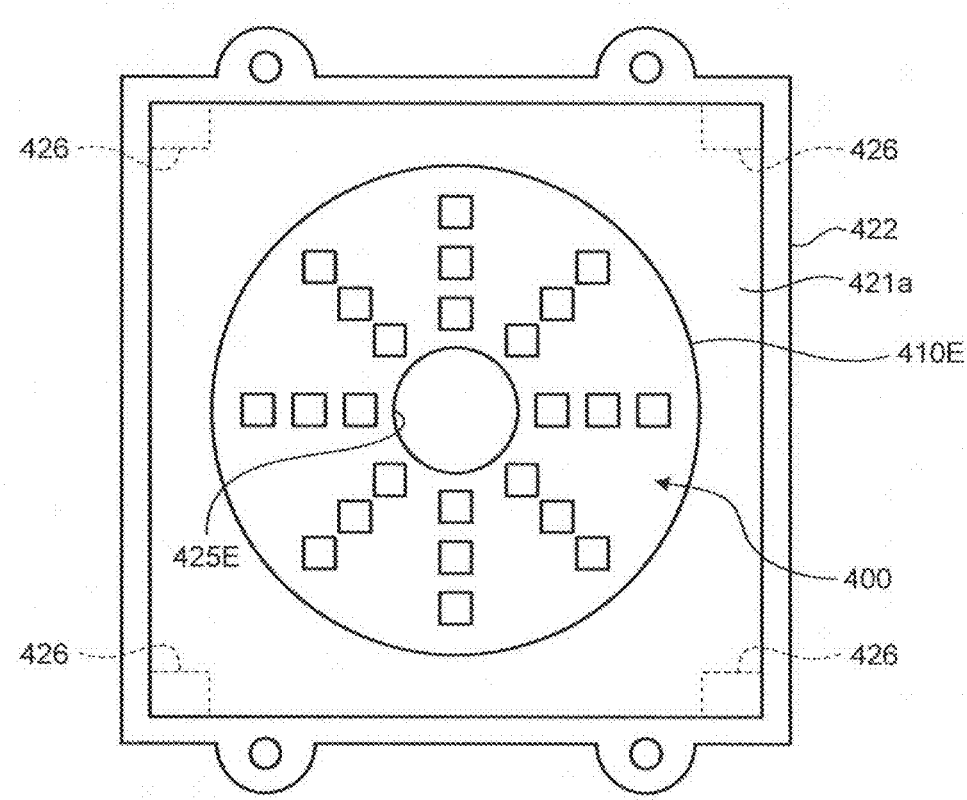
FIG. 30B is a plan view of a bottom surface of a housing in the color measuring camera according to the fifth modification, seen in the X3 direction in FIG. 30A.

FIG. 30A is a vertical cross-sectional view of the color measuring camera 42E according to the fifth modification, which is a cross-sectional view in the same position as in the vertical cross-sectional view of the color measuring camera 42 illustrated in FIG. 4A. Also, FIG. 30B is a plan view of the bottom surface 421a of the housing 421 seen from the X3 direction in FIG. 30A. Also, in FIG. 30B, a vertical projection position of the illumination light source 426 in the bottom surface 421a of the housing 421 (i.e. projected position when the bottom surface 421a is vertically looked down) is represented by dash line.

In the color measuring camera 42E according to the fifth modification, in the bottom surface 421a of the housing 421, an opening 425E is set in a position (i.e. light axis center of the sensor unit 430) on a perpendicular line drawn from the sensor unit 430 to the bottom surface 421a to capture the subject (i.e. patch image 200) via this opening 425E. That is, in the color measuring camera 42E according to the fifth modification, the opening 425E to capture the subject (i.e. patch image 200) outside the housing 421 is set so as to be positioned in substantially the center in the image-capturing range of the sensor unit 430.

Also, in the color measuring camera 42E according to the fifth modification, a chart plate 410E on which the reference chart 400 is formed is arranged in the bottom surface 421a of the housing 421 so as to surround the periphery of the opening 425E. For example, the chart plate 410E is formed in an annular shape with respect to the opening 425E, bonded to the internal surface side of the bottom surface 421a of the housing 421 by an adhesive material, using as a bonding plane a surface opposite to the surface on which the reference chart 400 is formed, and held in a state where it is fixed to the housing 421.

Also, in the color measuring camera 42E according to the fifth modification, as the illumination light source 426, four LEDs arranged at four corners on the inner periphery side of the frame body 422 forming the side walls of the housing 421 are used. For example, these four LEDs used as the illumination light source 426 are mounted on the internal surface of the board 423 together with the two-dimensional image sensor 431 of the sensor unit 430. By arranging the four LEDs used as the illumination light source 426 as above, it is possible to illuminate the subject (i.e. patch image 200) and the reference chart 400 in substantially the same conditions.

In the color measuring camera 42E according to the fifth modification configured as above, the opening 425E to capture the subject (i.e. patch image 200) outside the housing 421 is set on a perpendicular line drawn from the sensor unit 430 in the bottom surface 421a of the housing 421, the chart plate 410E on which the reference chart 400 is formed is arranged so as to surround the periphery of the opening 425E, and therefore it is possible to adequately capture the subject (i.e. patch image 200) and the reference chart 400 while making a size of the color measuring camera 42E compact.

Sixth Modification

Figure 31:
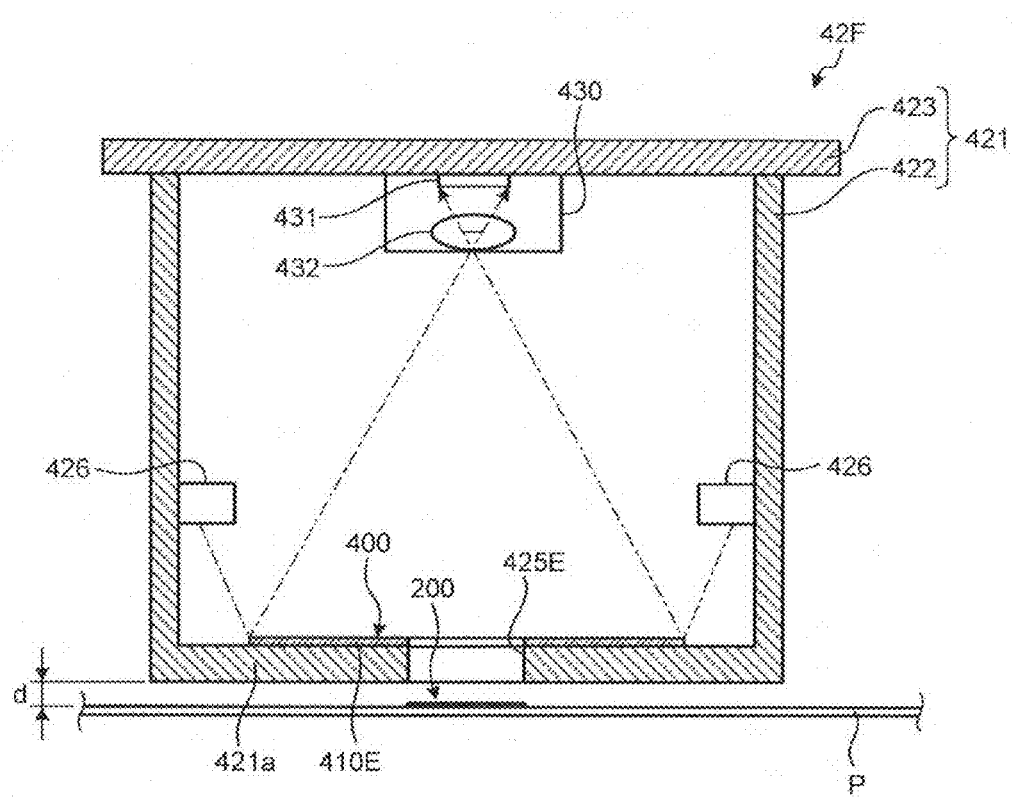
FIG. 31 is a vertical cross-sectional view of a color measuring camera according to a sixth modification.

FIG. 31 is a vertical cross-sectional view of the color measuring camera 42F according to the sixth modification, which is a cross-sectional view in the same position as in the vertical cross-sectional view of the color measuring camera 42 illustrated in FIG. 4A.

In the color measuring camera 42F according to the sixth modification, similar to the color measuring camera 42E according to the fifth modification, four LEDs arranged at four corners on the inner periphery side of the frame body 422 are used as the illumination light source 426. However, in the color measuring camera 42F according to the sixth modification, the four LEDs used as the illumination light source 426 are arranged in positions closer to the bottom surface 421a of the housing 421 compared to the color measuring camera 42E according to the fifth modification, such that regular reflection light regular-reflected by the subject (i.e. patch image 200) or the reference chart 400 does not enter the two-dimensional image sensor 431 of the sensor unit 430.

In the sensor surface of the two-dimensional image sensor 431 of the sensor unit 430, since a pixel value is saturated in a position which the regular reflection light of the illumination light source 426 enters, there is a case where it is not possible to acquire accurate information. Therefore, when the illumination light source 426 is arranged in a position at which the regular reflection light regular-reflected by the subject (i.e. patch image 200) or the reference chart 400 enters the two-dimensional image sensor 431 of the sensor unit 430, it is concerned that it is not possible to acquire information required for color measurement of the subject (i.e. patch image 200). Therefore, in the color measuring camera 42F according to the sixth modification, as illustrated in FIG. 31, the four LEDs used as the illumination light source 426 are arranged in positions closer to the bottom surface 421a of the housing 421, such that the regular reflection light regular-reflected by the subject (i.e. patch image 200) or the reference chart 400 does not enter the two-dimensional image sensor 431 of the sensor unit 430. Here, chain-line arrows in FIG. 31 represent an image of light paths of regular reflection light.

As described above, in the color measuring camera 42F according to the sixth modification, since the illumination light source 426 is arranged in a position at which regular reflection light regular-reflected by the subject (i.e. patch image 200) or the reference chart 400 does not enter the two-dimensional image sensor 431 of the sensor unit 430, it is possible to efficiently suppress that a pixel value is saturated in a position in which an optical image of the subject (i.e. patch image 200) or the reference chart 400 forms an image in the sensor surface of the two-dimensional image sensor 431, and it is possible to adequately capture the subject (i.e. patch image 200) and the reference chart 400.

Modifications of Color Measurement Method for Patch Image

Next, with reference to FIGS. 32 to 38, modifications of the color measurement method for the patch image 200 by the image forming apparatus 100 according to the present embodiment will be explained in detail. The color measurement method according to these modifications includes preprocessing implemented when the image forming apparatus 100 is in the initial state (i.e. the initial state by manufacture or overhaul) and color measurement processing implemented at the time of adjustment to perform color adjustment on the image forming apparatus 100.

Figure 32:
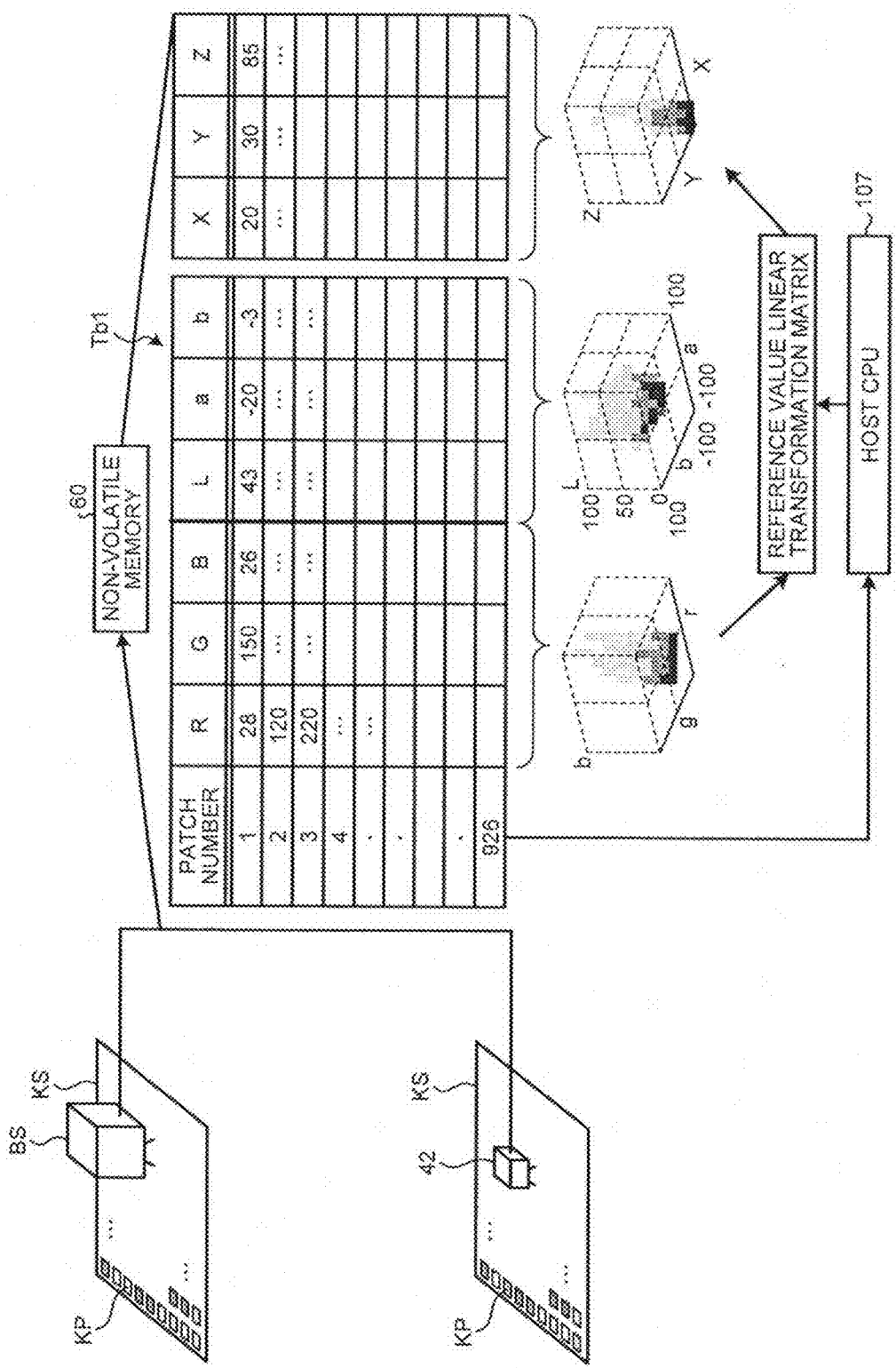
FIG. 32 is a view explaining processing of acquiring a reference color measurement value and reference RGB value and processing of generating a reference value linear transformation matrix.

FIG. 32 is a view explaining processing of acquiring a reference color measurement value and reference RGB value and processing of generating a reference value linear transformation matrix. These processings illustrated in FIG. 32 are implemented as preprocessing. The preprocessing uses a reference sheet KS on which multiple reference patches KP are arranged and formed. The reference patches KP of the reference sheet KS are equivalent to patches of the reference chart 400 held in the color measuring camera 42.

First, at least one of the Lab values and XYZ values as color measurement values of the multiple reference patches KP of the reference sheet KS (in the example of FIG. 32, both the Lab values and the XYZ values) is associated with each patch number and stored in a memory table Tb1 installed in a non-volatile memory 60 inside the color measurement control unit 50, for example. A color measurement value of a reference patch KC is a value acquired in advance by color measurement using a spectroscope BS. If the color measurement value of the reference patch KC is known, the value may be used. In the following, the color measurement value of the reference patch KC stored in the memory table Tb1 will be referred to as "reference color measurement value".

Next, the reference sheet KS is set on the platen 22; and, by controlling the movement of the carriage 5, image capturing is performed by the color measuring camera 42 using multiple reference patches KC of the reference sheet KS as subjects. The RGB value of the reference patch KC acquired by the image capturing by the color measuring camera 42 is stored in the memory table Tb1 of the non-volatile memory in association with the patch number. That is, the memory table Tb1 stores the color measurement values and RGB values of multiple reference patches KC arranged and formed on the reference sheet KS, in association with the patch number of each of the reference patches KC. In the following, the RGB value of the reference patch KC stored in the memory table Tb1 will be referred to as "reference RGB value." The reference RGB value is a value reflecting characteristics of the color measuring camera 42.

When the reference color measurement value and reference RGB value of the reference patch KC are stored in the memory table Tb1 of the non-volatile memory 60, the host CPU 107 of the image forming apparatus 100 generates a reference value linear transformation matrix that performs mutual conversion on a pair of the XYZ value as the reference color measurement value and the reference RGB value of the same patch number, and stores the reference value linear transformation matrix in the non-volatile memory 60. In a case where only the Lab value is stored in the memory table Tb1 as the reference color measurement value, after the Lab value is converted into the XYZ value using a known conversion equation for converting the Lab value into the XYZ value, the reference value linear transformation matrix may be generated.

Figure 33:
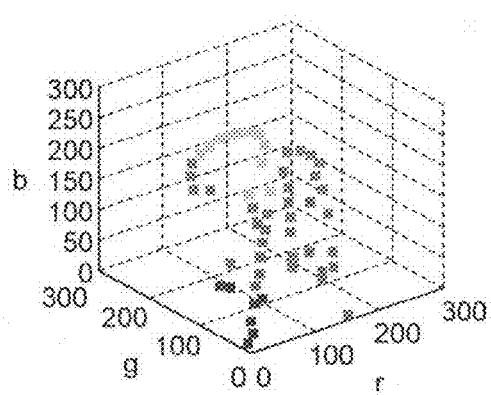
FIGS. 33A and 33B are views illustrating an example of an initial reference RGB value.

Also, when the color measuring camera 42 captures the multiple reference patches KC of the reference sheet KS, the reference chart 400 installed in the color measuring camera 42 are captured at the same time. The RGB value of each patch of the reference chart 400 acquired by the image capturing are stored in the memory table Tb1 of the non-volatile memory 60 in association with the patch numbers. The RGB values of the patches of the reference chart 400 stored in the memory table Tb1 by this preprocessing are referred to as "initial reference RGB values". FIG. 33 is a view illustrating an example of the initial reference RGB value. FIG. 33(a) illustrates a state where the initial reference RGB value (RdGdBd) is stored in the memory table Tb1 and where, in addition to the initial reference RGB value (RdGdBd), an initial reference Lab value (Ldadbd) acquired by converting the initial reference RGB value (RdGdBd) into the Lab value and an initial reference XYZ value (XdYdZd) acquired by converting the initial reference RGB value (RdGdBd) into the XYZ value are stored in association. Also, FIG. 33(b) is a scatter diagram plotting the initial reference RGB value of each patch of the reference chart 400.

After the above preprocessing is finished, in the image forming apparatus 100, based on image data, print setting or the like input from the outside, the host CPU 107 performs main-scanning movement control of the carriage 5, carrier control of the recording medium P in the sheet conveying unit 112 and drive control of the print head 6 to intermittently carry the recording medium P, while controlling ink ejection from the print head 6 to output an image to the recording medium P. At this time, the ink ejection amount from the print head 6 may vary depending on device-specific characteristics and temporal change, and, when this ink ejection amount varies, an image formation is performed with a different color from an image color intended by the user and the color reproducibility degrades. Therefore, the image forming apparatus 100 implements color measurement processing to calculate a color measurement value of the patch image 200 at predetermined timing for color adjustment. Subsequently, by performing color adjustment based on the color measurement value acquired by the color measurement processing, the color reproducibility is enhanced.

Figure 34:
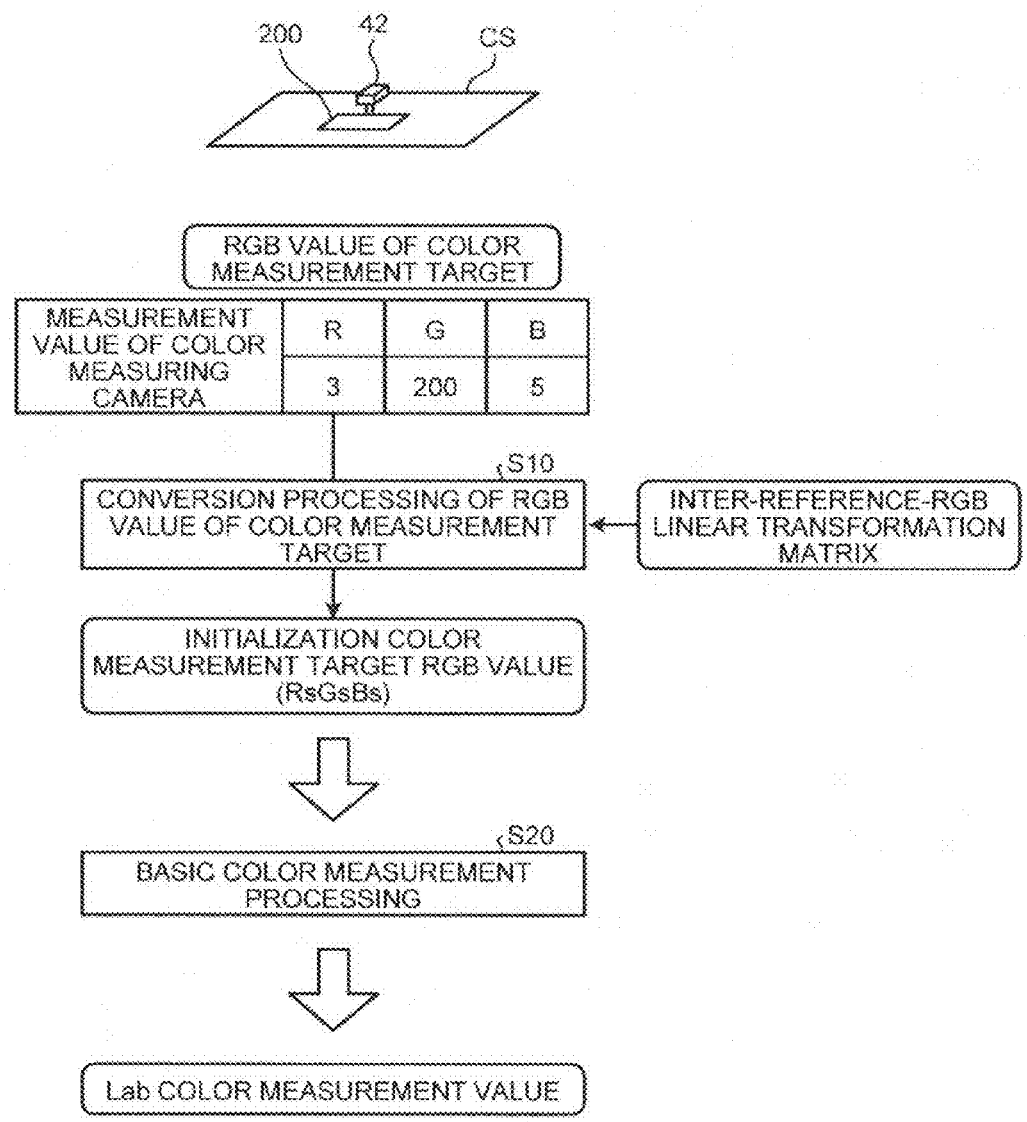
FIG. 34 is a view explaining an outline of color measurement processing.

FIG. 34 is a view explaining an outline of color measurement processing. First, at the time of performing color adjustment, the image forming apparatus 100 ejects an ink from the print head 6 onto the recording medium P set on the platen 22 and forms the patch image 200 of the color measurement target. In the following, the recording medium P on which the patch image 200 is formed will be referred to as "adjustment sheet CS". In this adjustment sheet CS, the patch image 200 is formed which reflects an output characteristic at the time of adjustment in the image forming apparatus 100, especially, an output characteristic of the print head 6. Also, image data to form the patch image 200 of the color measurement target is stored in advance in the non-volatile memory 60 or the like.

Next, as illustrated in FIG. 34, in a state where this adjustment sheet CS is set on the platen 22 or the adjustment sheet CS at the time of creation is held on the platen 22 without being ejected, the image forming apparatus 100 controls the movement of the carriage 5 and moves the color measuring camera 42 to a position facing the patch image 200 formed on the adjustment sheet CS on this platen 22. Subsequently, the color measuring camera 42 captures the patch image 200 and the reference chart 400 set in the color measuring camera 42 at the same time. After the image data of the patch image 200 and the reference chart 400 simultaneously captured by the color measuring camera 42 is subjected to essential image processing in the image processing unit 45, the image data is sent to the color measurement control unit 50 and temporarily stored in the frame memory 51. Among the image data simultaneously captured by the color measuring camera 42 and temporarily stored in the frame memory 51, the image data (i.e. RGB value) of the patch image 200 is referred to as "color measurement target RGB value", and the image data (i.e. RGB value) of the reference chart 400 is referred to as "reference RGB value upon color measurement (RdsGdsBds)". The "reference RGB value upon color measurement (RdsGdsBds)" is stored in the non-volatile memory 60 or the like.

The color measurement value calculating unit 531 of the color measurement control unit 50 performs processing of converting the color measurement target RGB value temporarily stored in the frame memory 51 into an initialization color measurement target RGB value (RsGsBs) using an inter-reference-RGB linear transformation matrix described below (step S10). The initialization color measurement target RGB value (RsGsBs) is acquired by removing, from the color measurement target RGB value, an influence of temporal changes in image-capturing conditions of the color measuring camera 42 caused during a time period from the time of the initial state upon performing preprocessing until the time of adjustment to perform color measurement processing, for example, an influence of temporal changes in the illumination light source 426 or temporal changes in the two-dimensional image sensor 431.

After that, the color measurement value calculating unit 531 performs basic color measurement processing (described later) on the initialization color measurement target RGB value (RsGsBs) converted from the color measurement target RGB value (step S20), thereby acquiring an Lab value as the color measurement value of the patch image 200 of the color measurement target.

Figure 35:
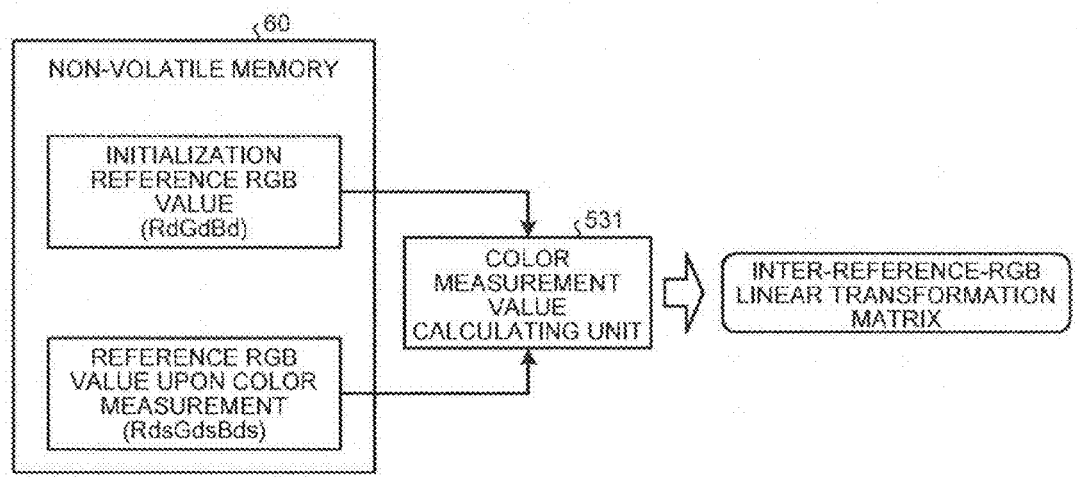
FIG. 35 is a view explaining processing of generating an inter-reference-RGB linear transformation matrix.

FIG. 35 is a view explaining processing of generating an inter-reference-RGB linear transformation matrix; and FIG. 36 is a view illustrating a relation between the initial reference RGB value and the reference RGB value upon color measurement. Before performing processing of converting the color measurement target RGB value into the initialization color measurement target RGB value (RsGsBs) (step S10), the color measurement value calculating unit 531 generates an inter-reference-RGB linear transformation matrix used in this conversion. That is, as illustrated in FIG. 35, the color measurement value calculating unit 531 reads, from the non-volatile memory 60, the initial reference RGB value (RdGdBd) acquired upon preprocessing at the time of the initial state of the image forming apparatus 100 and the reference RGB value upon color measurement (RdsGdsBds) acquired at the time of adjustment of the image forming apparatus 100, and generates the inter-reference-RGB linear transformation matrix to convert the reference RGB value upon color measurement RdsGdsBds into the initial reference RGB value RdGdBd. Sequentially, the color measurement value calculating unit 531 stores the generated inter-reference-RGB linear transformation matrix in the non-volatile memory 60.

In FIG. 36, points represented by points with white blanks in their centers in (a) of FIG. 36 are points in which the initial reference RGB value RdGdBd is plotted in the rgb space, and filled points are points in which the reference RGB value upon color measurement RdsGdsBds is plotted in the rgb space. As seen from (a) of FIG. 36, the value of the reference RGB value upon color measurement RdsGdsBds changes from the value of the initial reference RGB value RdGdBd, and their change directions on the rgb space are substantially the same as illustrated in (b) FIG. 36 but the deviation direction varies depending on a color phase. Thus, even when patches of the identical reference chart 400 are captured, a cause of variation in the RGB value includes a temporal change in the illumination light source 426 and a temporal change in the two-dimensional image sensor 431.

Thus, in a state where the RGB value acquired by image capturing in the color measuring camera 42 varies, if a color measurement value is calculated using a color measurement target RGB value acquired by capturing the patch image 200, an error may be caused in the color measurement value by the variation. Therefore, for the initial reference RGB value RdGdBd and the reference RGB value upon color measurement RdsGdsBds, an estimation method such as a least-square method is used to calculate an inter-reference-RGB linear transformation matrix to convert the reference RGB value on color measurement RdsGdsBds into the initial reference RGB value RdGdBd, this inter-reference-RGB linear transformation matrix is used to convert a color measurement target RGB value acquired by capturing the patch image 200 in the color measuring camera 42 into an initialization color measurement target RGB value RsGsBs, and basic color measurement processing (described later) is performed on the converted initialization color measurement target RGB value RsGsBs, thereby accurately acquiring the color measurement value of the patch image 200 of the color measurement target.

This inter-reference-RGB linear transformation matrix may be a non-linear matrix not only in a first order but also in a higher order; and, in a case where the non-linearity is high between the rgb space and the XYZ space, by providing a higher-order matrix, it is possible to improve conversion accuracy.

As described above, after the color measurement value calculating unit 531 converts a color measurement target RGB value acquired by capturing the patch image 200 into an initialization color measurement target RGB values (RsGsBs) using an inter-reference-RGB linear transformation matrix (step S10), the color measurement value calculating unit 531 performs basic color measurement processing in step S20 on this initialization color measurement target RGB value (RsGsBs).

FIGS. 37 and 38 are views explaining basic color measurement processing. First, the color measurement value calculating unit 531 reads a reference value linear transformation matrix generated in preprocessing and stored in the non-volatile memory 60, converts the initialization color measurement target RGB value (RsGsBs) into a first XYZ value using the reference value linear transformation matrix, and stores the first XYZ value in the non-volatile memory 60 (step S21). FIG. 37 illustrates an example where the initialization color measurement target RGB value (3, 200, 5) is converted into the first XYZ value (20, 80, 10) by the reference value linear transformation matrix.

Next, the color measurement value calculating unit 531 converts the first XYZ value, which is converted from the initialization color measurement target RGB value (RsGsBs) in step S21, into a first Lab value using a known conversion equation, and stores the Lab value in the non-volatile memory 60 (step S22). FIG. 37 illustrates an example where the first XYZ value (20, 80, 10) is converted into the first Lab value (75, −60, 8) by the known conversion equation.

Next, the color measurement value calculating unit 531 searches multiple reference color measurement values (i.e. Lab values) stored in the memory table Tb1 of the non-volatile memory 60 in preprocessing, and, among the reference color measurement values (i.e. Lab values), selects a pair of multiple patches (i.e. neighborhood-color patches) having reference color measurement values (i.e. Lab values) close to the first Lab value on the Lab space (step S23). As a method of selecting patches of a closer distance, for example, it is possible to employ a method of calculating a distance to the first Lab value for all reference color measurement values (i.e. Lab values) stored in the memory table Tb1 and selecting multiple patches having Lab values (in FIG. 37, hatched Lab values) closer to the first Lab value.

Next, as illustrated in FIG. 38, with reference to the memory table Tb1, the color measurement value calculating unit 531 extracts RGB values (i.e. reference RGB values) and XYZ values associated with the Lab values of the neighborhood-color patches selected in step S23, and, from these multiple RGB values and XYZ values, selects a combination of an RGB value and XYZ value (step S24). Subsequently, the color measurement value calculating unit 531 calculates a selection RGB value linear transformation matrix to convert the RGB value of the selected combination (i.e. selection pair) into an XYZ value by a least-square method and stores the calculated selection RGB value linear transformation matrix in the non-volatile memory 60 (step S25).

Next, the color measurement value calculating unit 531 converts the initialization color measurement target RGB value (RsGsBs) into a second XYZ value using the selection RGB value linear transformation matrix generated in step S25 (step S26). Further, the color measurement value calculating unit 531 converts the second XYZ value calculated in step S26 into a second Lab value using a known conversion equation (step S27) and processes the acquired second Lab value Lab as a final color measurement value of the patch image 200 of the color measurement target. The image forming apparatus 100 performs color adjustment based on the color measurement value acquired by the above color measurement processing, thereby enhancing the color reproducibility.

As described above, although specific embodiments have been described above in detail, the present invention is not limited to the embodiments, and various changes and modifications can be made without departing from the scope of the present invention on the stage of implementation.

Also, the control function of each unit forming the image forming apparatus 100 and the color measuring device according to the above embodiments can be realized using hardware, software or a combined configuration of hardware and software.

For example, the function of the correction data generating unit 52 of the color measuring device can be realized by executing, in a processor held in the color measurement control unit 50, a program describing a processing sequence. The program executed by the processor is provided in a manner incorporated in advance in a ROM inside the color measurement control unit 50. Also, the computer program executed by the processor may be provided in a manner recorded in a computer-readable recording medium such as a CD-ROM, an FD, a CD-R and a DVD (Digital Versatile Disc), as a file in an installable or an executable format.

Furthermore, the computer program executed by the processor may be provided in a manner stored in a computer connected to a network such as the Internet so as to be made available for downloads via the network. Moreover, the computer program executed by the processor may be provided or distributed over a network such as the Internet.

A program to realize the function of the correction data generating unit 52 employs a module configuration including each unit (i.e. the first generating unit 521, the second generating unit 522 and the storage control unit 523) of the correction data generating unit 52 and the processor reads and realizes this program from a memory such as a ROM, thereby loading the each unit on a main storage device and generating the first generating unit 521, the second generating unit 522 and the storage control unit 523 on the main storage device.

According to an aspect of the present embodiment, it is possible to correctly adjust image data acquired by capturing a reference chart and a color measurement target; and to perform accurate color measurement.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color measuring device comprising:
an image capturing unit configured to output image data of an image-capturing range;
a reference chart having multiple patches of different densities and arranged in the image-capturing range;
an illumination unit configured to illuminate the image-capturing range;
a light quantity control unit configured to control a light quantity of the illumination unit;
a generating unit configured to
generate first correction data based on image data of the multiple patches illuminated by a first light quantity and
generate second correction data based on image data of the multiple patches illuminated by a second light quantity larger than the first light quantity;
a storage unit configured to store the first correction data and the second correction data;
a correction unit configured to correct image data of the reference chart and a color measurement target output from the image capturing unit, using the first correction data or the second correction data, in a case where the image capturing unit captures the reference chart and the color measurement target at the same time; and
a calculating unit configured to calculate color measurement value of the color measurement target based on the corrected image data of the reference chart and the color measurement target,
wherein the first correction data is data to reduce a difference between a target value calculated by normalizing an index value indicating brightness of the multiple patches in a scale range of the image data and the image data of the multiple patches illuminated by the first light quantity, and
the second correction data is data to reduce a difference between the target value and the image data of the multiple patches illuminated by the second light quantity.

2. The color measuring device according to claim 1, further comprising
a decision unit configured to decide whether the image data of the patch is saturated, while changing the light quantity of the illumination unit, wherein
the first light quantity is light quantity decided that image data of a patch of a lowest density among the multiple patches is not saturated, and
the second light quantity is light quantity decided that image data of a patch of a highest density among the multiple patches is not saturated.

3. The color measuring device according to claim 1, wherein,
at a time when the image capturing unit captures the reference chart and the color measurement target,
in a case where density of the color measurement target is equal to or less than a threshold defined in advance, the light quantity control unit controls the light quantity of the illumination unit to be same as the first light quantity, and,
in a case where the density of the color measurement target exceeds the threshold, the light quantity control unit controls the light quantity of the illumination unit to be same as the second light quantity.

4. The color measuring device according to claim 3, wherein
the correction unit
corrects the image data of the reference chart and the color measurement target illuminated by the first light quantity using the first correction data, and
corrects the image data of the reference chart and the color measurement target illuminated by the second light quantity using the second correction data.

5. The color measuring device according to claim 1, wherein
the image data output by the image capturing unit is RGB data, and
the first correction data and the second correction data each include correction data to correct R component of the RGB data, correction data to correct G component of the RGB data and correction data to correct B component of the RGB data.

6. The color measuring device according to claim 5, wherein the multiple patches are grayscale patches.

7. An image forming apparatus comprising:
an image output unit configured to output an image onto a recording medium; and
a color measuring unit configured to perform color measurement on an output image output by the image output unit,
wherein the color measuring unit comprises:
an image capturing unit configured to output image data of an image-capturing range;
a reference chart having multiple patches of different densities and arranged in the image-capturing range;
an illumination unit configured to illuminate the image-capturing range;
a light quantity control unit configured to control a light quantity of the illumination unit;
a generating unit configured to
generate first correction data based on image data of the multiple patches illuminated by a first light quantity and
generate second correction data based on image data of the multiple patches illuminated by a second light quantity larger than the first light quantity;
a storage unit configured to store the first correction data and the second correction data;
a correction unit configured to correct image data of the reference chart and the output image output from the image capturing unit, using the first correction data or the second correction data, in a case where the image capturing unit captures the reference chart and the output image at the same time; and
a calculating unit configured to calculate color measurement value of the output image based on the corrected image data of the reference chart and the output image,
wherein the first correction data is data to reduce a difference between a target value calculated by normalizing an index value indicating brightness of the multiple patches in a scale range of the image data and the image data of the multiple patches illuminated by the first light quantity, and the second correction data is data to reduce a difference between the target value and the image data of the multiple patches illuminated by the second light quantity.

8. A computer program product comprising a non-transitory computer-usable medium having computer-readable program codes embodied in the medium for a computer that includes an image capturing unit configured to output image data of an image-capturing range;

a reference chart having multiple patches of different densities and arranged in the image-capturing range;

an illumination unit configured to illuminate the image-capturing range;

a light quantity control unit configured to control a light quantity of the illumination unit;

a storage unit configured to store first correction data and second correction data;

a correction unit configured to correct image data of the reference chart and a color measurement target output from the image capturing unit, using the first correction data or the second correction data, in a case where the image capturing unit captures the reference chart and the color measurement target at the same time; and a calculating unit configured to calculate color measurement value of the color measurement target based on the corrected image data of the reference chart and the color measurement target, the program codes, when executed, causing the computer to execute generating the first correction data based on image data of the multiple patches illuminated by a first light quantity;

generating the second correction data based on image data of the multiple patches illuminated by a second light quantity larger than the first light quantity; and storing the first correction data and the second correction data in the storage unit, wherein the first correction data is data to reduce a difference between a target value calculated by normalizing an index value indicating brightness of the multiple patches in a scale range of the image data and the image data of the multiple patches illuminated by the first light quantity, and the second correction data is data to reduce a difference between the target value and the image data of the multiple patches illuminated by the second light quantity.

\* \* \* \* \*